(12) United States Patent
Shetty et al.

(10) Patent No.: US 9,135,269 B2
(45) Date of Patent: Sep. 15, 2015

(54) SYSTEM AND METHOD OF IMPLEMENTING AN OBJECT STORAGE INFRASTRUCTURE FOR CLOUD-BASED SERVICES

(71) Applicants: Sachin Shetty, Mumbai-58 (IN);
Krishna Sankar, San Jose, CA (US);
Amrit Jassal, Morgan Hill, CA (US);
Kalpesh Patel, Flower Mound, TX (US);
Shishir Sharma, Mountain View, CA (US)

(72) Inventors: Sachin Shetty, Mumbai-58 (IN);
Krishna Sankar, San Jose, CA (US);
Amrit Jassal, Morgan Hill, CA (US);
Kalpesh Patel, Flower Mound, TX (US);
Shishir Sharma, Mountain View, CA (US)

(73) Assignee: EGNYTE, INC., Mountain View, CA (US)

( * ) Notice: Subject to any disclaimer, the term of this patent is extended or adjusted under 35 U.S.C. 154(b) by 94 days.

(21) Appl. No.: 13/708,040

(22) Filed: Dec. 7, 2012

(65) Prior Publication Data
US 2014/0149794 A1 May 29, 2014

Related U.S. Application Data

(60) Provisional application No. 61/567,737, filed on Dec. 7, 2011.

(51) Int. Cl.
| G06F 15/16 | (2006.01) |
| G06F 17/30 | (2006.01) |
| G06F 11/14 | (2006.01) |
| H04L 29/08 | (2006.01) |

(52) U.S. Cl.
CPC ...... *G06F 17/30194* (2013.01); *G06F 11/1412* (2013.01); *H04L 67/10* (2013.01); *H04L 67/1002* (2013.01); *H04L 67/1095* (2013.01)

(58) Field of Classification Search
USPC ...................... 709/219, 226; 455/521; 714/20
See application file for complete search history.

(56) References Cited

U.S. PATENT DOCUMENTS

| 2010/0144383 A1* | 6/2010 | Berger et al. ................. 455/521 |
| 2011/0110568 A1* | 5/2011 | Vesper et al. ................. 382/128 |
| 2011/0153351 A1* | 6/2011 | Vesper et al. ..................... 705/2 |
| 2012/0070045 A1* | 3/2012 | Vesper et al. ................. 382/128 |
| 2014/0059226 A1* | 2/2014 | Messerli et al. .............. 709/226 |
| 2014/0149794 A1* | 5/2014 | Shetty et al. .................... 714/20 |

* cited by examiner

*Primary Examiner* — Tammy Nguyen
(74) *Attorney, Agent, or Firm* — Larry E. Henneman, Jr.; Gregory P. Gibson; Henneman & Associates, PLC

(57) ABSTRACT

A method for storing objects in an object storage system includes the steps of establishing a network connection with a client over an inter-network, receiving an upload request indicating an object to be uploaded by the client, selecting at least two storage nodes on which the object will be stored, receiving the object from the client via the network connection, and streaming the object to each of the selected storage nodes such that the object is stored on each of the selected storage nodes. The method can also include writing an object record associating the object and the selected storage nodes to a shard of an object database and generating a Universally Unique Identifier (UUID). The UUID indicates the shard and the object ID of the object record, such that the object record can be quickly retrieved. Object storage infrastructures are also disclosed.

50 Claims, 30 Drawing Sheets

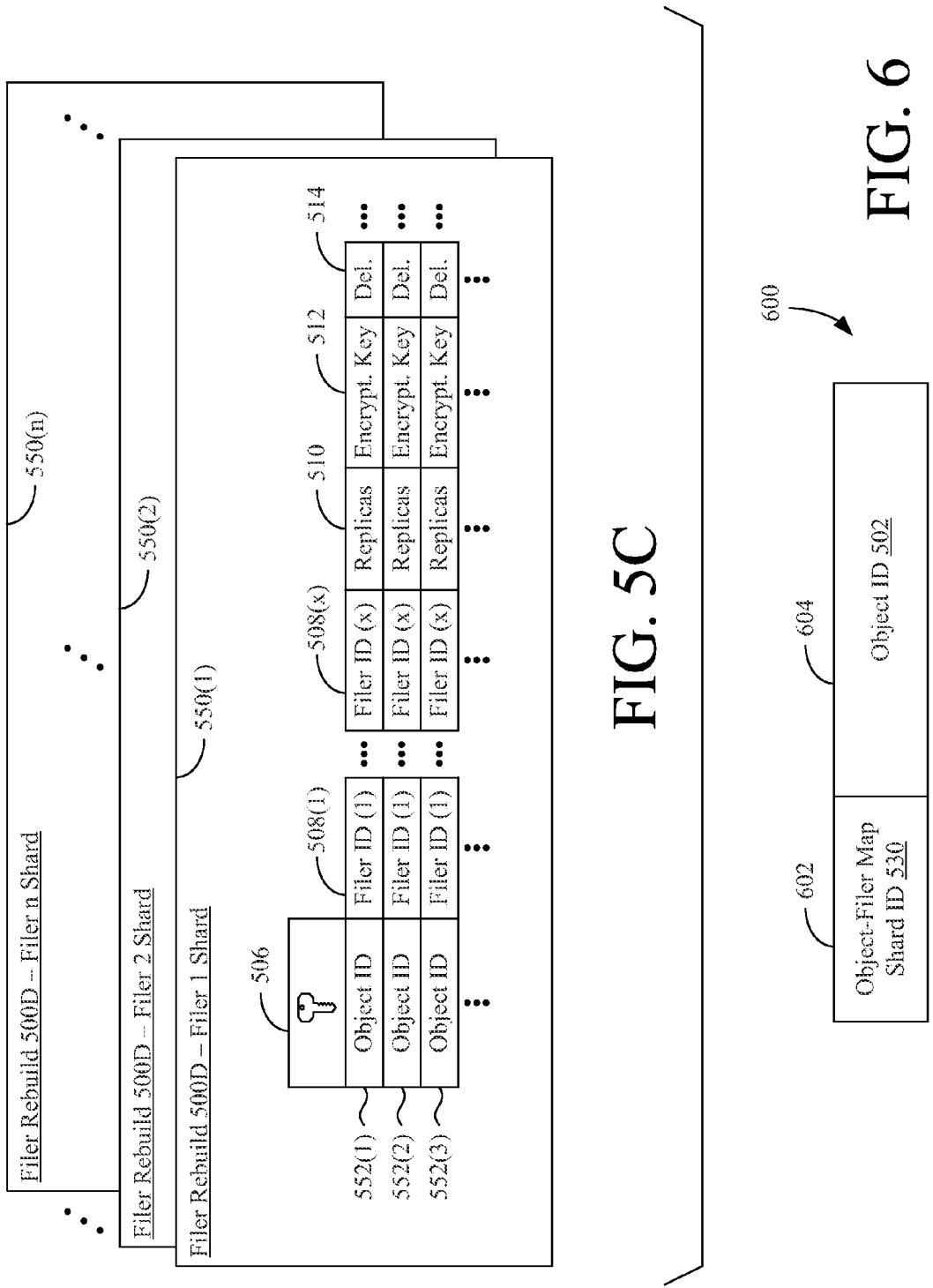

SYSTEM AND METHOD OF IMPLEMENTING AN OBJECT STORAGE INFRASTRUCTURE FOR CLOUD-BASED SERVICES

RELATED APPLICATIONS

This application claims the benefit of U.S. Provisional Patent Application No. 61/567,737, filed Dec. 7, 2011 by the same inventors, which is incorporated herein by reference in its entirety.

BACKGROUND

1. Field of the Invention

This invention relates generally to cloud computing systems, and more particularly to cloud file storage systems. Even more particularly, this invention relates to an object storage infrastructure for cloud-based services.

2. Description of the Background Art

There are currently several options available to address the need for file storage. One option is a shared network file system (NFS) server. The NFS protocol allows a client computer to access files over a network in a manner similar to how local storage is accessed. Another option is to use a storage area network (SAN), which is a dedicated network that provides access to consolidated, block level data storage. A SAN generally provides only block level storage and access, but there are SAN file systems that provide file-level access.

As yet another option, there are cloud storage systems such as, for example, the S3 storage service offered by Amazon. In cloud computing systems, computing and storage services are provided to remote clients over a wide area network such as the Internet.

All of the foregoing object storage options have disadvantages. For example, the burden of scaling falls on the client applications. This is because the client application needs to maintain additional logical to physical mapping(s) to distribute a namespace across multiple shared data stores. In addition, cloud stores are ideal for storing less frequently used (archival) objects, but don't provide the low latency requirements, mandatory for storing file server objects. Furthermore, the foregoing storage options suffer episodes downtime for system maintenance, patches, etc., which cause the stored objects to be periodically unavailable.

What is needed is a cloud-based object storage solution that overcomes or at least reduces the disadvantages discussed above.

SUMMARY

The present invention overcomes the problems associated with the prior art by providing an object storage infrastructure for cloud-based object storage systems. Client applications are provided with a simplified HTTP based API to retrieve and mutate persistent objects. The object store provides a horizontally scalable namespace to the client applications. Recovery from failing or failed storage nodes, as well as ensuring integrity of stored objects, is handled by the object store. Additional services such as encryption and number of replications of objects are exposed as configurable storage policies.

An object storage system according to the invention includes a plurality of storage nodes for storing digital objects associated with clients, at least one client application server, and at least one cloud application server. The client application server is operative to establish a network connection with a client over an inter-network, receive an indication of an object to be uploaded by the client, generate an upload request associated with the object, and receive the object from the client. The cloud application server is operative to receive the upload request, select at least two (the number is configurable) storage nodes from the plurality of storage nodes, receive the object from the client application server, and stream the object to each of the selected storage nodes such that the object is stored on each of the storage nodes. Thus, the cloud application server includes means for selecting at least two storage nodes and means for streaming the object from the client application server to each of the selected storage nodes. In a particular embodiment, each of the storage nodes exposes a Hypertext Transfer Protocol (HTTP) interface.

In a particular embodiment, the system also includes an object database storing a plurality of object records where each record associates a stored object with a plurality of storage nodes, and the cloud application server causes an object record associating the uploaded object with the selected storage nodes to be written to the object database. The object database can be sharded into a plurality of shards, each including a plurality of object records. Additionally, the object database can include a plurality of shard records, where each of the shard records includes a shard identifier uniquely identifying one of the shards.

The system can also include a file system database that stores information defining a virtual file system associated with the client. The client application server stores virtual object records in the file system database, including a virtual object record associated with the uploaded object. According to a particular embodiment, the file system database includes a plurality of tables defining the virtual file system, the plurality of tables is sharded into a plurality of shards, and the data defining the virtual file system for the client is stored in only one of the plurality of shards. If the client application server later receives a command from the client to delete the object, the client application server can modify the virtual object record associated with the object to indicate that the associated virtual object is deleted from the virtual file system. After the virtual object associated with the object is marked for deletion, the cloud application server can then cause the object to be purged from the selected storage nodes.

In another particular embodiment, the cloud application server is further operative to generate a Universally Unique Identifier (UUID) associated with the object. The UUID can include a first field containing data identifying one of the shards of the object database and a second field containing an object identifier identifying the object record for the object among the plurality of object records in the shard. The UUID can be stored in the virtual file system database in the virtual object record associated with the object.

Embodiments of the object storage system facilitate various other important features of the invention. According to one embodiment, the object storage system further includes at least one cloud object server that can download the object from one of the storage nodes and provide it to the client application server. For example, the client application server can receive an indication that the client wants to download the object and can then generate a download request (optionally including a UUID from the file system database) for the object. The cloud object server receives the download request, requests the cloud application server to provide storage node information for the object, requests the object from any of the selected storage nodes on which it was previously stored, and provides the object to the client application server. The cloud object server can provide the UUID to the cloud application server to facilitate retrieval of the storage node information.

According to another embodiment, the object storage system includes a plurality of cloud application servers and/or a plurality of cloud object servers and a load balancer. The load balancer can be operative to receive an upload request from the client application server and provide it to a selected one of the plurality of cloud application servers. Similarly, the load balancer can also be operative to receive a download request from the client application server and provide it to a selected one of the plurality of cloud object servers.

The object storage system can also include a storage node rebuild module that rebuilds one of the plurality of storage nodes, including the objects stored on it, when that storage node fails. In one embodiment, the storage node recovery module rebuilds the failed storage node by using the object records in the object database to identify the stored objects on the failed storage node and then copying the stored objects from other storage nodes to the rebuilt storage node. In another embodiment, the object records are sharded by storage node, and each shard stores all the object records for one of the storage nodes. The storage node recovery module then uses the object records in the shard associated with the failed storage node to copy the stored objects from other storage nodes to the rebuilt storage node.

As yet another example, the object storage system can also include a rebalance module that is operative to move objects stored on one of the plurality of storage nodes to other one(s) of the plurality of storage nodes. In doing so, the rebalance module can modify object records in the object database that are associated with the moved objects. As still another example, the object storage system can include an object auditor that determines whether an object stored on one or more storage nodes has degraded. If the object has degraded, the object auditor can, for example, overwrite the object with a version of the object from another storage node that is not degraded.

A method for storing objects is also disclosed by the present invention. The method includes the steps of establishing a network connection with a client over an inter-network, receiving an upload request indicating an object to be uploaded by the client, selecting at least two storage nodes on which the object will be stored from a plurality of storage nodes, receiving the object from the client via the network connection, and streaming the object to each of the selected storage nodes such that the object is stored on each of the storage nodes (e.g., using HTTP). The method can also include determining the number of selected storage nodes, such that the number of replications of the object is configurable. Additionally, the upload request can be received from a load balancer operative to distribute the upload request among a plurality of cloud application servers.

A particular method further includes the steps of accessing an object database storing a plurality of object records each associating a stored object and multiple ones of the storage nodes, and writing an object record associating the object and the selected storage nodes in the object database. If a request to delete the object is received, the method can further include the step of modifying the object record associated with the object to indicate that the object is marked for deletion. An even more particular method includes purging the object from each of the selected storage nodes.

Another particular method includes generating a UUID for the object, where the UUID can have the format described above. More particularly, the method can further include the steps of receiving a download request for the object, obtaining storage node information facilitating retrieval of the object from any of the selected storage nodes on which it was stored, retrieving the object from any of the selected storage nodes, and providing the object to the client. Obtaining the storage node information can be accomplished by using the UUID to locate an object record associated with the object in the object database. The object record can then be used to retrieve the object from any of the storage nodes.

Yet another particular method of the present invention can also involve interacting with a file system database, which stores data defining a virtual file system associated with the client. In particular, the method can include the step of storing a virtual object record (optionally including a UUID) associated with the object in the file system database. Still a more particular method includes the steps of receiving an indication that the client wants to delete the object, and modifying the virtual object record to indicate that the client wants to delete the object.

The methods of the invention also encompass the step of rebuilding a failed one of the plurality of storage nodes, including the objects stored thereon. For example, rebuilding the failed storage node includes using the object records in the object database to identify the stored objects on the failed storage node and copying the identified stored objects from other ones of the plurality of storage nodes to the rebuilt storage node. As another example, the object records can be is sharded by storage node such that each shard stores all the object records for one of the storage nodes. An alternate recovery method includes identifying the shard associated with the failed storage node and copying the objects contained in the identified shard from other storage nodes to the rebuilt storage node.

Another particular method of the invention includes moving objects stored on one of the storage nodes to other one(s) of the plurality of storage nodes. Moving objects can include the steps of accessing the object database and its object records, and modifying at least some of the object records in response to moving the objects to other storage nodes. Yet another particular method of the invention includes determining whether the object stored on one or more of the plurality of storage nodes has degraded.

Non-transitory, electronically-readable storage medium having code embodied therein for causing an electronic device to perform the methods of the invention are also described. The term "non-transitory" is intended to distinguish storage media from transitory electrical signals. However, re-writable memories are intended to be "non-transitory".

The invention also describes a data structure, stored on a non-transitory, electronically-readable storage medium, defining a UUID for an object record of an object database. The UUID data structure includes a first field containing data defining one of a plurality of shards of the object database, and a second field containing an object identifier identifying the object record among a plurality of object records in the identified shard. The data structure can also include data identifying a virtual object record of a virtual file system when implemented in a virtual file system database.

The invention also describes a data structure, stored on a non-transitory, electronically-readable storage medium, for an object record of an object database. The data structure includes a first field containing data uniquely identifying an object record among a plurality of object records, a second field containing data identifying a first storage node on which an object associated with the object record is stored, and a third field containing data identifying a second storage node on which the object is stored.

BRIEF DESCRIPTION OF THE DRAWINGS

The present invention is described with reference to the following drawings, wherein like reference numbers denote substantially similar elements:

FIG. 5C shows another exemplary table of the object databases of FIG. 3 sharded by filer;

FIG. 6 shows a data structure for a Universally-Unique Identifier (UUID) according to one embodiment of the present invention;

DETAILED DESCRIPTION

The present invention overcomes the problems associated with the prior art, by providing an object storage infrastructure for cloud attached file systems. In the following description, numerous specific details are set forth (e.g., database records with exemplary fields, assignment of application functions to particular servers, etc.) in order to provide a thorough understanding of the invention. Those skilled in the art will recognize, however, that the invention may be practiced apart from these specific details. In other instances, details of well-known cloud computing practices and components (e.g., establishing network connections, routine optimization of databases and other entities, etc.) have been omitted, so as not to unnecessarily obscure the present invention.

Figure 1:
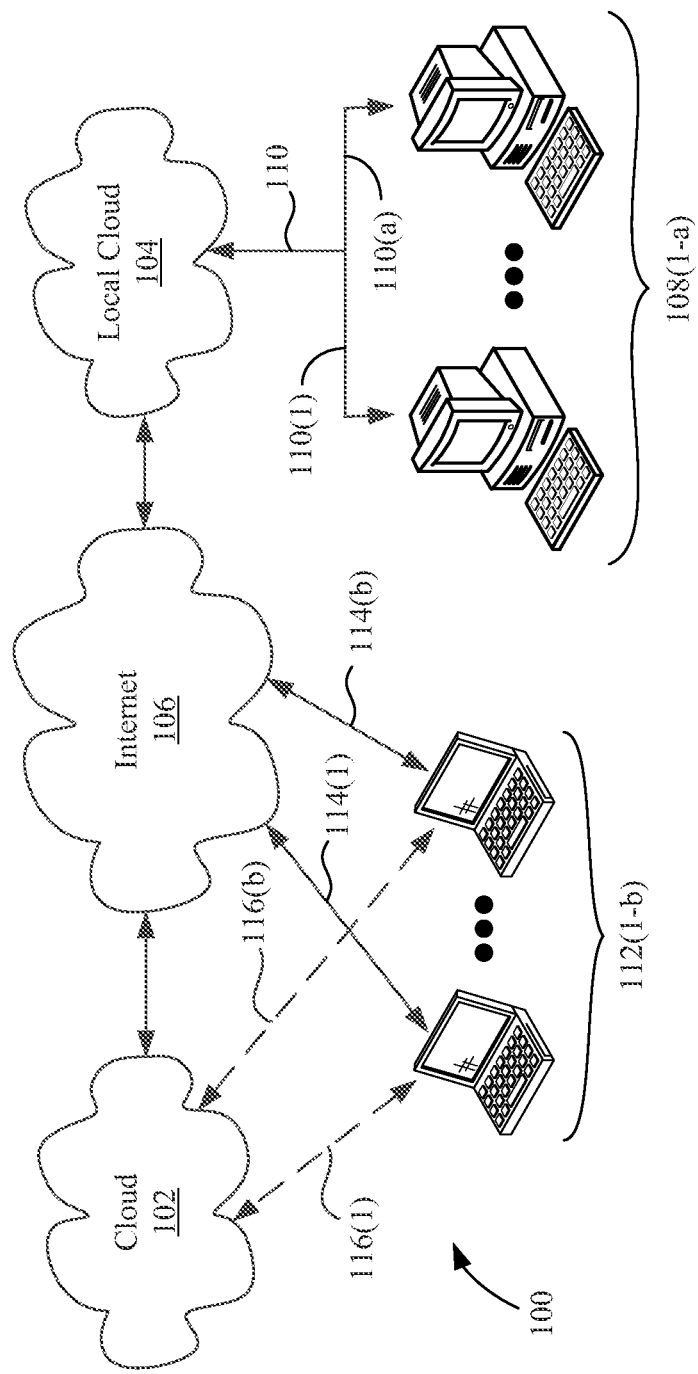
FIG. 1 shows a cloud computing system according to one embodiment of the present invention.

FIG. 1 shows a cloud computing system 100 according to the present invention. System 100 includes a cloud system 102 and a local cloud system 104, which communicate via an inter-network 106 (e.g., the Internet). Local clients 108(1-a) can access files stored on local cloud 104 by directly accessing local cloud 104 via local connections 110(1-a) (e.g., local network connections). Remote clients 112(1-b) can access files ("objects) stored on cloud 102 by accessing cloud 102 via connections 114(1-b) to Internet 106, or via some other connections 116(1-b) with cloud 102.

The objects on cloud 102 and local cloud 104 can be synchronized over Internet 106, such that the objects stored on local cloud 104 are also stored on cloud 102. Thus, the local cloud 104 itself can be considered a "client" of cloud 102. Additionally, if local clients 108(1-a) and remote clients 112(1-b) are associated with the same entity (e.g., business, customer, etc.), then local clients 108(1-a) and remote clients 112(1-b) can access the files associated with their common entity either via cloud 102 or via local cloud 104.

Cloud 102 provides a virtual file system interface for remote clients 112(1-b). Among other options, remote clients 112(1-b) can upload objects to cloud 102, download objects from cloud 102, and delete objects stored on cloud 102 via the virtual file system interface. Similarly, local cloud 104 also provides a virtual file system interface for local clients 108 (1-a). Local clients 108(1-a) can, therefore, upload objects to, download objects from, and delete objects from local cloud 104 via its virtual file system interface. As indicated above, cloud 102 and local cloud 104 also interface with each other via Internet 106 such that their files can be synchronized. While only one local cloud 104 is shown, those skilled in the art will understand that cloud 102 can synchronize with many local clouds 104.

Figure 2:
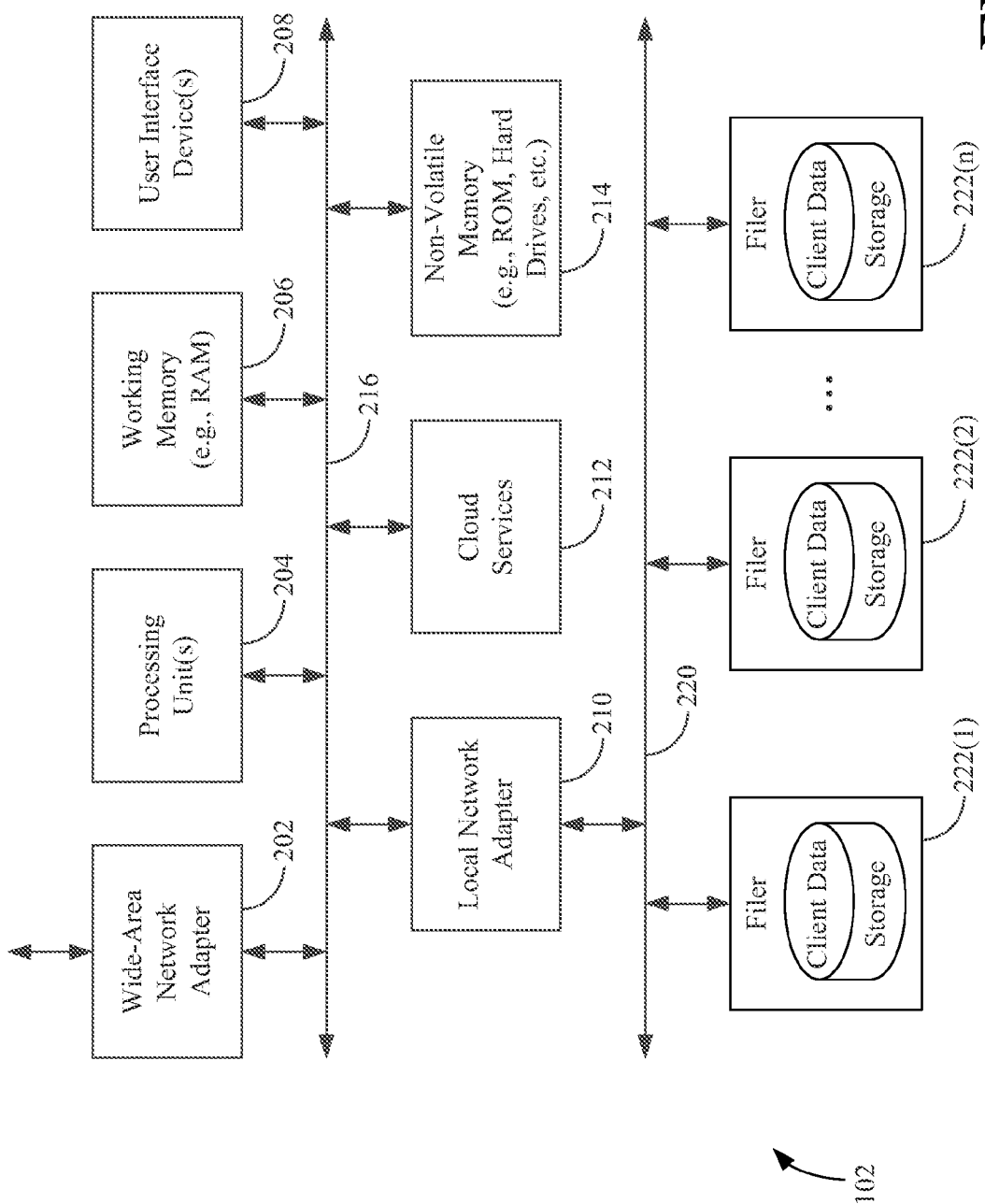
FIG. 2 is a block diagram showing a cloud infrastructure according to one embodiment of the invention.

FIG. 2 is a block diagram showing cloud system 102 (hereafter referred to as "cloud 102" for simplicity) in greater detail, according to one embodiment of the invention. Cloud 102 includes a wide-area network adapter 202, one or more processing units 204, working memory 206, one or more user interface devices 208, a local network adapter 210, cloud services 212, and non-volatile memory 214, all intercommunicating via an internal bus 216. Processing units(s) 204 impart functionality to cloud 102 by executing code stored in any or all of non-volatile memory 214, working memory 206, and cloud services 212. Cloud services 212 represents hardware, software, firmware, or some combination thereof, that provides the functionality of the object storage services and other cloud server operations described herein.

Wide area network adapter 202 provides a means for cloud 102 to communicate with remote clients 112(1-$b$) and local cloud 104 via Internet 106. Local network adapter 210 provides a means for accessing a plurality of data storage devices 222(1-$n$), via a local private network 220. Objects associated with clients 112(1-$b$) and local cloud 104 are stored in data storage devices 222(1-$n$) and are retrieved therefrom as needed. A particular advantage of the present invention is the horizontal data storage scalability of cloud 102. Specifically, additional data storage devices 222($n$+) can be added as needed to provide additional storage capacity. In this example embodiment, data storage devices 222 include network attached storage (NAS) devices, but any suitable type of storage device can be used. Data storage devices 222(1-$n$) will be referred to simply as "filers" 222(1-$n$) below.

The invention, utilizing cloud services 212 and filers 222 (1-$n$), provides important advantages over the prior art, which will be discussed in more detail below. For example, each object stored in cloud 102 can be replicated to each of a plurality of filers 222(1-$n$), with the number of replications being configurable (e.g., by the client, etc.). Because the objects are replicated across multiple filers 222(1-$n$), cloud services 212 facilitate recovery and rebuilding of corrupted objects and failed filers 222(1-$n$). Thus, object integrity is delegated to cloud 102. Moreover, objects can be retrieved from cloud 102 as long as at least one filer 222(1-$n$) storing the object is available and maintenance can be performed on filers 222(1-$n$) and other elements without downtime. These, and other advantages of the invention, will be discussed further below.

Figure 3:
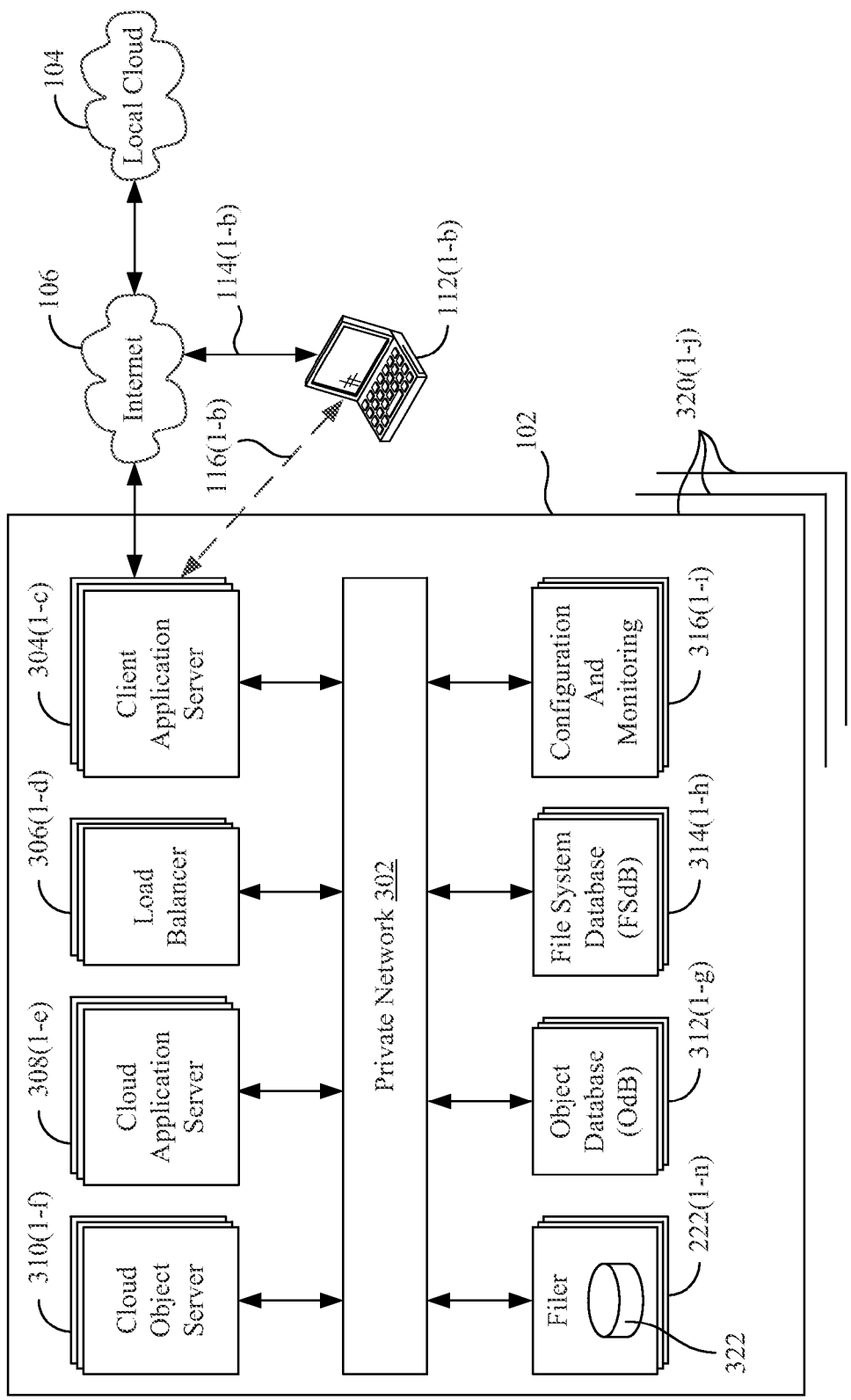
FIG. 3 is a block diagram showing a cloud infrastructure according to another embodiment of the present invention.

FIG. 3 is a block diagram showing the object storage infrastructure of cloud 102 according to another embodiment of the present invention in which cloud 102 and cloud services 212 are implemented as a plurality of entities (computer systems, software modules, etc.) intercommunicating over a private network 302. As shown in FIG. 3, cloud 102 includes one of more client application server(s) 304(1-$c$), one or more load balancer(s) 306(1-$d$), one or more cloud application server(s) 308(1-$e$), and one or more cloud object server(s) 310(1-$f$), which are all coupled to private network 302. FIG. 3 further shows that cloud 102 includes one or more object database(s) 312 (1-$g$), one or more file system database(s) 314(1-$h$), and one or more configuration and monitoring server(s) 316(1-$i$), which are all coupled to private network 302. FIG. 3 also shows that filers 222(1-$n$) are coupled to private network 302.

Several clarifications should be made at the outset. First, while connections between the entities of FIG. 3 are shown as single lines for simplicity, it should be understood that connections between the entities can be provided as necessary or as desired. For example, each instance of client application server 306 can be coupled to and communicate with private network 302.

Second, while the entities of cloud 102 are shown separately in FIG. 3 for clarity of function, the exact implementation of these entities in hardware and software can vary. For example, each instance of client application server 304(1-$c$) can be implemented as a dedicated computer coupled to private network 302. As another example, the client application servers 304(1-$c$) can represent multiple instances of the same software running on a computer. The same is true for the other entities of cloud 102 shown in FIG. 3. As yet another option, different entities of cloud 102 can be different modules of software running on the same computer. For example, one or more client application servers 304(1-$c$) and one or more file system databases 314(1-$g$) can be running on the same computer. Additionally or alternatively, one or more cloud application servers 308(1-$e$) and one or more object databases 312(1-$g$) can be running on the same computer. These and other implementations of the entities of FIG. 3 will be apparent in view of this disclosure.

The elements of FIG. 3 provide the following functions. Private network 302 facilitates intercommunication between the various entities of cloud 102 that are coupled to it. In the present example, private network 302 is a secure local area network dedicated to cloud 102. However, private network 302 can alternatively include multiple private networks. As yet another alternative, private network 302 can include multiple private networks that communicate securely with one another and/or other cloud elements over a public network (e.g., Internet 106), for example, when cloud 102 includes a plurality of data centers 320(1-$j$), each containing at least some some of the elements shown in cloud 102 in FIG. 3.

Client application server 304(1-$c$) establish and manage network connections with clients 112(1-$b$) and/or local cloud 104 via Internet 106. Client application servers 304(1-$c$) can also establish and manage the other connections 116(1-$b$) with clients 112(1-$b$). In the embodiment shown, client application servers 304(1-$c$) communicate with internet 106 via a wide-area-network (WAN) adapter (FIG. 14) and can include one or more firewall(s) (not shown) for preventing unauthorized access to cloud 102. Alternatively, client application servers 304(1-$c$) could communicate with Internet 106 via private network 302, should private network 302 be coupled to Internet 106 via a firewall and WAN adapter. Such firewall(s) could be implemented as part of client application servers 304(1-$c$) and/or as separate elements.

Each client application servers 304(1-$c$) can also provide a virtual file system interface for clients 112(1-$b$) to access their objects stored on cloud 102. The virtual file system interface enables clients 112(1-$b$) to upload objects to, download objects from, and delete objects from cloud 102. The virtual file system interface also enables clients 112(1-$b$) to otherwise manipulate their virtual file system (e.g., move objects, create folders, etc.). Virtual file system information (e.g., folders, virtual objects, etc.) for each client 112(1-$b$) is stored in file system databases 314(1-$h$). Therefore, client application servers 304(1-$c$) have access to file system databases 314(1-$h$) via private network 302 as needed to facilitate their client services.

Client application servers 304(1-$c$) also synchronize objects stored on local cloud 104 and cloud 102 such that local cloud 104 is mirrored in cloud 102. In such an embodiment, the synchronization service provided by client application servers 304(1-$c$) can interface with local cloud 104 and determine if any changes have been made to local cloud 104 (e.g., objects have been uploaded, modified, deleted, etc.). If changes have been made, client application servers 304(1-$c$) can then synchronize the objects and virtual file system stored on cloud 102 with the objects and virtual file system on local cloud 104. As an example, any new objects added to local cloud 104 can be uploaded to cloud 102 via the synchronization process, and client application servers 304(1-$c$) can facilitate deletion of objects on cloud 102 that have been deleted on local cloud 104.

Client application servers 304(1-$c$) also control access to cloud 102 and objects stored thereon by enforcing permissions on the parties and elements accessing cloud 102. Permissions management frameworks that can be implemented with cloud 102 are described in detail in co-pending U.S. patent application Ser. No. 13/689,648, filed on Nov. 29, 2012 by Wijayaratne et al., which is incorporated herein by reference in its entirety.

Each of client application servers 304(1-c) can be implemented using a HyperText Transfer Protocol (HTTP) web server, such as Apache Tomcat™ developed and licensed by The Apache Software Foundation. Additionally, the virtual file system interface and synchronization service can be deployed as Java™ servlets. Additionally, it should also be noted that different client application servers 304(1-c) can be dedicated to particular functions. For example, one client application server 304(1-c) could provide an interface for clients 112(1-b) and another client application server 304(1-c) could provide synchronization services with local cloud 104.

Load balancers 306(1-d) balance the cloud services load over cloud application servers 308(1-e) and cloud object servers 310(1-f). In the present embodiment, load balancers 306(1-d) also act as proxies for cloud application servers 308(1-e) and cloud object servers 310(1-f) and are, therefore, in the communication path between the client application servers 304(1-c) and the cloud application servers 308(1-e) and between the client application servers 304(1-c) and the cloud object servers 310(1-f). In an alternative embodiment, load balancers 306(1-d) can provide only load balancing services to cloud 102, such that they only redirect requests from client application servers 304(1-c) to selected ones of cloud application servers 308(1-e) and cloud object servers 310(1-f). After a request is redirected to the selected cloud application server 308 or selected cloud object server 310, the associated client application server 308 communicates directly with the selected cloud application server 308 or the selected cloud object server 310 for the request, and the load balancer 306 is no longer in the communication path.

Load balancers 306(1-d) receive upload and download requests for objects from client application servers 304(1-c) via private network 302. For each upload request received by a load balancer 306, the load balancer 306 determines the availability of the cloud application servers 308(1-e) handling upload requests, their operational loads, and optionally other criteria (e.g., a weighting scheme, status, etc.) and then selects one of the cloud application servers 308(1-e) based on the determined information. Load balancer 306 then forwards the upload request to the selected cloud application server 308 via private network 302. Similarly, for each download request received by a load balancer 306, the load balancer 306 determines the availability of the cloud object servers 310(1-f) handling download requests, their operational loads, and optionally other criteria and then selects one of the cloud object servers 310(1-f) based on the determined information. Load balancer 306 then forwards the download request to the selected cloud object server 310(1-f) via private network 302. Optionally, if one of cloud object server 310(1-f) requests service by one of cloud application servers 308(1-e) (e.g., for storage node information), load balancers 306(1-d) can also receive the request from the cloud object server 310 and forward it to a selected one of cloud application servers 308(1-e) based on the loads of the cloud application servers 308(1-e).

It is important that load balancers 306(1-d) provide high availability load balancing even under very heavy loads. The inventors have found that load balancers 306(1-d) can be successfully implemented using HAProxy™. In one particular embodiment, two HAProxy™ load balancers 306(1-2) are employed in an active-passive mode. In this embodiment, the active load balancer 306(1) handles all requests if possible. The passive load balancer 306(2) steps in and provides failover load balancing should the primary load balancer 306(1) fail or become overwhelmed.

Cloud application servers 308(1-e) provide a variety of object store services, individually or collectively, for cloud 102. For example, responsive to receiving an upload request, cloud application server 308 will determine a plurality of filers 222(1-n) to write the object to, receive the object from one of the client application servers 304(1-c), and stream the object to the selected filers 222(1-n) without staging the object. The cloud application server 308 can also generate a Universally Unique Identifier (UUID) for the uploaded object and accesses object databases 312(1-g) to cause a new object record for the uploaded object to be created. The UUID is a unique identifier to the uploaded object that facilitates rapid retrieval of the object from filers 222(1-n), as will be described in more detail below.

Cloud application servers 308(1-e) also access object databases 312(1-g) to retrieve object information for objects when requested by other components (e.g., cloud object servers 310, etc.) or when needed by an object store service implemented by cloud application servers 308(1-e).

Cloud application servers 308(1-e) are further capable of causing objects to be deleted from filers 222(1-n). Cloud application servers 308(1-e) are able to access the file system databases 314(1-h) to determine which virtual objects that clients 112(1-b) have marked for deletion. When a file has been marked for deletion in the file system databases 314(1-h), cloud application servers 308(1-e) updates the associated object record in an object database 312 (e.g., marks for deletion, moves the record to a deleted objects table, etc.) and then deletes each copy of the object stored on the filers 222(1-n). Optionally, updating the object record in the object database 312(1-g) and deleting the objects from filers 222(1-n) can be implemented in separate processes performed at different times.

Cloud application servers 308(1-e) can also include other cloud maintenance applications that ensure the integrity and availability of cloud 102. For example, cloud application servers 308(1-e) include process(es) that can rebuild a failed one of filers 222(1-n) using the object-to-filer information stored in object databases 312(1-g). Cloud application servers 308(1-e) can also include process(es) that balance/rebalance the amount of data stored on each filer 222(1-n) and update the object databases 312(1-g) according to the rebalance. Cloud application servers 308(1-e) can also include process(es) that audit objects stored on filers 222(1-n). In particular, by using a checksum computed during object storage, the cloud application servers 308(1-e) can ensure that a plurality of valid replicas of an object are stored on a plurality of filers 222(1-n). If a corrupted object (e.g., an object having bit rot, etc.) is found, the corrupted object can be restored by over-writing it with an uncorrupted version of the object stored on another one of filers 222(1-n). These and other cloud maintenance process(es) (e.g., object dedupe, etc.) can be implemented using cloud application servers 308(1-e). Cloud application servers 308(1-e) can upload objects to, download objects from, and delete objects from filers 222(1-n) to carry out these maintenance services.

Cloud application servers 308(1-e) can be implemented using a HyperText Transfer Protocol (HTTP) web server, such as Apache Tomcat™, and some or all of the services performed by cloud application servers 308(1-e) can be implemented as Java™ servlets. Like client application servers 304(1-c), different cloud application servers 308(1-e) can be dedicated to different particular functions. For example, some cloud application servers 308 can be dedicated to object upload requests, while other cloud application servers 308 can be dedicated to cloud maintenance services.

Cloud object servers 310(1-*f*) facilitate retrieving objects from filers 222(1-*n*) responsive to download requests generated by client application servers 304(1-*c*). Cloud object servers 310(1-*f*) receive download requests from client application servers 304(1-*c*) via load balancers 306(1-*d*). The download requests indicate objects requested by clients 112 (1-*b*) or by local cloud 104. Responsive to receiving a download request, the cloud object server 310(1-*f*) in receipt of the download request obtains object retrieval information from one of object applications servers 308(1-*e*). The object retrieval information facilitates retrieving the requested object from any one of a plurality of filers 222(1-*n*) storing the object. The cloud object server 310(1-*f*) then uses the retrieval information to retrieve the requested object from any one of the identified filers 222(1-*n*). The cloud object server 310(1-*f*) then provides the requested object directly to the client application server 304(1-*c*) or to the server 304(1-*c*) via one of load balancers 306(1-*n*) acting as a proxy for the cloud object server 310(1-*f*).

Cloud object servers 310(1-*f*) can be implemented using Nginx, which is an HTTP Web server. The inventors have found that implementing cloud object servers 310(1-*f*) using Nginx provides an important advantage in that a get object request sent to a first filer 222(1-*n*) can be automatically re-routed to a second filer 222(1-*n*) should the first filer 222 (1-*n*) be down unexpectedly or otherwise rejects the get object request.

Filers 222(1-*n*) are storage nodes for the digital objects stored in cloud 102. Each filer 222(1-*n*) is very generic and includes at least one instance of a storage node service that communicates with private network 302 and facilitates storing, retrieving, and deleting objects in an associated mass data store 322. In the present embodiment, each storage node service is an HTTP server exposing an interface that responds to requests for getting, putting, and deleting objects.

The mass data store 322 associated with a filer 222 can be implemented in various ways. For example, the mass data store 322 can be connected to an internal bus of the same machine running the storage node service. Alternatively, mass data store 322 can be an NAS device coupled to private network 302 and in communication with the associated filer 222. Examples of NAS storage devices include disk arrays by Supermicro™, Just A Bunch of Drivers (JBOD), and a redundant array of independent disks (RAID). As yet another example, mass data store 322 can be another internet cloud system, such as Amazon S3. The file system employed by the filer 222 is also configurable and can include direct access file systems, indirect access file systems, a network file system (NFS), B-tree file system (Btrfs), EXT4, etc.

Filers 222(1-*n*) provide a variety of functions. For example, filers 222(1-*n*) communicate with cloud application servers 308(1-*e*) via private network 302, receive put object requests from cloud application servers 308(1-*e*), and store the objects in the file system on the associated mass data store 322. Filers 222(1-*n*) can also include services for encrypting and compressing the objects they receive inline prior to storage if desired. Filers 222(1-*n*) also receive get object requests from cloud object servers 310(1-*f*) to get objects stored therein. Responsive to a get object request, a filer 222 retrieves the requested objects and returns it to the requesting cloud object servers 310(1-*f*). Optionally, the objects can be decrypted and/or decompressed prior to providing them to cloud object servers 310(1-*f*). Alternatively, filers 222 can serve the objects in a compressed and/or encrypted form. Filers 222(1-*n*) also receive object delete requests from cloud application servers 308(1-*e*) to delete objects stored therein, and then delete the objects in response. Filers 222(1-*n*) can also receive put object requests, get object requests, and delete object requests from a cloud application servers 308 when that cloud application server 308 is performing a cloud maintenance service, such as filer rebalance, filer rebuild, object auditing, etc.

The storage node service(s) for each of filers 222(1-*n*) can be implemented using one or more Apache Tomcat™ web servers, which facilitate using customized storage algorithms implemented as Java™ servlets as well as on-the-fly object encryption, decryption, compression, and/or decompression. Additionally, other interface(s) (e.g., Samba etc.) can be employed to interface the web server and the file system. Filers 222 can also be mirrored for additional backup purposes, for example, using distributed replicated block device (DRBD) and software. Thus, filers 222(1-*n*) facilitate high-availability data storage and retrieval services for cloud 102.

Object databases 312(1-*g*) stores a plurality of object records for cloud 102. Each object record provides an object-filer map (along with other data) that identifies each of the filers 222(1-*n*) that a particular object has been stored on. Object tables are sharded into multiple shards that can be stored across multiple instances of object databases 312(1-*g*). Furthermore, the object records in Object databases 312(1-*g*) can be denormalized to facilitate rapid lookup of object information for a given object. Object databases 312(1-*g*) can be implemented using a simple key value store or a relational database. Object databases 312(1-*g*) will be described in greater detail below.

File system databases 314(1-*h*) store virtual file system information associated with clients 112(1-*b*) and local cloud 104. The virtual file system information stored in file system databases 314(1-*h*) is used by client application servers 304 (1-*c*) to present virtual file systems (e.g., directories with virtual objects, etc.) to clients 112 and/or to compare file systems with local cloud 104 for synchronization purposes. As will be described in more detail below, file system databases 314(1-*h*) can be normalized and can be implemented using a relational database (e.g., MySQL™). File system databases 314(1-*h*) will be described in greater detail below.

Configuration and monitoring servers 316(1-*i*) provide configuration and monitoring services to cloud 102 and maintain information that is used by the other elements of FIG. 3. For example, configuration and monitoring servers 316(1-*i*) facilitate the interaction of the elements of cloud 102, for example, by tracking the uniform resource locators (URLs) and/or network addresses of cloud elements and making such information available to the other elements of cloud 102. As another example, configuration and monitoring servers 316 (1-*i*) can track information about filers 222(1-*n*), including what filers 222(1-*n*) are operational, what filers 222(1-*n*) are busy, what filers 222(1-*n*) are read-only, the remaining storage capacity of filers 222(1-*n*), etc. Servers 316(1-*i*) can then make this information about filers 222(1-*n*) available to the other elements of cloud 102. Configuration and monitoring servers 316(1-*i*) can also log errors (e.g., an object that is uploaded already exists, an object requested for download does not exist, etc.) encountered by the elements of cloud 102 such that those errors can be rectified.

Configuration and monitoring servers 316(1-*i*) can be implemented in any combination of hardware, software, etc. In the present embodiment, configuration and monitoring servers 316(1-*i*) include the Apache Zookeeper™ coordination software developed and licensed by The Apache Software Foundation. Configuration and monitoring services can also be employed as desired using Java servlets.

As will be apparent from the above description, cloud 102 is implemented using HTTP. Using HTTP servers provides an advantage, because the servers are stateless and treat each request as an independent transaction. Additionally, using HTTP facilitates an easily scalable cloud infrastructure.

FIGS. 4A-4D show a plurality of exemplary tables 400A-400G stored in file system databases 314(1-h). The information contained in tables 400A-400G is used to implement virtual file systems for clients 112(1-b) and for local cloud 104.

Figure 4A:
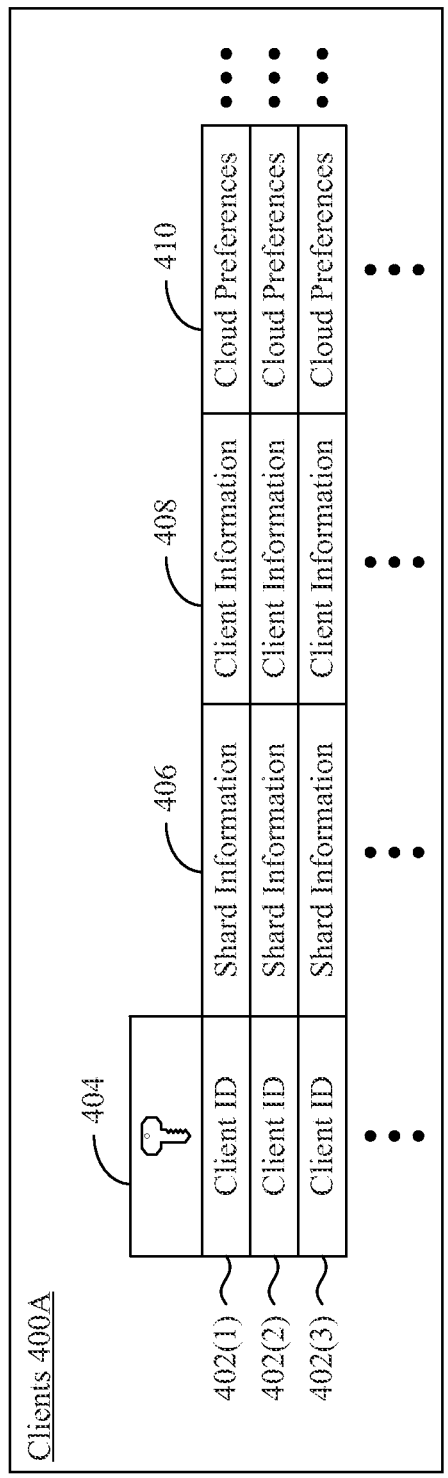
FIG. 4A shows an exemplary table of a file system database of FIG. 3 according to one embodiment of the present invention.

FIG. 4A shows a Clients table 400A including a plurality of exemplary client records 402 arranged as the rows of table 400A. However, only client records 402(1-3) are shown in detail. Each client record 402 includes a client ID field 404, a shard information field 406, a client information field 408, and a cloud preferences field 410.

Client ID field 404 is the key field for table 400A and uniquely identifies one of clients 112(1-b) or local cloud 104. Shard information field 406 provides shard information associated with a shard of tables 400B-400G, as will be described below. Shard information field 406 contains information sufficient to identify and access the particular shard of tables 400B-400G associated with the entity identified by client ID field 404. Shard information can include the name of the file system database shard, the network location of the filer system database server having access to the particular shard, the names of the tables in the particular shard, etc. Shard information field 406 can be implemented as multiple fields if desirable. Client information field 408 includes information (e.g., name, address, etc.) associated with entity identified by client ID field 404. Cloud preferences field 410 includes cloud preference information associated with the entity identified by client ID field 404. For example, cloud preferences 410 could include data indicative of the number of replicas of each object that the client wants stored in cloud 102. The content and number of fields 408 and 410 can also be customized as desired. The records 402 of clients table 400A can also include additional fields as desired.

Figure 4B:
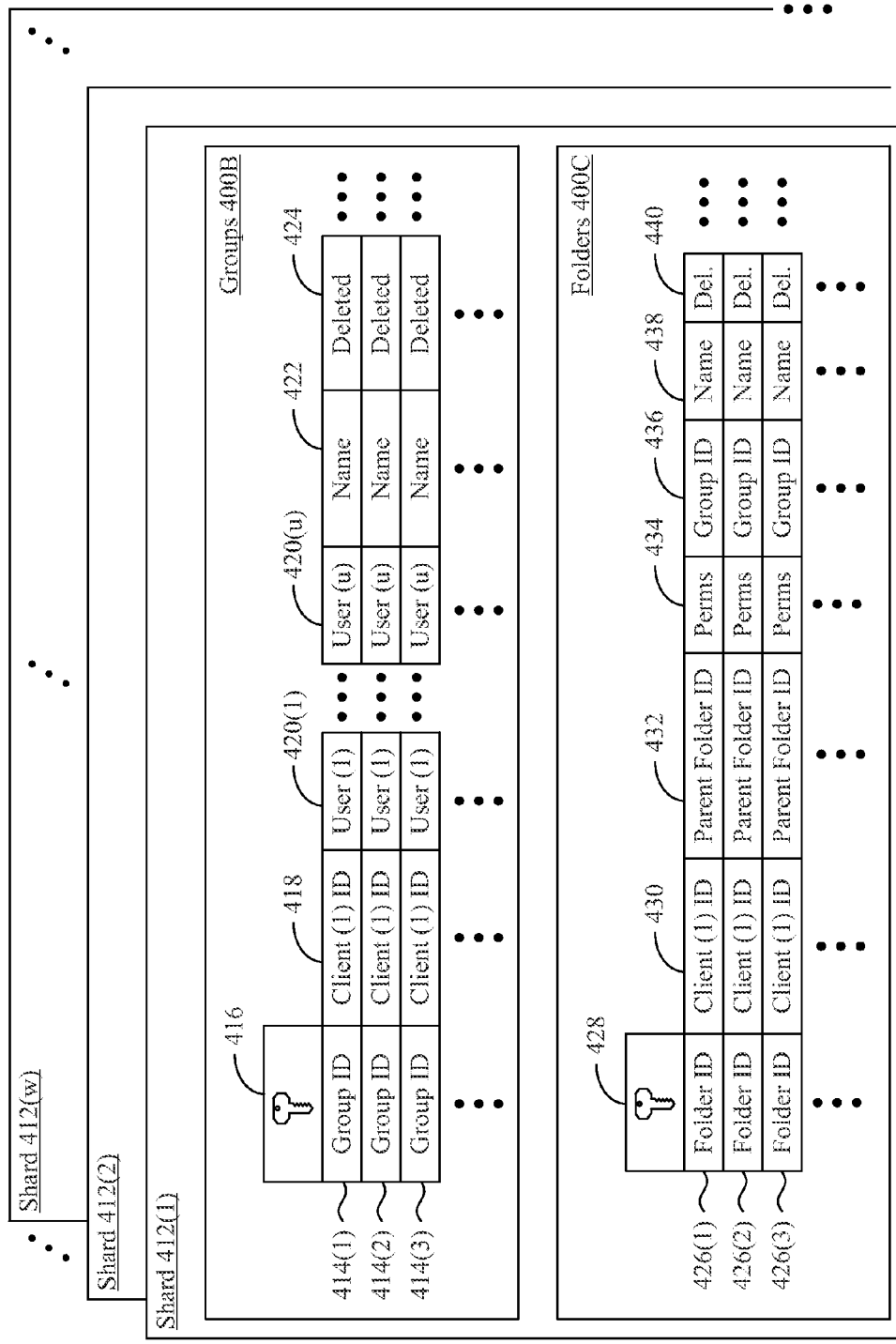
FIG. 4B shows a plurality of exemplary tables, sharded by client, of the file system databases of FIG. 4A.
Figure 4C:
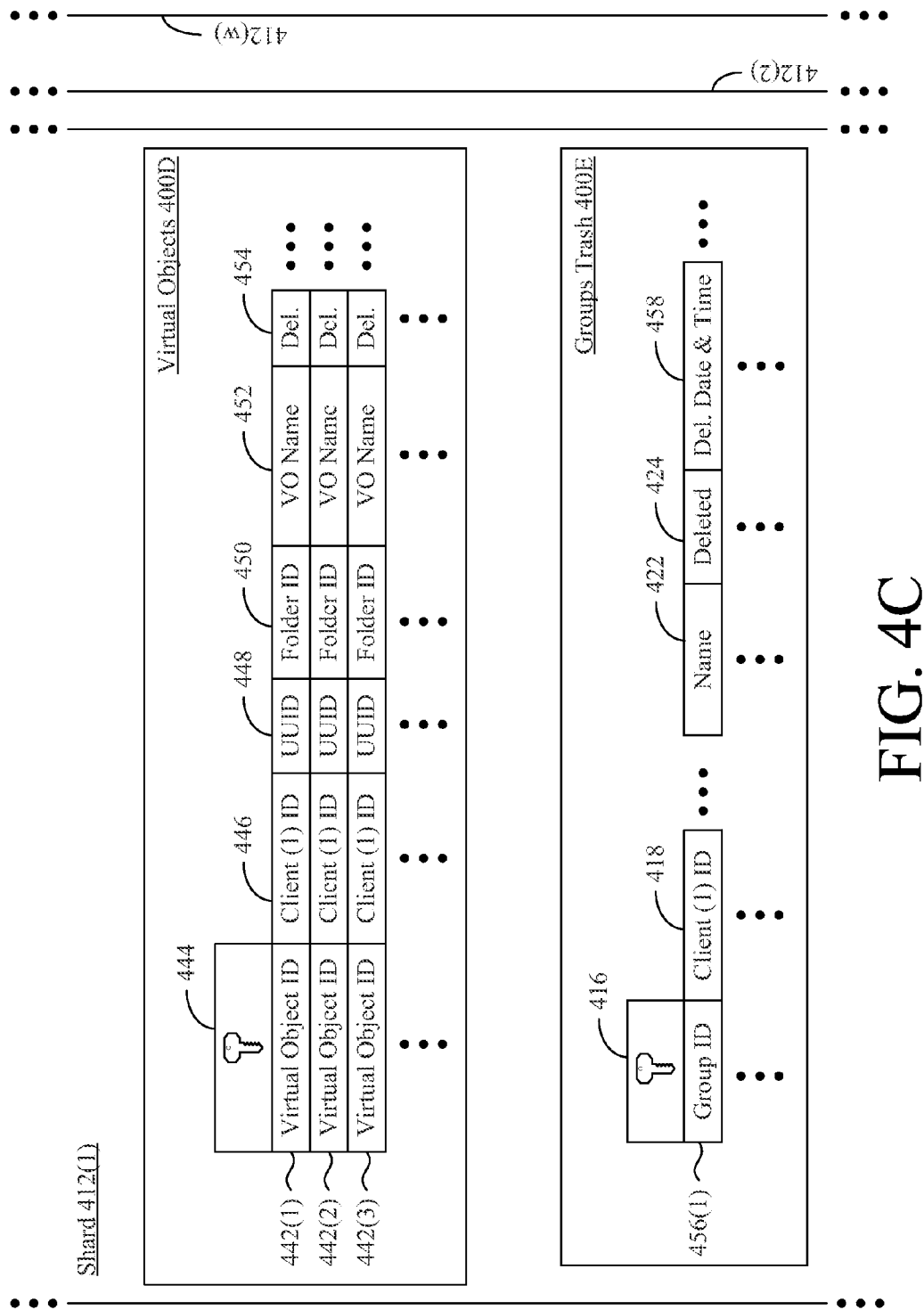
FIG. 4C shows another plurality of exemplary tables, sharded by client, of the file system databases of FIG. 4A.
Figure 4D:
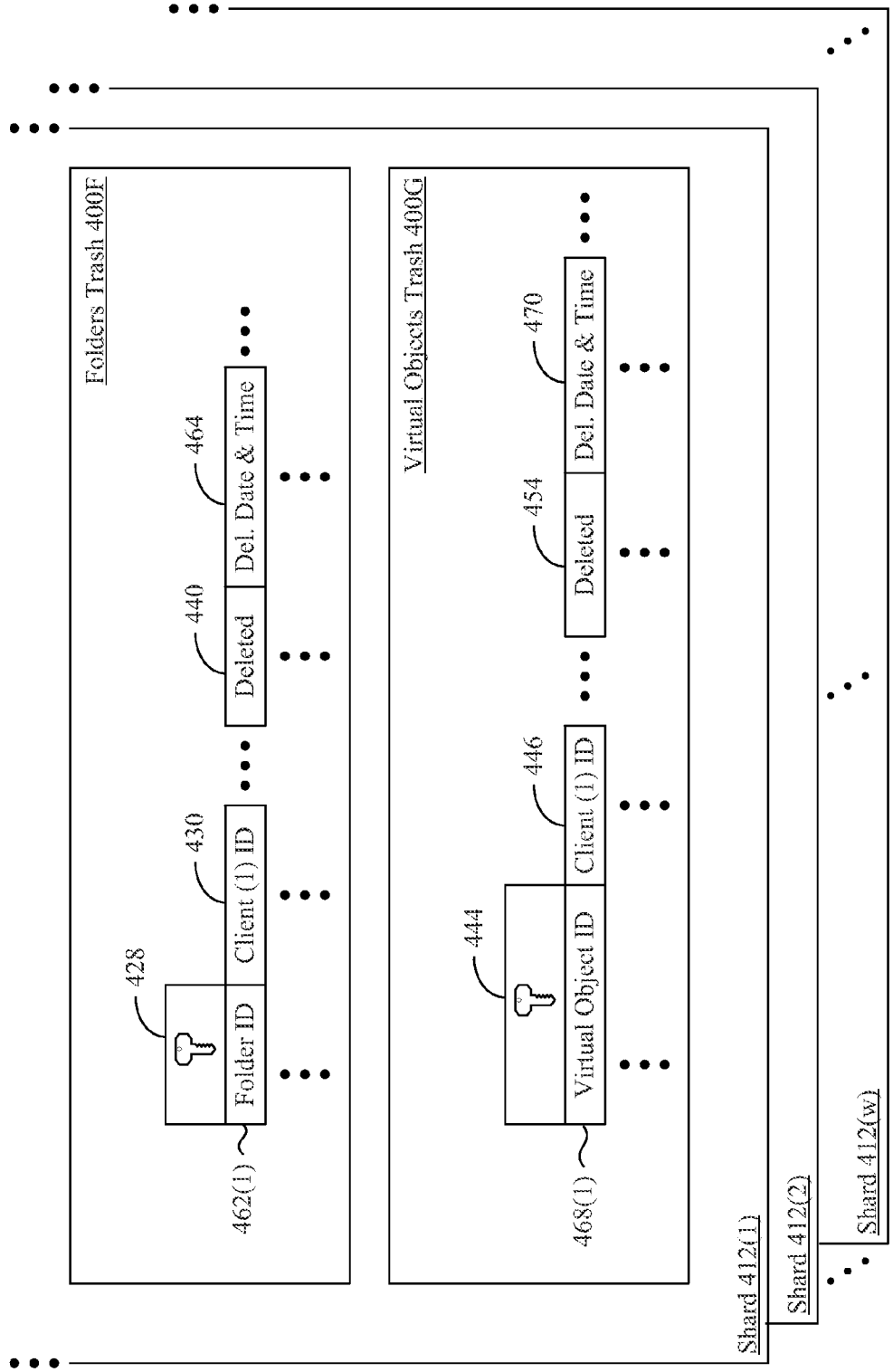
FIG. 4D shows still another plurality of exemplary tables, sharded by client, of the file system databases of FIG. 4A.

FIGS. 4B-4D show a plurality of exemplary tables 400B-400G stored in file system databases 314(1-h). FIGS. 4B-4D show that tables 400B-400G are horizontally sharded into a plurality of shards 412(1-w), where each shard 412 is associated with one of clients 112(1-b) and/or local cloud 104. In other words, all virtual file system data for one of clients 112(1-b) and/or local cloud 104 is located in one of shards 412(1-w). Each shard 412(1-w) can reside in any of file system databases 314(1-h), and there can be more than one shard 412(1-w) in each of file system databases 314(1-h). FIG. 4B shows that each shard 412(1-w) includes a groups table 400B and a folders table 400C. FIG. 4C shows that each shard 412(1-w) further includes a virtual objects table 400D and a groups trash table 400E. FIG. 4D shows that each shard 412(1-w) also includes a folders trash table 400F and a virtual objects trash table 400G.

Groups table 400B (FIG. 4B) includes a plurality of exemplary group records 414 arranged as the rows of table 400B. However, only group records 414(1-3) are shown in detail. Each group record 414 is shown to include a group ID field 416, a client ID field 418, a plurality of user fields 420(1-u), a group name field 422, and a deleted field 424. Group records 414 can include additional fields (e.g., a deleted data and time field, etc.) and/or the fields contained therein can be modified as determined to be desirable. All groups records 414 located in shard 412(1) are associated with a client (1).

Group ID field 416 contains a group identifier uniquely identifying the associated group record 414. Thus, group ID field 416 is the key field for groups table 400B. Client ID field 418 stores a client identifier that identifies the client 112 that the group record 414 is associated with. The client identifier stored in client ID field 418 corresponds with one of client records 402 of table 400A. User fields 420(1-u) identify a plurality of users that are associated with the group defined by group ID field 416. The users defined in user fields 420(1-u) are also associated with the client identified in client ID field 418 and are authorized by the client to access at least part of the client's virtual file system. (User information associated with user fields 420(1-u) could be contained in another table, which is not shown.) Group name field 422 includes data representing the name chosen for the group associated with the group record 414. Deleted field 424 is a flag that indicates if the associated group record 414 has been marked for deletion the client. If so, the associated group record 414 will be treated as no longer valid and the group record will be moved to the groups trash table 400E.

Folders table 400C (FIG. 4B) includes a plurality of exemplary folder records 426 arranged as the rows of table 400C. However, only folder records 426(1-3) are shown in detail. Each folder record 426 includes a folder ID field 428, a client ID field 430, a parent folder ID field 432, a permissions field 434, a group ID field 436, a folder name field 438, and a deleted field 440. Folder records 426 can include additional fields (e.g., a deleted data and time field, etc.) and/or the fields contained therein can be modified as determined to be desirable. All folder records 426 located in shard 412(1) are associated with a client (1).

Folder ID field 428 contains a folder identifier uniquely identifying the associated folder record 414. Thus, folder ID field 428 is the key field for folders table 400C. Client ID field 430 stores a client identifier that identifies the client 112 that the folder record 426 is associated with. The client identifier stored in client ID field 430 corresponds with one of client records 402 of clients table 400A. Parent folder ID field 432 contains a folder identifier identifying one of folder records 426 or the root directory that is the parent folder of the folder record 426. Parent folder ID fields 432 in folder records 426 facilitate construction of a virtual directory tree for each of clients 112(1-b) and/or local cloud 104. Permissions field 434 includes data defining permissions (e.g., read only, archive, etc.) for the folder associated with the folder record 426 and the objects stored in that folder. Group ID field 436 includes an identifier identifying one of group records 414 of a group that is authorized to access the folder of the associated folder record 426. Each folder record 426 may optionally include a plurality of group ID fields 436. Folder name field 438 includes data representing the name chosen for the folder associated with the folder record 426. Deleted field 440 is a flag that indicates if the associated folder record 426 has been marked for deletion by the client. If so, the associated folder record 426 will be moved to the folders trash table 400F and will not be displayed in the virtual file system.

Virtual objects table 400D (FIG. 4C) includes a plurality of exemplary virtual object records 442 arranged as the rows of table 400D. However, only Virtual Object records 442(1-3) are shown in detail. Each virtual object record 442 includes a virtual object ID field 444, a client ID field 446, a UUID field 448, a folder ID field 450, and a deleted field 452. All virtual object records 442 located in shard 412(1) are associated with a client (1).

Virtual object ID field 444 contains a virtual object identifier uniquely identifying the associated virtual object record 442. Thus, virtual object ID field 444 is the key field for virtual objects table 400D. Client ID field 446 stores a client identifier that identifies the client 112 that the virtual objects record 442 is associated with. The client identifier stored in client ID field 446 corresponds with one of client records 402 of clients table 400A. UUID field 448 contains the UUID associated with the virtual object record 442. The UUID associates the virtual object record 442 with an object record stored in object database 312 and, therefore, with an object stored in a plurality of filers 222(1-n). Folder ID field 450 contains a folder identifier identifying one of folder records 426 or the root directory. The identified folder record 426 represents the folder of the virtual file system containing the virtual object of the associated virtual object record 442. Thus, virtual object records 442 facilitate placement of virtual objects in the virtual directory tree defined by folder records 426. Object name field 452 includes data representing the name of the virtual object associated with the virtual object record 442. Deleted field 454 is a flag that indicates if the associated virtual object record 442 has been marked for deletion by the client. If so, the associated virtual object record 442 will be moved to the virtual objects trash table 400G and will not be displayed in the virtual file system.

Virtual object records 442 can include additional fields and/or the fields contained therein can be modified as determined to be desirable. For example, each virtual object record 442 can include a deleted data and time field to indicate the date and time the deleted field 454 was set. As another example, each virtual object record 442 can include a checksum/hash value that can be used to verify the integrity of the object stored on cloud 102 during upload and at later times, for example, when the object's integrity is being audited.

Groups trash table 400E (FIG. 4C) includes a plurality of exemplary group trash records 456 arranged as the rows of groups trash table 400E. However, only group trash record 456(1) is shown in detail. Each group trash record 456 corresponds to a group record 414 that has been marked for deletion (e.g., by setting deleted field 424 to a predetermined value, etc.) and moved to group trash table 400E. Each group trash record 456 is shown to also include a deleted date and time field 458 indicating the date and time that the associated group record 414 was marked for deletion. Like group records 414, group trash records 456 can include additional fields and/or the fields contained therein can be modified as determined to be desirable. All group trash records 456 located in shard 412(1) are associated with a client (1).

Folders trash table 400F (FIG. 4D) includes a plurality of exemplary folder trash records 462 arranged as the rows of folder trash table 400F. However, only folder trash record 462(1) is shown in detail. Each folder trash record 462 corresponds to a folder record 426 that has been marked for deletion (e.g., by setting deleted field 440 to a predetermined value, etc.) and moved to folder trash table 400F. Each folder trash record 462 also includes includes a deleted date and time field 464 indicating the date and time the associated folder record 426 was marked for deletion. Like folder records 426, folder trash records 462 can include additional fields and/or the fields contained therein can be modified as determined to be desirable. All folder trash records 462 located in shard 412(1) are associated with a client (1).

Virtual object trash table 400G (FIG. 4D) includes a plurality of exemplary virtual object trash records 468 arranged as the rows of virtual objects trash table 400G. However, only virtual object trash record 468(1) is shown in detail. Each virtual object trash record 468 corresponds to a virtual object record 442 that has been marked for deletion (e.g., by setting deleted field 454 to a predetermined value, etc.) and moved to virtual objects trash table 400G. Each virtual object trash record 468 also includes a deleted date and time field 470 indicating the date and time when the associated virtual object record 468 was marked for deletion. Like virtual object records 468, virtual object trash records 468 can include additional fields and/or the fields contained therein can be modified as determined to be desirable. All virtual object trash records 468 located in shard 412(1) are associated with a client (1).

Figure 5A:
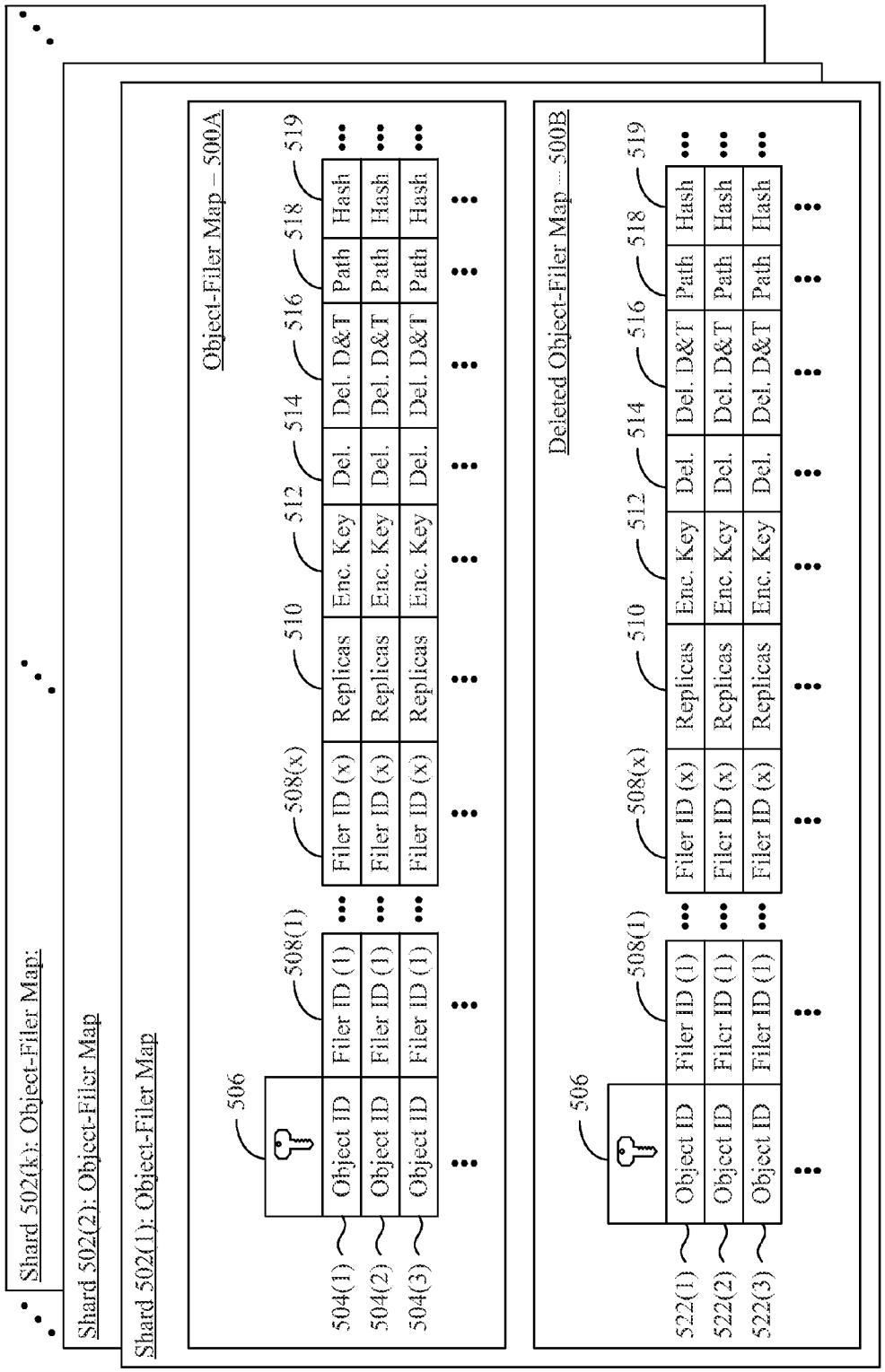
FIG. 5A shows exemplary tables of the object databases of FIG. 3 sharded into a plurality of shards.
Figure 5B:
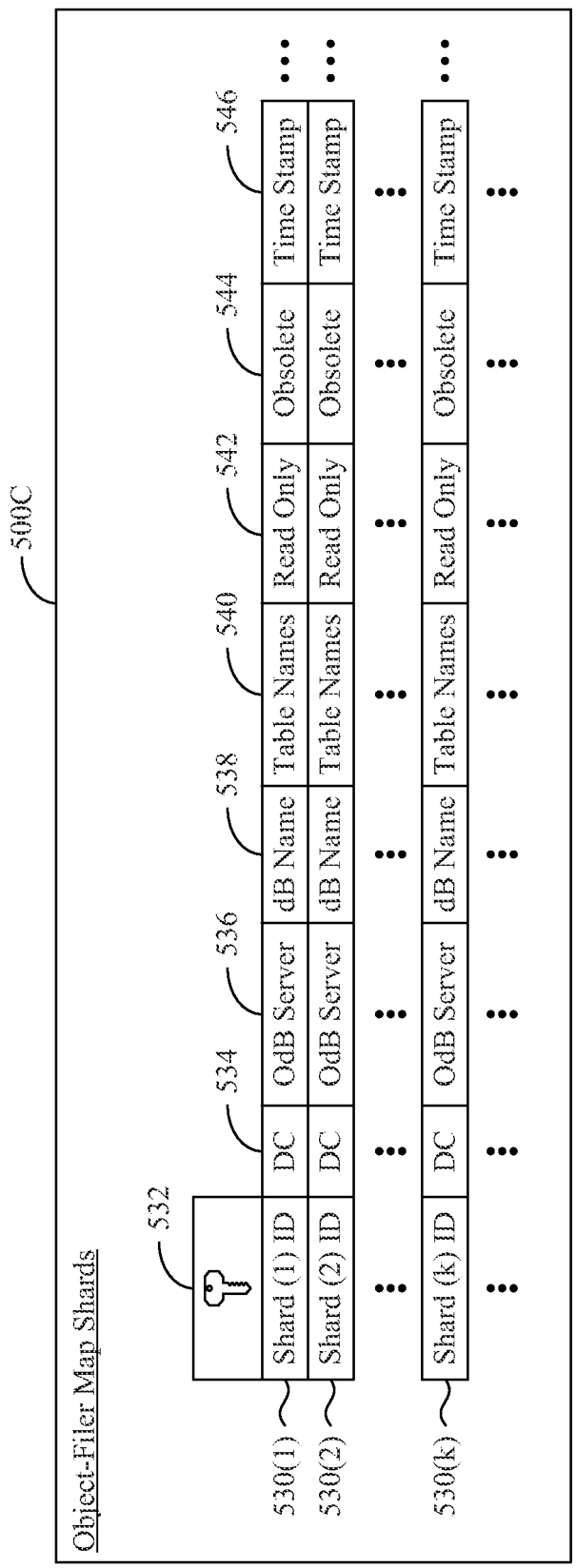
FIG. 5B shows another exemplary table of the object databases of FIG. 3.

FIGS. 5A-5C show a plurality of exemplary tables 500A-500D stored in object databases 312(1-g). FIG. 5A shows an object-filer map table 500A and a deleted object-filer map table 500B horizontally sharded into a plurality of object-filer map shards 502(1-k). In other words, each of shards 502(1-k) contain two tables: object-filer map table 500A and deleted object-filer map table 500B. Object-filer map table 500A and deleted object-filer map table 500B store the logical to physical (object ID to filer 222) object map. Each shard 502(1-k) can reside in any of object databases 312(1-g) and in any physical host, and there can be more than one shard 502(1-k) in each of object databases 312(1-g).

The object-filer map table 500A in each shard 502(1-k) contains a plurality of object records 504 arranged as the rows of table 500A. (Only the first three object records 504(1-3) are shown in detail.) Each object record 504 includes an object ID field 506, a plurality of filer ID fields 508(1-x), a replicas field 510, an encryption key field 512, a delete field 514, a delete date and time field 516, a path field 518, and a checksum/hash field 519. Each object record 504 in table 500A is associated with an object stored in cloud 102 on filers 222(1-n).

Figure 7:
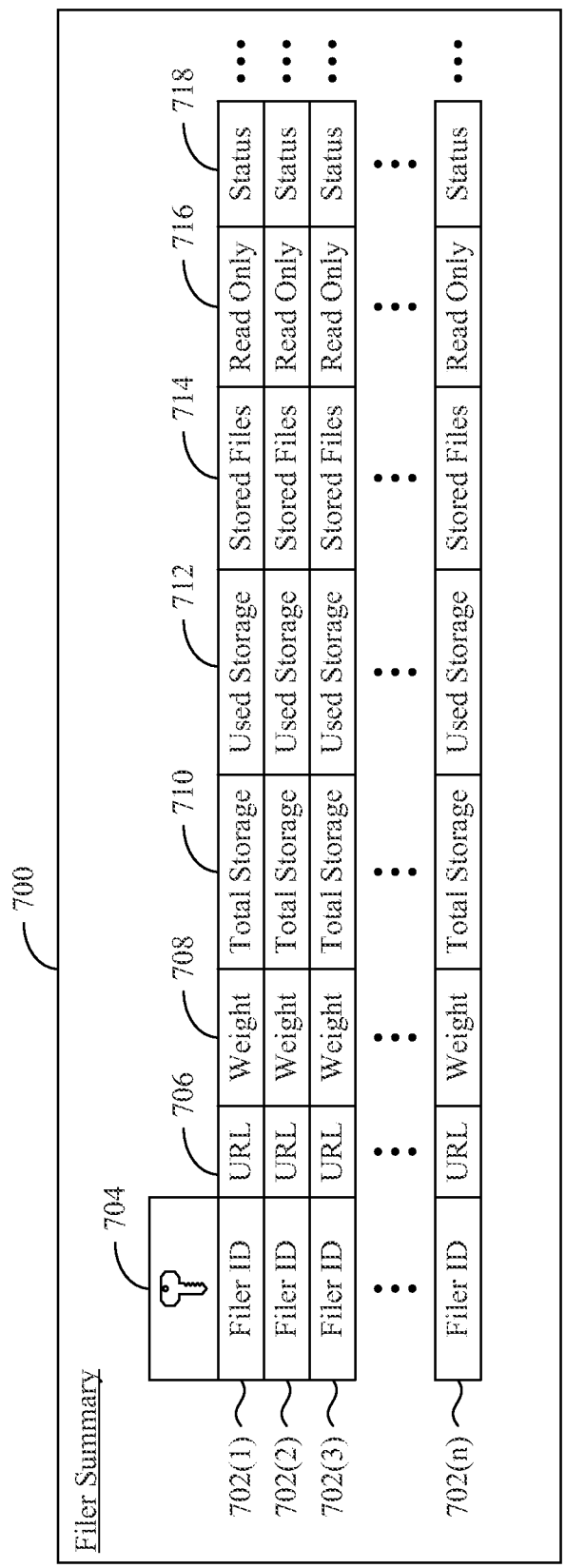
FIG. 7 shows a filer summary table storing a plurality of filer records associated with the filers of FIG. 3.

Object ID field 506 contains data uniquely identifying an associated object stored in some of filers 222(1-n). Filer ID fields 508(1-x) comprise a plurality of fields, where each field 508 includes a filer identifier uniquely identifying a filer record contained in a filer summary table (FIG. 7). As will be explained further below, because each filer record is associated with one of filers 222(1-n), the filer ID fields 508(1-x) associate the object record 504 with a plurality of filers 222(1-n) storing the object. The number of filer ID records 508 in an object record 504 can vary depending on the object replication policies of cloud 102, the client 112, and/or local cloud 104. Additionally, each object record 504 can include the same number of filer ID fields 508 or the number of filer ID fields 508 can vary from object record 504 to object record 504. Replicas field 510 contains data indicating the total number of replicas (copies) of the object associated with the object record 504 that exist across all filers 222(1-n). Encryption key field 512 stores an encryption key that can be used to decrypt the associated object if the object has been encrypted. Encryption key stored in Encryption Key field 512 can be provided by the client 112 (or one of its users) or it can be a key generated by an encryption key vault service that generates and/or accumulates encryption keys associated with a client 112 on behalf of the client 112. Delete field 514 includes data (e.g., a flag) that indicates if the associated object record 504 has been marked for deletion. If delete field 514 indicates that the object record 504 is marked for deletion, then the object record 504 will be moved to the deleted object-filer map table 500B. Delete date and time field 516 includes data indicating the date and time that the associated object record 504 was marked for deletion. Path field 518 includes data defining a path that is used to locate the object on any of the filers 222 associated with the filer ID fields 508(1-x). Once the filer 222 is identified and located on private network 302, the path field 518 provides the path to the object on that filer 222.

Each object record 504 can include additional and/or alternative fields as determined to be desirable. For example, object records 504 could include fields defining object attributes such as file size, date and time the object was uploaded to cloud 102, a compressed data size, etc. As another example, object records 504 can include information about the client 112, such as a group identifier (e.g., group ID 416). As yet another example, each object records 504 could include one or more checksum (hash) field(s) 519 used for verifying the file integrity at different times, such as when the object is uploaded to cloud 102 and/or to a filer 222 and when the object is downloaded to the client 112 or local cloud 104. The checksum/hash value(s) can also be used to facilitate faster access to the objects on the filers 222 and/or to find duplicate or similar objects and database records. For example, objects could be persisted on filers 222 in a folder structure hashed with the object ID 506 and/or the group ID 416 for faster access. SHA-512 is one particular hash function that can be employed and that is strong enough to facilitate identification of duplicate objects on cloud 102.

Object records 504 are created in table 500A as objects are uploaded to cloud 102. For each object uploaded to cloud 102, an object record 504 can be created for that object in any shard 502(1-k) accepting new object records 504 (e.g., shards that have read-write status, shards that are not marked as obsolete, etc.). Additionally, new shards 502(k+) can be added as necessary (e.g., when all of shards 502(1-k) are full or near full, when the last writable shard 502 is almost full, etc.). Thus, object databases 312 provide an important advantage in that they are highly scalable to meet increased demand.

Deleted Object-Filer Map table 500B includes a plurality of exemplary deleted object records 522 arranged as the rows of table 500B. (Only deleted object records 520(1-3) are shown in detail.) Each deleted object record 522 corresponds to one of object records 504 that was marked for deletion (e.g., by setting delete field 514 to a predetermined value, etc.). When an object record 504 is marked for deletion, the record 504 is removed from object-filer map table 500A, and a corresponding deleted object record 520 is created in deleted object-filer map table 500B. The deleted object record 522 includes the same fields as the corresponding object record 504. The deleted object-filer map table 500B facilitates rapid deletion of objects from filers 222(1-n) that are marked for deletion by cloud application servers 308(1-e).

FIG. 5B shows an object-filer map shards table 500C including a plurality of shard records 530(1-k). A shard record 530(1-k) exists in table 500C for each object-filer map shard 502(1-k) shown in FIG. 5A. Each shard record 530 includes a shard ID field 532, a data center field 534, an Odb server field 536, a database name field 538, a table names field 540, a read only field 542, an obsolete field 544, and a time stamp field 546.

Shard ID field 532 uniquely identifies one of shards 502 (1-k). The shard identifier is a globally unique identifier, which uniquely identifies the associated shard across cloud 102. Data center field 534 identifies one of the data centers 320(1-j) on which the associated shard 502 is stored. OdB server 536 identifies the database server having access to the object database 312 containing the associated shard 502. Database name field 538 includes data defining the name of the object database 312 containing the associated shard 502. Table names field 540 contains the names given to tables 500A and 500B in the associated shard 502. Read only field 542 indicates whether or not the tables 500A and 500B of the associated shard 502 are read-only. If the associated shard 502 is marked read only, then object-filer map table 500A cannot accept more object records 504. Obsolete field 544 contains data indicating whether or not the associated shard 502 is obsolete (e.g., no longer used by cloud 102, etc.). Time stamp field 546 includes data representing a time stamp of an event (e.g., the date and time the shard was created, etc.) pertaining to the associated shard 502.

New shard records 530(k+) can be added to shards table 500C as the number of shards 502(k+) are increased. Therefore, shards table 500C facilitates the scalability of cloud 102. It should also be noted that one or many instances of shards table 500C can be stored among object databases 312(1-g) as desired, so long as the records 530 between each instance of shards table 500C are the same. Because table 500C is a relatively small table, it can be cached for rapid access by various elements of cloud 102, for example, by cloud application servers 308(1-e).

FIG. 5C shows a filer rebuild table 500D that is sharded by filer 222. Because there are (n) filers, there are (n) filer rebuild shards 550(1-n). As new filers 222(n+) are added, additional filer rebuild shards 550(n+) are also added. Thus, filer rebuild table 500D is easily scalable. Instances of the complete rebuild table 500D can be stored among object databases 312(1-g) as desired. Additionally, different shards 550 of filer rebuild table 500D can be distributed throughout object databases 312(1-g) as desired. In such a case, another shards table could be beneficial to identify the locations of the filer rebuild shards 550.

Each shard 550(1-n) contains a plurality of object records 552 that are in the same format as object records 502 in table 500A. However, because the records 552 are sharded by filer 222(1-n), shard 550(1) only includes object records 552 for objects that are stored on filer 222(1). Similarly, shard 550(2) only includes object records 552 for objects that are stored on filer 222(2), and shard 550(n) only includes object records 552 for objects that are stored on filer 222(2). Filer rebuild table 500D can be used to reconstruct a filer 222 that has failed, according to a particular embodiment of the invention, described in more detail below. Because each object is stored on a plurality of filers 222(1-n), when one filer 222 fails, the filer rebuild shard 530 associated with the failed filer 222 can be used to track down replicas of the objects stored on the failed filer 222 on other filers 222, and then copy those objects to a new filer 222 used to rebuild the failed filer 222.

While FIGS. 5A-5C are discussed in terms of tables for clarity, it should be understood that object databases 312(1-g) can be implemented in various ways. For example, object databases 312(1-g) can be implemented using a key value store. The denormalized nature of the object records 504, deleted object records 522, shard records 530, and filer rebuild object records 552 facilitates the use of key-value stores with the present invention. Key value stores are also readily horizontally scalable as the data set grows, which enables cloud 102 to adapt to a growing client base. Object databases 312(1-g) can be implemented in relational database form as well.

It should also be noted that portions (e.g., all of, etc.) objects databases 312(1-g) can be replicated as desired. The replications can be implemented in cloud in a Master-Master or Master-Slave configuration.

FIG. 6 shows a data structure for a Universally-Unique Identifier (UUID) 600 according to one embodiment of the present invention. UUID 600 is a smart key that facilitates rapid object record lookup and includes a first field 602 and a second field 604. As indicated above, a UUID 600 is generated for each object stored in cloud 102 during the object upload process. The UUID for an object is stored in file system database 314 in the UUID field 448 of the virtual object record 442 associated with the object.

First field 602 of UUID 600 includes a shard identifier (e.g., an alpha-numeric key, etc.) associated with one of shard records 530(1-k), which in turn identifies one of object-filer map shards 502(1-k). Second field 604 stores an object identifier (e.g., an alpha-numeric key, etc.) uniquely identifying one of the objects records 504 in the object-filer map table 500A of the identified shard 502. Thus, given a UUID 600, the filers 222(1-n) containing the associated object can be quickly determined. Specifically, given the shard ID in field 602, the object-filer map shard 502(1-k) containing the object record identified in second field 604 can be quickly identified and accessed via the shard records 530(1-k) in shards table 500C. Once the shard 502 is accessed, the object record 504 identified by the object identifier in the second field 604 of UUID 600 can be located and the filers 222(1, . . . , x) storing the object can be determined from fields 508(1-x). The object can then be located on any of the identified filers 222(1, . . . , x) for subsequent use (e.g., providing to the client 112 or local cloud 104, marking the object for deletion, etc.).

Notably, object-filer map table 500A is denormalized so the filer identifiers 508(1-x) can be determined with only one access of an object-filer map shard 502(1-k). Additionally, caching the shards table 500C would further speed up filer identification and object access. It should be noted that the UUID 600 can also be used to locate a deleted object record 522 in deleted object-filer map table 500B if the identified object record 504 has already been marked for deletion.

FIG. 7 shows a filer summary table 700 storing a plurality of filer records 702(1-n) that are associated with filers 222(1-n). Each filer record 702(1-n) comprises a row of filer summary table 700. Each filer record 702 includes a filer ID field 704, a URL field 706, a weight field 708, a total storage field 710, a used storage field 712, a stored files field 714, a read only field 716, and a status field 718. Each filer record 702(1-n) may include additional and/or alternative fields as determined to be desirable. In the present embodiment, filer summary table 700 is a table maintained by configuration and monitoring servers 316(1-i), and accessible to cloud application servers 308(1-e), cloud object servers 310(1-f), and any other element of cloud 102 as desired.

Filer ID field 704 is the key field of the filer summary record 702 and includes data uniquely identifying an associated one of filers 222(1-n). URL field 706 includes data (a URL, IP address, port, etc.) for identifying and communicating with an associated filer 222 on private network 302. Weight field 708 includes data prioritizing the associated filer 222 among the pool of filers 222(1-n). For example, a filer 222 having a higher weight could have priority for storing new objects. A filer 222 having a lower weight could have priority for getting previously-stored objects. As another example, each filer record 702 could include a plurality of weight fields each storing a weight associated with a different filer action. Total storage field 710 represents the total amount of data that can be stored on the mass data store 322 associated with the filer 222, and used storage field 712 represents the amount of mass data store that is currently used. Total storage field 710 and used storage field 712 facilitate determining how "full" the associated filer 222 is, which in turn, can be used to determine if the associated filer 222 should be marked read only. Stored files field 714 includes data indicating the number of objects that are stored on the mass data store 322 of the associated filer 222, which can also be used to determine if the associated filer 222 should be marked read only. Read only field 716 includes data (e.g., a flag) that indicates if the associated filer 222 is marked read-only. Making a filer 222 read only is important if the filer 222 is filled past a predetermined amount (e.g., within 100-200 GB of being full) or if the filer 222 contains so many files that it is being accessed too often and is becoming a hot spot. If objects are migrated from a filer 222, or space is otherwise freed up, a filer 222 can be changed back to read-write status. The inventors have determined that it is beneficial to have enough filers 222(1-n) such that five to six of them are writable at any given time. Status field 718 includes data that indicates the status of the associated filer 222. For example, different data in status field 718 can indicate that the associated filer 222 is working fine, busy, asleep, off-line, undergoing maintenance, etc.

Filer Summary table 700 advantageously facilitates the horizontal data scalability of cloud 102. For example, as filers 222(n+) are added to cloud, filer summary records 702(n+) can be added to table 700 such that the elements of cloud 102 can interact with the newly-added filers 222(n+). Furthermore, because filer summary table 700 is relatively short, filer summary table 700 can be cached by the various elements of cloud 102 (e.g., by cloud application servers 308(1-e), cloud object servers 310(1-f), configuration and monitoring servers 316(1-i), etc.) as needed to facilitate rapid access to filers 222(1-n).

Figure 8:
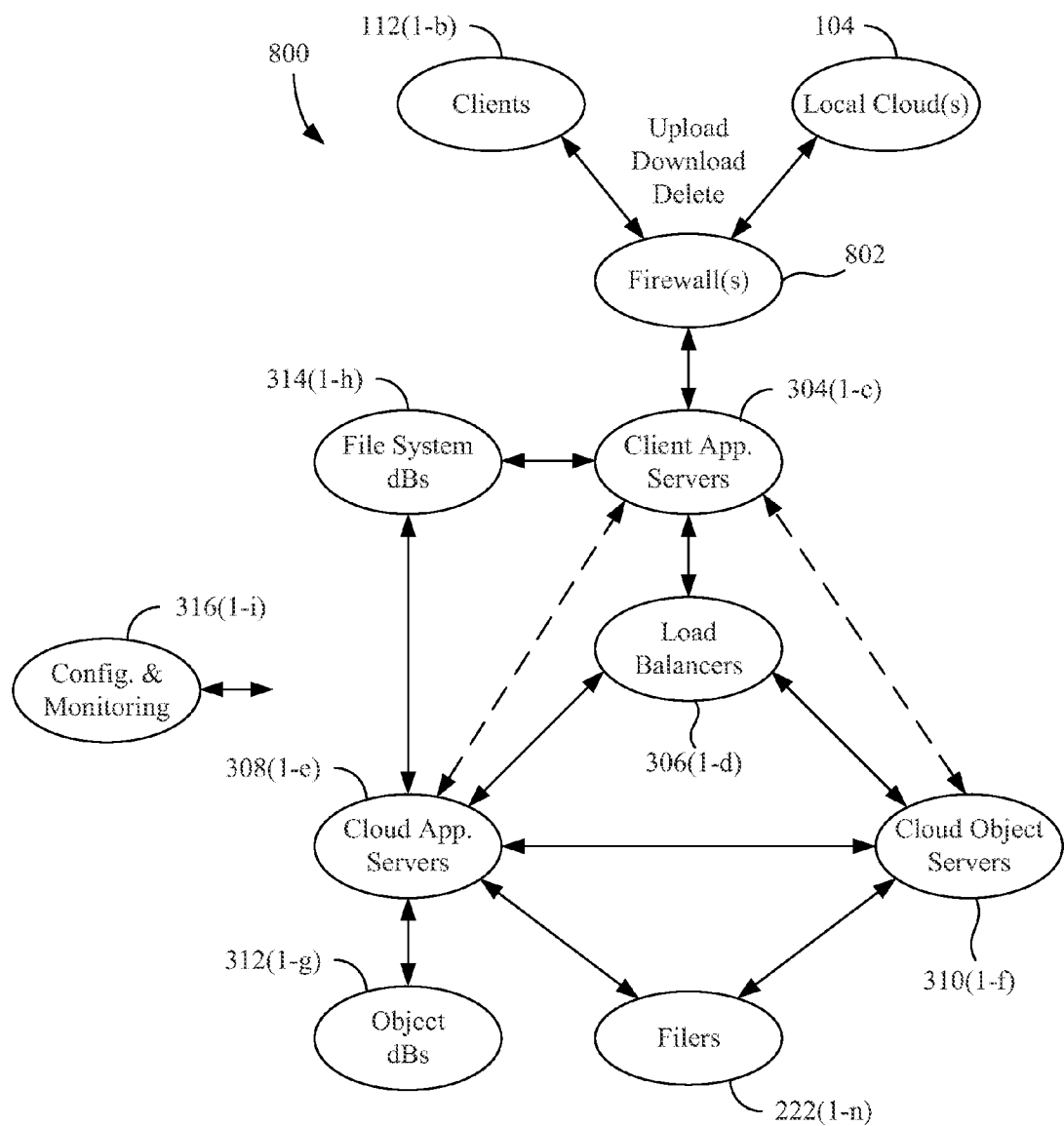
FIG. 8 is a relational diagram illustrating the operational relationships between the elements of FIG. 3.

FIG. 8 is a relational diagram 800 illustrating the operational relationships between the elements of cloud 102 shown in FIG. 3. Clients 112(1-b) and local cloud 104 interact with client application servers 304(1-c) through one or more firewalls 802. Clients 112(1-b) generate object upload commands, object download commands, and object delete commands to client application servers 304(1-c). Clients 112(1-b) also upload objects to and receive objects from client application servers 304(1-c). Local cloud 104 interacts with client application servers 304(1-c) to synchronize the file system on the local cloud 104 with a mirrored file system on cloud 102. Accordingly, client application servers 304(1-c) provide a portal for this synchronization to occur. Client application servers 304(1-c) and local cloud 104 cooperate to determine changes that need to be made to the file system on cloud 102 based on the local file system on local cloud 104, and then client application server 304(1-c) carries out the changes in cloud 102.

Client application servers 304(1-c) also provide portals for clients 112(1-b) to interact with their virtual file systems. When a client 112(1-b) and a client application servers 304(1-c) have established a network connection, the client application server 304 queries one or more of file system databases 314(1-h) for virtual file system information for the client 112 and provides the virtual file system information to the client 112. Client application server 304 also receives upload, download, and delete commands from client 112 to make changes to the virtual file system. Responsive to an upload command, client application server 304 creates a new virtual object record 442 in file system database 314, generates an upload request, and issues the upload request to one of load balancers 306(1-d). Responsive to a download command, client application server 304 accesses file system database 314 to obtain a UUID 600 from UUID field 448 of a virtual object record 442, generates a download request, and issues the download request to one of load balancers 306(1-d). Responsive to a delete command, client application server 304 interacts with file system database 304(1-h) to cause the virtual object record 442 to be marked as deleted in the virtual file system.

Client application servers 304(1-c) also interact with file system databases 304(1-h) to modify the virtual file systems for clients 112(1-b) in response to other commands (e.g., move commands, new folder commands, etc.). For example, client application servers 304(1-c) can create and modify folder records 426 as needed. As another example, client application servers 304(1-c) can receive commands from clients 112(1-b) to define new groups and create new group records 414 and/or to modify existing group records 414. Client application servers 304(1-*c*) also interact with clients 112 and local clouds 104 to add new clients 112 and/or local clouds 104 to the system.

Load balancers 306(1-*d*) interact with client application servers 304(1-*c*), cloud application servers 308(1-*e*) and cloud object servers 310(1-*f*). Load balancers 306(1-*d*) receive upload and download requests from client application servers 304(1-*c*) and provide the upload and download requests to cloud application servers 308(1-*f*) and cloud object servers 310(1-*f*), respectively. In the case that load balancers 306(1-*d*) act as proxies, load balancers 306(1-*d*) also receive communications from cloud application servers 308(1-*e*) and cloud object servers 310(1-*f*) in response to the requests, and forwards those communications to the appropriate client application servers 304(1-*c*). If load balancers 306(1-*d*) do not proxy communications, cloud application servers 308(1-*e*) and cloud object servers 310(1-*f*) can instead communicate directly with client application servers 304(1-*c*), as shown by the broken lines in FIG. 8.

When a load balancer 306 receives an upload request from a client application server 304, load balancer 306 provides the upload request to one of cloud application servers 308(1-*e*) for further processing. The load balancer 306 can also receive a QUID generated by the cloud application server 308 and provide the UUID to the client application server 304 so it can be stored in an associated virtual object record 442 of one of file system databases 314(1-*h*). The load balancer can also provide the uploaded file from the client application server 304 to the cloud application server 308. If the load balancer 306 does not act as a proxy, the client application server 304 and the cloud application server 308 can communicate directly. When a load balancer 306 receives a download request from a client application server 304, load balancer 306 provides the download request to one of cloud object servers 310(1-*f*) for further processing. Load balancer 306 also receives the requested object from the cloud object server 310 and provides it to the client application server 304. If the load balancer 306 does not act as a proxy, the client application server 304 and the cloud object server 310 can communicate directly.

Load balancers 306(1-*d*) distribute the upload requests among the cloud application servers 308(1-*e*) to maintain service performance for clients 112(1-*b*) and local cloud 104 and to not overwhelm any one cloud application server 308. Similarly, load balancers 306(1-*d*) distribute download requests among cloud object servers 310(1-*f*) for the same reasons.

Cloud application servers 308(1-*e*) interact with load balancers 306(1-*d*), cloud object servers 310(1-*f*), object databases 312(1-*g*), file system databases 314(1-*h*), configuration and monitoring servers 316(1-*i*), filers 222(1-*n*), and optionally client application servers 304(1-*c*). Cloud application servers 308(1-*e*) intercommunicate with load balancers 306 (1-*d*) and client application servers 304(1-*c*) to carry out object uploads from clients 112(1-*b*) and/or for synchronization purposes with local cloud 104. Cloud application servers 308(1-*e*) intercommunicate with cloud object servers 310(1-*f*) to receive object information requests for the filers 222(1-*n*) on which an object has been previously stored on and for providing the requested information. Cloud application servers 308(1-*e*) also interact with object databases 312(1-*g*) to carry out its various services (e.g., object upload, object delete, filer maintenance, etc.). Cloud application servers 308 (1-*e*) also interact with file system databases 314(1-*h*) (either directly or via client application servers 304(1-*c*)) to determine which virtual objects have been marked for deletion by clients 112(1-*b*) or from the synchronization process with local cloud 104. Cloud application servers 308(1-*e*) are also capable of interacting with filers 222(1-*n*) to upload objects thereto, to delete objects therefrom, and to carry out filer maintenance routines, such as rebuilding and rebalancing filers 222(1-*n*). Cloud application servers 308(1-*e*) further interact with configuration and monitoring servers 316(1-*i*) to coordinate their operation with other elements of cloud 102, for example, to determine available filers 222(1-*n*) to stream an object to during upload.

Cloud object servers 310(1-*f*) interact with load balancers 306(1-*d*), cloud application servers 308(1-*e*), filers 222(1-*n*), and (optionally) with client application servers 304(1-*c*). Cloud object servers 310(1-*f*) intercommunicate with load balancers 306(1-*d*) and client application servers 304(1-*c*) to carry out object download requests. Cloud object servers 310(1-*f*) also query cloud application servers 308(1-*e*) to request object information for the filers 222(1-*n*) on which an object requested for download is stored. Cloud object servers 310(1-*f*) also interact with filers 222(1-*n*) to retrieve objects requested by clients 112(1-*b*) in download requests. Once an object is retrieved, the cloud object servers 310 provides the retrieved object to a load balancer 306 to be passed to the client 112 or local cloud 104. Alternatively, cloud object servers 310(1-*f*) can communicate with client application servers 304(1-*c*) directly once the download requests have been distributed by load balancers 306(1-*d*). Cloud object servers 310(1-*f*) can also interact with configuration and monitoring servers 316(1-*i*) to coordinate their operation with other elements of cloud 102, for example, to determine which filers 222, selected from the ones identified as storing a requested object, are available.

Object databases 312(1-*g*) store object records associated with the objects stored on filers 222(1-*n*). When object databases 312(1-*g*) are queried by cloud application servers 308 (1-*e*), object databases 312(1-*g*) return the desired object information. Object databases 312(1-*g*) also receive commands from cloud application servers 308(1-*e*) to carry out various database operations (e.g., creating a new object record 504, updating the information in an existing object record 504, creating a new object-filer map shard 502, etc.).

File system databases 314(1-*h*) interact with client application servers 304(1-*c*) and cloud application servers 308(1-*e*) regarding the virtual file systems associated with clients 112(1-*b*) and local cloud(s) 104. File system databases 314 (1-*h*) interact with client application servers 304(1-*c*) when client application servers 304(1-*c*) need to access or update the virtual file system associated with a client 112 or local cloud 104. File system databases 314(1-*h*) interact with cloud application servers 308(1-*e*) when cloud application servers 308(1-*e*) need access to the virtual file system to determine, via virtual objects trash records 468 in virtual objects trash table, 400G, which virtual objects have been marked for deletion.

Filers 222(1-*n*) interact with cloud application servers 308 (1-*e*), cloud object servers 310(1-*f*), and configuration and monitoring servers 316(1-*i*). Filers 222(1-*n*) communicate with cloud application servers 308(1-*e*) to receive and store objects uploaded by clients 112(1-*b*) and/or objects uploaded during a synchronization with local cloud 104. Filers 222(1-*n*) also intercommunicate with cloud application servers 308 (1-*e*) to delete objects stored on filers 222(1-*n*) and when cloud application servers 308(1-*e*) are performing filer maintenance routines (e.g., rebuilding, rebalancing, object auditing, etc.). Filers 222(1-*n*) also interact with cloud object servers 310(1-*f*) to serve objects requested by cloud object servers 310(1-*f*) for download requests. Filers 222(1-*n*) also interact with configuration and monitoring servers 316(1-*i*) to provide information regarding their operational states (e.g., filer up, filer down, filer busy, filer read-only, etc.) to configuration monitoring servers 316(1-*i*).

Configuration and monitoring servers 316(1-*i*) interact with all the elements of cloud 102 as needed to ensure that those elements can cooperate to carry out their particular functions. For example, servers 316(1-*i*) can track the current status of filers 222(1-*n*) regarding whether the filers are on-line, off-line, read-only, etc. Servers 316(1-*i*) can also gather and display statistics of all elements of cloud 102, for example, their current duty cycles, latencies, etc. Servers 316(1-*i*) can also track private network parameters (e.g., URLs of the elements, etc.) and update configuration settings for the cloud elements as needed to maintain communication between the cloud elements via private network 302.

Figure 9:
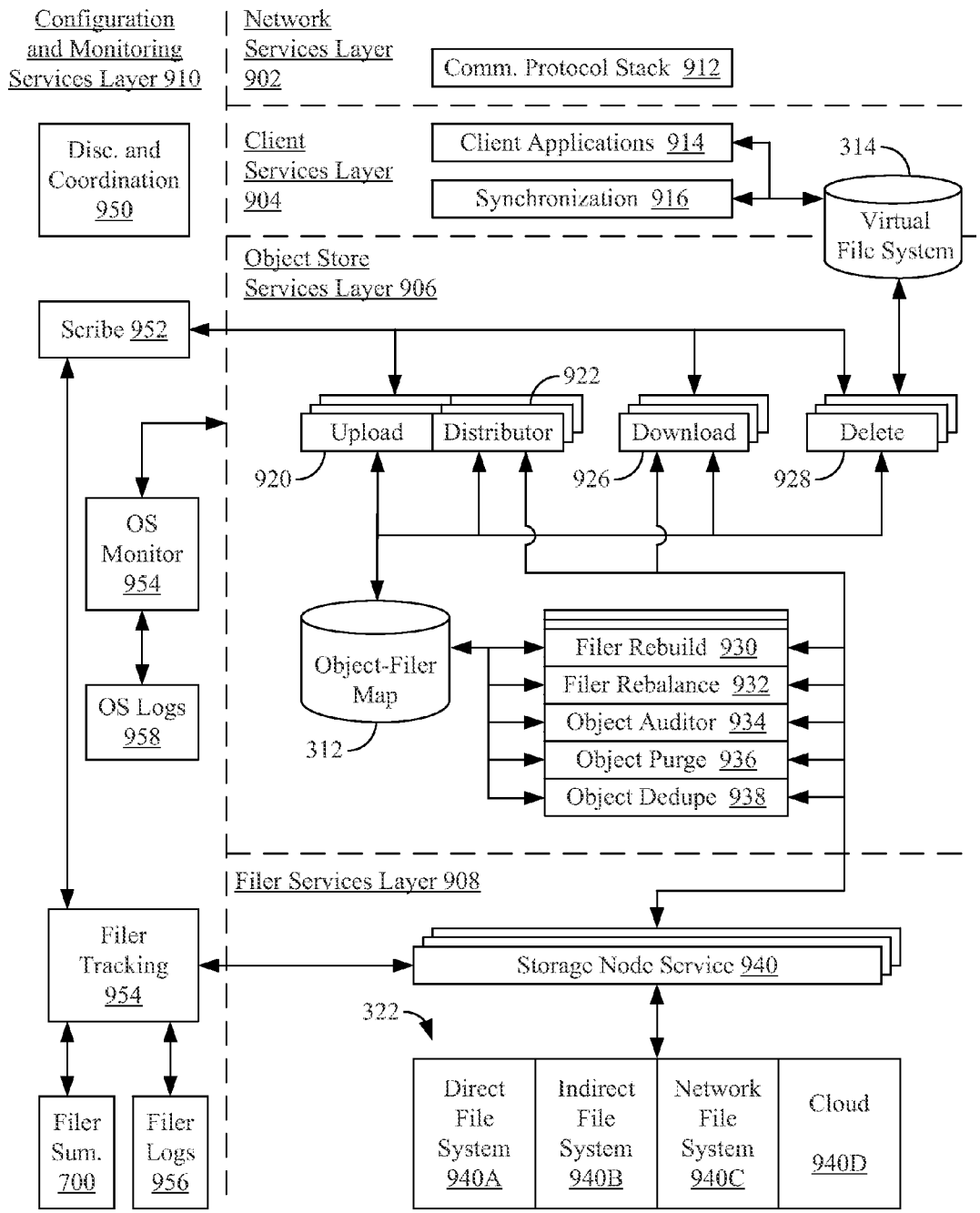
FIG. 9 illustrates the operational layers and services of the cloud infrastructure of FIG. 3.

FIG. 9 illustrates the operational layers of cloud 102, including a network services layer 902, a client services layer 904, an object store services layer 906, a filer services layer 908, and a configuration and monitoring services layer 910.

Network services layer 902 includes services that facilitate communication between cloud 102 and each of clients 112 (1-*b*) and local cloud 104 via Internet 106 and connections 116(1-*b*). In the present embodiment, network services layer 902 is shown to include a communications protocol stack 912. Communications protocol stack 912 can be, for example, a TCP/IP stack as are well-known in the art. Network services layer 902 can also include other networking services and protocols, such as NetBIOS, Samba, etc., that facilitate communications over private network 302.

Client services layer 904 includes client applications 914 and a synchronization (sync) service 916. Client applications 914 permit each client 112 to log into cloud 102 (e.g., by providing a username and password, undergoing an Identity Provider (IDP) security process, etc.) and to interface with its virtual file system, as defined by data for the client 112 in file system database 314. Client applications 914 also allow the client 112 to provide commands for modifying file system database 314 and its virtual file system. Client applications 914 also permits client 112 to upload an object to cloud 102, to download an object from cloud 102, and delete an object from cloud 102 by way of interacting with the virtual file system. The sync service 916 synchronizes a client's files on cloud 102 with the client's files on local cloud 104 by recording the file system changes in the virtual file system and by using the services of the object store services layer 906 to exchange the data objects (e.g., upload service, download service, etc.). The sync service 916 can also involve various security and/or verification processes prior to syncing with local cloud 104.

Object store services layer 908 consists of a set of services that provide the object storage functionality of cloud 102 and other cloud maintenance services. Object store services layer 908 includes an upload service 920 that causes an object to be uploaded to cloud 102. Upload service 920 is implemented in cloud application servers 308(1-*e*). Additionally, multiple upload services 920 can be running concurrently on the same cloud application server 308(1-*e*).

Responsive to an upload request from client services layer 904, upload service 920 causes an object to be received from client services layer 904 and stored (replicated) on a plurality of filers 222(1-*n*). For each object uploaded, upload service 920 generates a new object record 504 and UUID 600 and communicates the UUID 600 to client services layer 904, which causes the UUID to be stored with the associated virtual object record 442 in the virtual file system 918.

A call to the upload service 920 also calls the distributor service 922. The distributor service 922 utilizes information from the configuration and monitoring services layer 910 (e.g., a filer summary table 700, etc.) to identify a set of available ones of filers 222(1-*n*) and to provide the set of available filers 222 to upload service 920. Using a single call to call both upload service 920 and distributor service 922 increases the efficiency of uploading an object because a call is eliminated.

Upload service 920 selects a plurality (r) of filers 222 from the set of available filers 222 returned by distributor service 922 and streams the uploaded file to the selected (r) filers 222. The object can optionally be streamed to two or more of the selected (r) filers 222 concurrently. If one of the selected filers 222 returns an error (e.g., object already exists), then upload service 920 selects a new filer 222 and writes a replica of the object to that filer 222 instead. The upload service 920 also records the filer identifiers for the (r) selected filers 222 in filer ID fields 508(1-*x*) and the object path 518 to the object on each of the (r) selected filers 222 in the object record 504 created for the uploaded object in the object filer map 500. Upload service 920 provides any errors returned by the filers 222 during the upload service to configuration and monitoring services layer 910.

Upload service 920 can also be capable of performing several object integrity routines. For example, the upload service 920 can calculate a checksum/hash on the object as it is being streamed to the (r) selected filers 222 and store it in checksum/hash field 519 of the associated object record 504. Upload service 920 can provide this checksum to client services layer 904 for comparison with a checksum calculated in that layer to ensure integrity of the uploaded object. Similarly, upload service 920 can also provide its checksum and the object path on the selected (r) filers 222 to configuration and monitoring services layer 910 for a comparison with a checksum calculated by filer services layer 908.

Distributor service 922 will now be further described. Distributor service utilizes filer summary table 700 to identify available filers 222(1-*n*) and then provides a list of the available filers to upload service 920. As indicated above, filers 222(1-*n*) can be marked read-only if they become too full by way of field 716 in table 700. Therefore, distributor service 922 disregards the read-only filers 222(1-*n*) in the set of available filers 222 it provides to upload service 920. If a read-only filer 222 later has its status changed back to read-write, then distributor service 922 would again consider that filer 222 for object uploads. Distributor service 922 can also use weight fields 708 in filer summary table 700 and a weighting scheme (e.g., fill empty filers first, etc.) to create its set of available filers 222. Upload service 920 would then select the (r) filers 222 from the weighted set to implement the filer hierarchy. Alternatively, distributor 222 can employ a round robin scheme (not weighted) to return its set of available filers 222. As another option, Fisher-Yates shuffling of filers 222 between upload processes can be used to avoid a "thundering herd" situation at one of the filers 222.

The distributor service 922 provides several advantages. For example, the distributor service 922 can optimize the number of files and the amount of used storage on each filer 222. Additionally, distributor 922 can prioritize filers 222, for example, to fill new filers first. Offline and read-only filers 22 are automatically not considered for object upload, reducing errors. Distributor service 922 also avoids too many concurrent writes to one filer 222.

It should also be noted that distributor service 922 is optional. For example, upload service 920 might simply send an object put request to all filers 222(1-*n*) and complete the object put request with the first (r) filers 222 that answer. The other filer connections 222 would get dropped. This has the advantage of less filer tracking, instantaneous load balancing, and instantaneous failover.

Object store services layer 908 also includes a download service 920 that causes an object to be retrieved from one of filers 222. Download service 920 is implemented for clients 112 and local cloud 104 by cloud object servers 308(1-e) to facilitate rapid downloading of objects from cloud 102. Download service 920 can also be implemented in cloud application servers 308(1-e) to facilitate cloud maintenance applications (e.g., filer rebalance, filer rebuild, etc.). Additionally, multiple download services 926 can be running concurrently on the same cloud object server 310(1-f) and/or cloud application server 308(1-e).

Download service 926 downloads an object from one of the filers 222(1-n) storing the object. In response to a download request (including a UUID 600) from client services layer 904, download service 926 uses the UUID 600 and information contained in object database 312 to identify the filers 222 storing the associated object. Download service 926 can then uses filer records 702 in the filer summary table 700 to retrieve the object from any filer 222 storing the object.

Object store services layer 908 also includes a delete service 928 that causes object records 504 in object databases 312(1-g) to be marked for deletion based on the virtual object trash records 468 in file system databases 314(1-h). In the present embodiment, delete service 928 is implemented by cloud application servers 308(1-e). Multiple delete services 928 can be running concurrently on the same cloud application server 308(1-e).

Delete service 928 utilizes virtual object trash records 468 in file system databases 314(1-h) to determine which virtual objects have been deleted from virtual file system. For each virtual object trash record 468, delete service 928 obtains its UUID 600 from UUID field 448 in the virtual object trash record 468. Delete service 928 then uses the UUID 600 to locate an associated object record 504 in the object databases 312(1-g). Delete service 928 then modifies the associated object record 504 to indicate that the object is marked for deletion and optionally deletes the associated virtual object trash record 468.

Object store services layer 906 also includes filer rebuild service 930, which enables a partially or fully failed filer 222 to be recovered. Filer rebuild service 930 is implemented by cloud application servers 308(1-e). Additionally, multiple filer rebuild services 930 can be running concurrently on the same cloud application server 308(1-e), and multiple cloud application servers 308(1-e) can be executing filer rebuild service 930 concurrently.

Filer rebuild service 930 can be implemented in two different ways. According to the first process, when a filer 222 fails, file recovery service 930 identifies the failed filer 222 (e.g., using logs in the monitoring layer 910, filer summary table 700 and status fields 718) and then accesses object databases 312(1-g). Filer rebuild service 930 then reads each object record 504 in table 500A in each object-filer map shard 502(1-k). For each object record 504 that includes a filer ID field 508 matching the failed filer, file recovery service 930 utilizes the other filer ID fields 508 to identify working filers 222 that also contain the object associated with the object record 504. Filer rebuild service 930 then copies the object from one of the working filers 222 to the rebuilt filer 222. Copying the object from one of working filers 222 can include issuing a get object request to one of the working filers 222 to get the object, and then using a put object request to put the object on the new filer 222. Filer rebuild service 930 can do the same for each deleted object record 522 in deleted object-filer map table 500B in each shard 502(1-k). When the filer rebuild service 930 completes searching all the object-filer map tables 500A (and optionally tables 500B), the failed filer will have been rebuilt.

According to a second process, when a filer 222 fails, filer recovery service 930 identifies the failed filer 222 and then accesses an associated filer rebuild table 500D for the failed filer 222. Because table 500D is sharded by filer 222, the associated filer rebuild table 500D contains object records 552 for all objects stored on filer 222 that have yet to be deleted from it. For each object record 552, filer rebuild service 930 will cause the object to be copied from one of the working filers 222(1, . . . , x) storing a replica of the object to the rebuilt filer 222.

The object replication scheme of the present invention provides the advantage that each filer 222 can be reconstructed if it fails by chasing down and copying replicas of its objects from the other working filers 222. Thus, client data is more secure and less prone to being lost. Moreover, if client data was replicated on filers 222 across multiple data centers 320, the client data would not be lost even if all the filers 222 in one data center 320 were destroyed (e.g., in a fire, etc.).

Given the potential for the filer rebuild process 930 to require a lot of overhead, rebuilding a failed filer 222 can be split into several batches/jobs (e.g., five, etc.) given bandwidth and other resource limits.

Object store services layer 906 also includes filer rebalance service 932, which manages the distribution of data stored on each of the filers 222(1-n). Optionally, filer rebalance service can also be used to migrate data between data centers 320(1-j). In the present embodiment, filer rebalance service 932 is implemented by cloud application servers 308(1-e). Additionally, multiple filer rebalance services 932 can be running concurrently on the same cloud application server 308(1-e), and multiple cloud application servers 308(1-e) can be executing filer rebalance service 932 concurrently.

As new filers 222(n+) are added to increase the storage capacity of cloud 102 or as objects are stored in cloud 102 over time, the filers 222(1-n) can become out of balance in terms of the amount of data stored on each one. Filer rebalance service 932 facilitates rebalancing the filers 222(1-n) such that each contains approximately (e.g., plus/minus 10%, etc.) the same amount of data. Filer rebalance service 932 can, therefore, move objects between filers 222 to even out the amount of data stored on each filer 222(1-n), ensuring that multiple copies of the same object are not stored on the same filer 222. To do so, filer rebalance service 932 can search out object records 504 having a filer ID field 508(1-x) that matches the over-full filer 222. When an object is found, the filer rebalance service 932 can copy the object from the over-full filer 222 to a less-full filer 222 by issuing a get object request to the over-full filer and a put object request to the less-full filer 222. The object can then be deleted from the over-full filer by issuing a delete object request thereto. Filer rebalance service 932 also updates the associated object records 504 to reflect the moved objects. Thus, filer rebalance service 932 can identify hot spots among filers 222(1-n) and remediate them.

Filer rebalance service 932 can also balance the filers 222 (1-n) by selectively marking filers 222(1-n) as read only. For example, when a filer 222 reaches a predetermined capacity (e.g., within 100 GB of its maximum capacity) in the course of normal operation, filer rebalance service 932 can modify read only field 716 of the associated filer summary record 702 to mark the filer 222 as "read only." Accordingly, that filer 222 could no longer receive have objects uploaded to it, at least until it was changed back to read-write status. Subsequently, if many objects were purged from the filer 222 marked "read-only," then filer rebalance service 932 could change the read-only filer 222 back to read-write status such that additional objects could be stored thereon. Filer rebalance service 932 can also use this process to maintain each of filers 222(1-n) at approximately the same percentage of full capacity.

Object store services layer 906 also includes an object auditor service 934, which verifies the integrity of objects stored on filers 222(1-n). In the present embodiment, object auditor service 934 is implemented by cloud application servers 308(1-e). Multiple iterations (e.g., a number of iterations equal to the number of filers 222(1-n), etc.) of object auditor service 934 can be executing concurrently on the same cloud application server 308, and multiple cloud application servers 308(1-e) can be executing object auditor service 934 concurrently.

Object auditor service 934 is an object consistency checker that maintains the integrity of each object stored on filers 222(1-n) and ensures that a predetermined number of valid copies of the object exists across all filers 222(1-n). Over time, objects stored on filers 222(1-n) can become corrupted and unreadable (e.g., due to bit rot). Object auditor service 934 walks through the objects stored on each of the filers 222(1-n), reads them, and for each of the objects that is corrupted, finds an uncorrupted copy of the object on one of the other filers 222(1-n), and replaces the corrupted object with the uncorrupted copy. Object auditor service 934 can also check to make sure there are at least two (or more as defined by configuration) copies of each object stored among the filers 222(1-n).

Object auditor service 934 can be carried out using the object records 504 stored in object databases 312(1-g). Object auditor service 934 can read an object record 504, and issue a get object request to each of the filers 222 identified in the object record to obtain the replicas of the object associated with the object record 504. Object auditor service 934 can then compute a checksum for each of the retrieved objects and compare those checksums to a checksum 519 stored in the associated object record 504. If any of the calculated checksums for the replicas of the object do not match the stored checksum, then object auditor service 934 knows which replica(s) is/are bad and can over-write them with a good copy of the object from one of the other filers 222, or if necessary, a copy stored on local cloud 104. Optionally, the object auditor service 934 can obtain a checksum from the file system databases 314(1-h) instead.

Object auditor service 934 can be configured to audit objects as desired. For example, the object auditor service 934 can select object records 504 randomly. Additionally, the object auditor service 934 can be configured to audit each object at a particular frequency (e.g., twice per year). As another example, object auditor service 934 can be called to audit all files on a filer 222 that experiences an unexpected glitch or goes down. In a particular embodiment, object auditor service 934 is implemented as a Cron job that runs in the background.

Object store services layer 906 also includes an object purge service 936 that purges objects from filers 222(1-n). In the present embodiment, object purge service 936 is implemented by cloud application servers 308(1-e). Multiple iterations of object purge service 936 can be executing concurrently on the same cloud application server 308, and multiple cloud application servers 308(1-e) can be executing object purge service 936 concurrently.

When object purge service 936 is called, object purge service 936 reads the deleted object records 522 in deleted object-filer map table 500B of one or more object databases 312(1-g). For each deleted object record 522, object purge service 936 identifies the filers 222(1, . . . , x) on which that object is stored using filer ID fields 508(1-x). Object purge service 936 then sends delete object requests (including the path 518) to filers 222(1, . . . , x) to delete the object on filers 222(1, . . . , x). When object purge service 936 receives indications that the object has been deleted from all filers 222(1, . . . , x), then object purge service 936 deletes the associated deleted object record 522 from deleted object-filer map table 500B. If the object cannot be deleted from all of filers 222(1, . . . , x), then object purge service 936 will clear the filer ID fields 508 from the deleted object record 522 for the filers 222(1, . . . , x) from which the object was successfully deleted. Object purge service 936 can return to the same deleted object record 522 at a later time to finish deleting all copies of the object from the remaining filers 222(1, . . . , x). When the object has been deleted from all filers 222(1, . . . , x), then object purge service 936 will delete the deleted object record 522.

Particular embodiments of object purge service 936 provide particular advantages. For example, separating the object purge service 936 and the delete service 928 advantageously permits an object to be "undeleted" prior to purging it from filers 222(1, . . . , x), simply by modifying the deleted field 514 of the associated deleted object record 522 and moving the record back to object-filer map table 500A. According to another embodiment, a client 112 or cloud 104 can provide an indication that an identified object is to be purged from cloud 102 immediately. In this case, cloud application servers 308(1-e) can call object purge service 936 and direct it to purge the identified object immediately.

An object deduplication ("dedupe") service 938 is also shown in object store services layer 906. In the present embodiment, object dedupe service 938 is implemented by cloud application servers 308(1-e). Multiple iterations of object dedupe service 936 can be executing concurrently on the same cloud application server 308, and multiple cloud application servers 308(1-e) can be executing object dedupe service 936 concurrently.

Object dedupe service 938 provides the advantage that a file is replicated across the filers 222(1-n) only once. As indicated above, when an object is uploaded, a checksum/hash is computed and saved in checksum/hash field 519 in the object record 504 associated with the new object. When called, object dedupe service 938 reads the checksum/hash field 519 of the new object and searches the other object records 504 in object database(s) 312(1-g) for another object record 504 having the same checksum/hash. If another object record 504 is located with the same checksum/hash as the new object, then the new object record 504 is modified according to the existing object record 504 with the same checksum. For example, the new object record 504 could be modified to include the same filer ID fields 508(1-x) and path field 518 as the existing object record 504 with the same checksum. Alternatively, the new object record 504 might be modified to point to the existing object record 504 with the same checksum. Once this correlation between the new object record 504 and the existing object record 504 is made, object dedupe service 938 deletes the copies of the new object 504 that were uploaded to the filers 222. Object dedupe service 938 can be implemented periodically (e.g., after client log-out, daily, weekly, monthly, etc.) as routine maintenance, right after an object is uploaded to cloud 102 via upload service 920, as part of upload service 920, etc.

Because object dedupe service 938 utilizes the checksum/hash computed during object upload, it is important that the checksum/hash function be strong enough to make the duplicate-checking process reliable. The inventors have found that using a SHA-512 hash function is suitable for object deduplication.

Filer services layer 908 show the services for each filer 222(1-n). Filer services layer 908 includes at least one storage node service 940 fronting mass data store 322. In the present embodiment, each storage node service 940 comprises a web server that exposes an HTTP interface. As such, storage node service 940 responds to put object, get object, and delete object requests received from the services of object store services layer 906. Each storage node service 940 can also include other services such as encryption and decryption on objects as they are being received or served, compression and decompression as they are being received or served, event notifiers, object health monitors, quality control modules, copy and shredding applications, data migration applications, object scanners (e.g., for viruses, etc.), hash tables and/or other object location databases or data files, local deduplication applications, etc. Multiple iterations of storage node service 940 can be executing concurrently for each filer 222 (1-n). Storage node service 940 can be implemented using an Apache Tomcat™ web server.

Each storage node service 940 also provides an interface to mass data store 322. Mass data store 322 is shown representationally in FIG. 9. Mass data store 322 can be any mass data storage device and can have a direct file system 940A, an indirect file system 940B, and a network file system 940C. Mass data store 322 can even be another private or public cloud having a cloud file system 940D. For example, direct file system 940A can comprise any of XFS, Puppy Linux (2FS), B-tree File System (Btrfs), or Fourth Extended File System (EXT4) storing data on a D-RAID of JBOD device 322 using an ISCSI or Fibre Channel Over Ethernet (FCoE) protocol. As another example, indirect file system 940B can comprise XFS storing data on a mapped RAID or JBOD device (e.g., using DM-LVM protocol). As another example, network file system 940C can include Sun's Network File System storing data on a data center produced, for example, by EMC Corporation. As still another example, mass data store 322 and cloud file system 940D can include Cloud S3™ by Amazon and its associated file system. The invention, therefore, provides an important advantage in that objects can be persisted in a variety of different storage devices, and even private and public clouds, due to the HTTP interface exposed by filers 222(1-n).

Configuration and Monitoring Services (CMS) Layer 910 includes services that coordinate the services provided in the other layers of cloud 102. CMS layer 910 includes a discovery and coordination service 950, a scribe service 952, a filer tracking service 954, and an object store monitoring service 956. Multiple iterations of the services in layer 910 can be running concurrently. The services of CMS layer 910 provide the following functions.

Discovery and coordination service 950 ensures the services of cloud 102 can discover and interact with one another. For example, discovery and coordination service 950 discovers and manages the network configurations of the various elements and/or services communicating on private network 302. Discovery and coordination service 950 can also create a register of network configurations so that the network configuration of one cloud element/service can be shared with the other cloud elements/services. In a particular embodiment, discovery and coordination service 950 manages a framework of common URL interfaces between elements and services of cloud 102. Discovery and coordination service 950 can also provide notifications indicating whether elements and/or services are on-line or off-line (e.g., via Ping tests, etc.) and/or when elements and/or services change their network configuration (e.g., changing from read-write to read-only status and vice-versa, etc.). Discovery and coordination service 950 also facilitates the scalability of cloud 102. For example, service 950 ensures that any expansions of cloud 102 (e.g., adding a new filer 222, adding a new object database 312, etc.) are properly configured. Service 950 can also perform test runs on the expansions before the expansions are brought online. The inventors have found that discovery service 950 can be implemented using Apache Zookeeper™.

Scribe service 952 records any important messages generated by the services of the other layers 902, 904, 906, and 908. For example, scribe service 952 can log error messages generated by the upload service 920, download service 926, and delete service 928. In particular, if upload service 920 tried to put an object on a filer 222 that already existed, then scribe service 952 can log the error returned by filer 222. Other errors generated by a filer 222, such as errors in get object requests (file does not exist) and errors in delete object requests (file does not exist), can also be logged by scribe service 952. Optionally, scribe service 952 can also log messages for use by other services. For example, scribe service 952 can log object information (e.g., object size, full object path, etc.) for an uploaded object for filer tracking service 954.

Filer tracking service 954 tracks the activity of filers 222 (1-n) and updates the filer records 702 of filer summary table 700 accordingly. For example, filer tracking service 954 monitors the amount of bytes in and/or out of filers 222 via scribe service 952 and/or storage node service 940 to determine outages or hotspots. As a result, filer tracking service 954 can adjust the weight fields 708 of the filer records 702 accordingly. Filer tracking service 954 also listens to messages by scribe service 952 and updates the filers summary table 700 accordingly (e.g., updates used storage fields 712, updates stored files field 714, etc.). Filer tracking service 954 can also implement a ping and/or latency test that pings storage node services 940 to determine that the filers 222(1-n) are on-line and/or to determine their latencies. The service 954 can use the latencies to determine hot spots. Service 954 can then use this ping and latency information to update filer summary table 700 (e.g., update weight fields 708, status fields 718, etc.).

Filer tracking service 950 also generates filer logs 956. Filer logs 956 include statistics about filers 222(1-n) that can, for example, be used by administrators of cloud 102 to improve cloud services. For example, filer logs 956 can include the amount of bytes transferred in and out of a filer 222 over a period of time (e.g., 24 hours, 30 days, etc.). Filer logs 956 can also include utilization metrics for a filer 222, such as space and bandwidth utilization over a period of time. Filer tracking service 950 can also record input/output (I/O) faults, cache misses, average I/O rates, etc. for a filer 222(1-n) in filer logs 956. Filer tracking service 950 can prepare filer logs 956 using information provided to it from storage node services 940 and/or messages recorded by scribe service 952.

Object store (OS) monitoring service 956 monitors object store services and associated components of cloud 102 and generates OS log files 958, which can be used by administrators of cloud 102 to improve cloud services. For example, OS monitoring service 956 can monitor and log the number of calls to upload service 922, download service 926, and delete service 928 over a predetermined amount of time (e.g., daily, weekly, monthly, etc.). OS monitoring service 956 can also monitor and log the object databases 312(1-g) to determine their statistics (e.g., number of object-filer map shards 502, the number of object records 504 in each shard, table counts, size of tables, space remaining in the database 312(1-g), etc.). OS monitoring service 956 can also ping the upload services 920, download services 924, and delete services 928 to determine their metrics (e.g., uptime, number of requests, error counts, etc.) and latencies for performing test upload requests, download requests, and delete requests. As yet another example, OS monitoring service 956 can monitor the statistics of a cache (e.g., a Memcached cache) being used by services of layer 906. The OS logs 958 can be used by cloud administrators, for example, to determine when additional cloud application servicer 308, cloud object servers 310(1-f) and object databases 312(1-g) need to be added to cloud 102 to accommodate growing demand.

Cloud 102 can also include additional service layers that are not expressly shown in FIG. 9. For example, cloud 102 can include caching layers as desired to promote rapid information retrieval. For example, it would be desirable to cache the object-filer map shards table 500C (FIG. 5B) to rapidly locate and access particular shards 502(1-k) of object databases 312(1-g). As another example, it would be desirable to cache the filer summary table 700 such that filers 222(1-n) can be quickly accessed given a filer identifier (e.g., filer identifier 508 from an object record 504). As yet another example, caching portions of file system databases 314(1-h) would be desirable to give a client 112 more responsive access to his virtual file system. For the same reasons, it may be desirable to cache portions of object databases 312(1-g). Caching layers can be implemented using a caching system such as Memcached (http://memcached.org).

In view of the embodiments described of the invention described above, it is readily apparent that the present invention provides particular advantages over the prior art. For example, the object replication policies implemented by cloud 102 is important, because it permits client access to objects even if some of filers 222(1-n) are off-line. Additionally, it enables a failed one of filers 222(1-n) to be rebuilt using replicas of the objects from other filer(s) 222. Furthermore, the replication policy facilitates auditing objects to determine degraded objects, and restoring the degraded objects using replicas of the degraded objects stored on other filer(s) 222. Moreover, the replication policy permits the filers 222 to undergo routine maintenance in a staggered manner without disrupting cloud service to clients 112. For example, if a client requests an object and one of the filers 222 on which that object is stored is down for maintenance, the object can still be retrieved from one of the other filer(s) 222 containing the object. The replication policy also enables the cloud 102 to reduce hotspots by diverting requests from busy filers 222. Furthermore, if the replicas of objects are stored on different data centers 320(1-j) located at different sites, objects can be recovered even if an entire data center 320(1-j) is destroyed (e.g., by fire, etc.).

Another advantage of the present invention is that the filers 222(1-n) and other elements of cloud 102 expose HTTP interfaces. Thus, filers 222(1-n) can be implemented using a variety of mass data stores, including other private and public clouds, and cloud 102 can be scaled up easily.

Still another advantage of the present invention is that the distributed nature of the components of cloud 102 permits the components to undergo routine maintenance and patches without any downtime or glitches. For example, one filer 222(1-n) can go off-line without affecting access to objects stored in cloud 102. As another example, one cloud application server 308 can go down for maintenance, while other cloud application servers 308 temporarily take over its tasks.

Yet another advantage is that the invention is readily scalable. For example, filers 222(n+) can be easily incorporated as storage requirements of cloud 102 grow. Additional shards 502(k+) of object databases 312(1-g) can also be readily added to cloud 102 as object storage requirements increase.

The invention also provides the advantage that compression and encryption services are delegated to the storage node services of the filers 222(1-n). Thus, the processing resources of the filers 222 are fully utilized and the other cloud services are relieved of these burdens. Optionally, cloud object servers 310(1-f) can serve compressed data to the client 112 or cloud 104 to conserve bandwidth, if the client 112 or cloud 104 support decompressing the compressed content. Indeed, these and other advantages of the present invention will be apparent in view of this disclosure.

Figure 10:
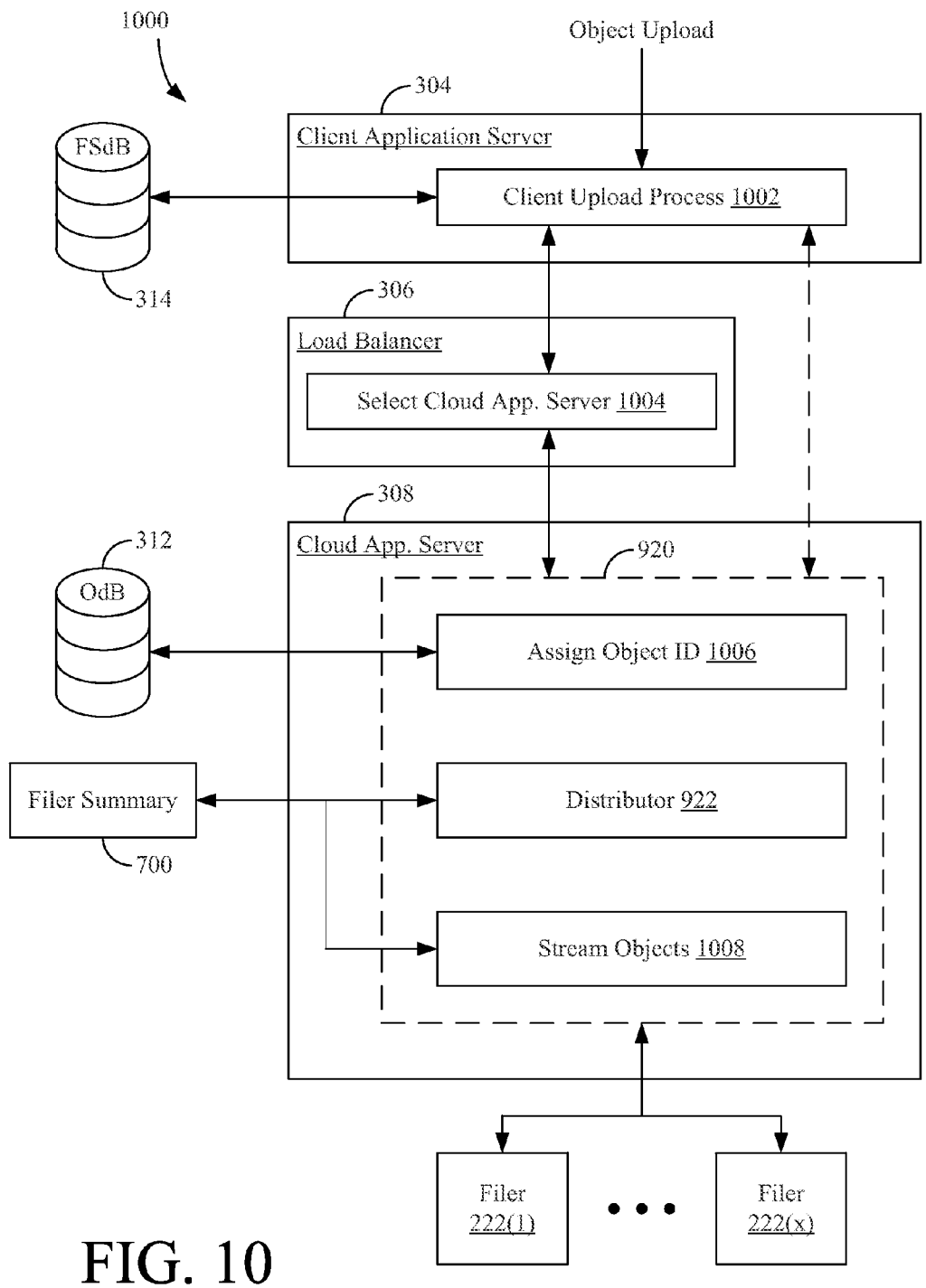
FIG. 10 is a process and dataflow diagram of an object upload to the cloud according to the present invention.

FIG. 10 is a process and dataflow diagram 1000 of a file upload process from a client 112 (or local cloud 104) to the cloud 102 according to the present invention. As shown in diagram 1000, a client application server 304 receives an object upload command from a client 112 it is servicing (e.g., by the client 112 dragging and dropping a file into the client's virtual file system, the client saving a file in an application, etc.). Client application server 304 includes a client upload process 1002 that receives the object upload command and the object (a data file) from client 112. Client upload process 1002 then creates a new virtual object record 442 in file system database 314 associated with the object being uploaded such that the uploaded object will appear in the client's virtual file system. Client upload process 1002 also generates an upload request and provides the upload request to load balancer 306.

Load balancer 306 receives the upload request and initiates a cloud application server selection process 1004. The selection process 1004 selects ones of cloud application servers 308(1-e) accepting upload requests based on the availability and respective loads of cloud application servers 308(1-e). Load balancer 306 then forwards the upload request to the selected cloud application server 308. In the current embodiment, load balancer 306 is a proxy for cloud application server 308 and, therefore, it coordinates communications between client application server 304 and cloud application server 308. However, in an alternative embodiment, client application server 304 and the selected cloud application server 308 can communicate directly, as indicated by the dashed line therebetween.

Cloud application server 308 receives the upload request and calls upload service 920. In an assign object ID process 1006, upload service 920 assigns a new object identifier 506 for the new object and accesses a shard 502 of one of object databases 312. There it creates a new object record 504 in the object-filer map table 500A of the accessed shard 502. Assign object ID process 1006 then generates a UUID 600 comprising a first field 602, having the shard identifier 532 associated with the shard 502 to where the new object record 504 was written, and a second field 604 containing the new object identifier 506. Upload service 920 then provides the UUID 600 to client upload process 1002, and client upload process 1002 stores the UUID 600 in the file system database 314 in UUID field 448 of the associated virtual object record 442 for the uploaded object.

Upload service 920 also performs distributor service 922 to select a plurality of the filers 222(1-n) on which to store the new object. Distributor service 922 accesses filer summary table 700 and determines the status of filers 222 using the data therein. Distributor service 922 then recommends filers 222 on which to store the new object, for example, based on fields 708-718 of the filer records 702 in filer summary table 700.

Upload service 920 then selects at least two filers 222(1, . . . , x) from the set recommended by distributor service 922 and issues put object requests to the selected filers 222(1, . . . , x). Upload service 920 communicates with the selected filers 222(1, . . . , x) using the URL information in fields 706 of filer summary table 700. Upload service 920 also includes a desired path at which the object is to be stored on each of the filers 222(1, . . . , x) in the put object requests. Upload service also requests the object from client upload process 1002 and streams the new object to the selected filers 222(1, . . . , x) in a stream process 1008. (Note that the new object is advantageously streamed to the selected filers 222(1, . . . , x) without staging, whereby the object is synchronously replicated among the selected filers 222(1, . . . , x).) When upload service 920 receives confirmation from the selected filers 222(1, . . . , x) that the new object has been stored, upload service 920 completes the fields (e.g., filer ID fields 508(1-x), replicas field 510, encryption key field 512, path field 518, etc.) of the object record 504 associated with the new object and/or writes any messages via scribe service 952.

Each of the selected filers 222(1, . . . , x) receives a put object request (e.g., an HTTP PUT request, etc.) from cloud application server 308 to store the new object. The respective storage node services 940 receive the new object and stores the new object at the path indicated in the put object request. Filers 222(1, . . . , x) can also compress and encrypt the objects inline as they are being stored. Furthermore, filers 222(1, . . . , x) can perform other processes on the new object, such as computing a checksum to compare with a checksum computed by the upload service 920 to verify file integrity, etc.

Figure 11:
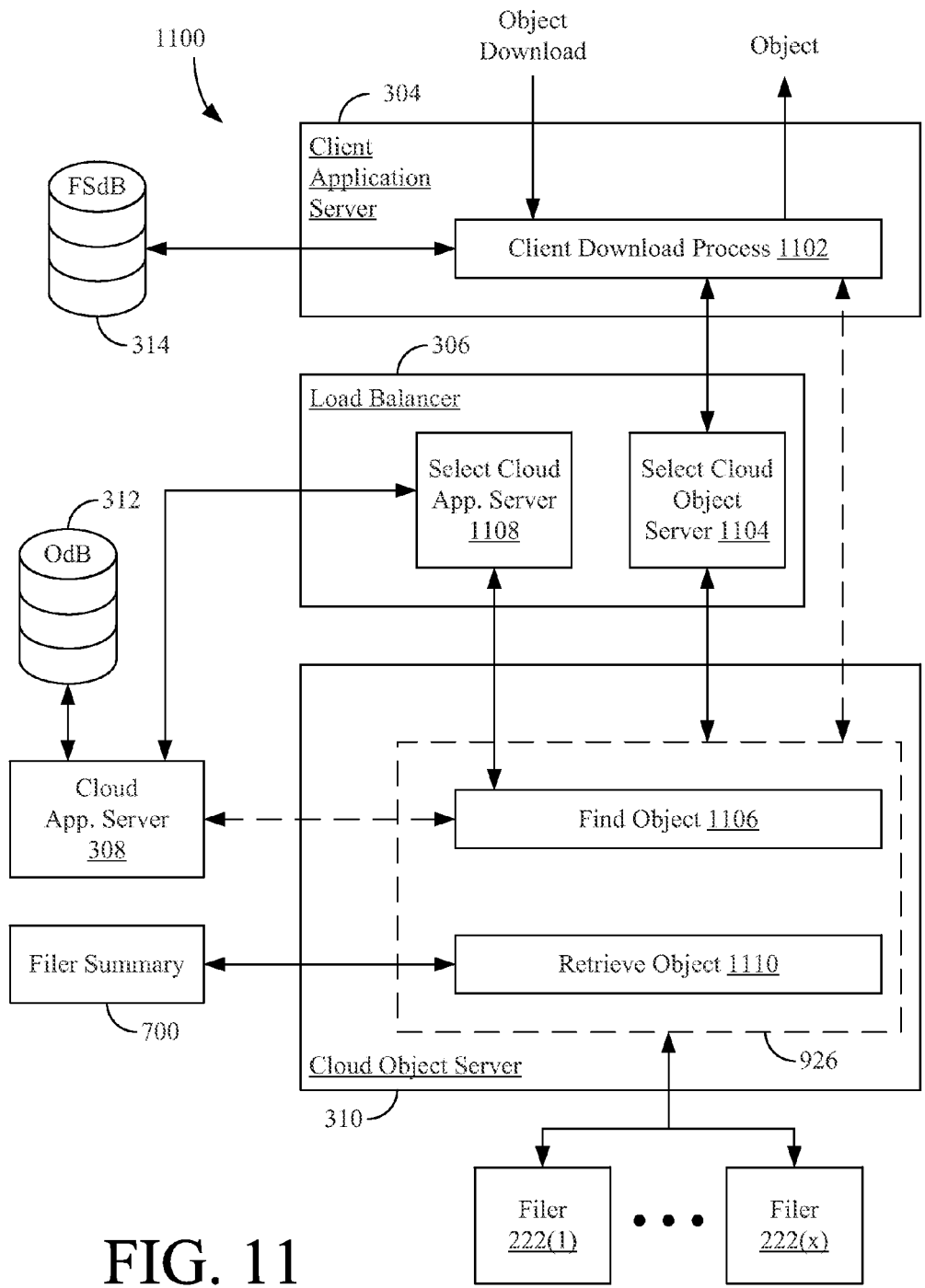
FIG. 11 is a process and dataflow diagram of an object download from the cloud according to the present invention.

FIG. 11 is a process and dataflow diagram 1100 of a file download process from cloud 102 to a client 112 (or local cloud 104) according to the present invention. As shown in diagram 1100, a client application server 304 receives an object download command from a client 112 (e.g., by client 112 dragging and dropping a file icon from his virtual file system to his computer, client 112 double clicking a virtual file system icon, accessing a virtual file using an open command in an application, etc.). Client application server 304 includes a client download process 1102 that receives the object download command from client 112 and locates the virtual object record 442 in file system database 314 associated with the requested virtual object. Client download process 1102 then retrieves the UUID 600 from UUID field 448 in the virtual object record 442, generates a download request including the UUID 600, and provides the download request to load balancer 306.

Load balancer 306 receives the download request and initiates a cloud object server selection process 1104. The selection process 1104 selects ones of cloud object servers 310(1-f) accepting download requests based on the availability and respective loads of cloud download servers 310(1-f). Load balancer 306 then forwards the download request to the selected cloud object server 310.

Cloud object server 310 receives the download request and initiates download service 926. In a find object process 1106, download service 926 requests object information for the requested object from one of cloud application servers 308 by providing the UUID 600 for the requested object to a cloud application server 308. In one embodiment, download service 926 requests object information from one of cloud application servers 308 via load balancer 306. Load balancer 306 receives the request for object information and initiates a cloud application server selection process 1108, which selects ones of cloud application servers 308(1-e) based on the availability and respective loads of cloud application servers 308(1-e). Load balancer 306 then routes the request for object information to the selected cloud application server 308. In an alternative embodiment, cloud object server 310 can bypass load balancer 306 completely, and request object information directly from one of cloud application servers 308.

The selected cloud application server 308 receives the object information request and uses the UUID 600 to obtain the object information. Cloud application server 308 uses the shard ID 532 in the first field 602 of UUID 600 to locate the object database 312(1-g) having access to the identified object-filer map shard 502. Cloud application server 308 then uses the object ID in the second field 604 of UUID 600 to locate the object record 504 associated with the requested object within the identified shard 502. Once the object record 504 is located, cloud application server 308 provides some or all of the information in the object record 504 (e.g., filer ID fields 508(1-x), path field 518, checksum 519, etc.) to cloud object server 310.

When cloud object server 310 receives the object information from cloud application server 308, download service 926 initiates a retrieve object process 1110 in which download service 926 selects one of filers 222(1, . . . , x) identified by filer ID fields 508(1-x) in the object record 504 to retrieve the requested object from. The retrieve object process 1110 accesses the filer records 702 from filer summary table 700 and uses the data therein (e.g., weight field 708, status field 718, etc.) to determine which filer 222(1-x) to retrieve the object from. When a filer 222 is selected, retrieve object process 1110 generates a get object request for the object and provides the get object request to the selected filer 222. Download service 926 is able to communicate with the selected filer 222 by retrieving the data in URL field 706 from the filer record 702 in filer summary table 700 associated with the selected filer 222. The get object request also utilizes the path information contained in path field 518 from the retrieved object information so the object can be located on the selected filer 222.

The selected filer 222 receives the get object request (e.g., an HTTP GET request, etc.) from the cloud object server 310 to retrieve the requested object. The storage node service 940 retrieves the requested object using the path information in the get object request and provides the requested object to the cloud object server 310. The selected filers 222 can also decompress and/or decrypt the requested object as it is being served, or alternatively serve the object compressed and/or encrypted. Upon receiving the retrieved object, download service 926 forwards the object to client application server 304 (e.g., via load balancer 306, directly to server 304, etc.), and client download process 1102 then serves the retrieved object to the client 112. Optionally, the download service 926 can compute a checksum on the served object, and compare it to a checksum in the retrieved object information, before providing the object to client download process 1102.

Again, if load balancer 306 acts as a proxy, it can be in the communication path between client application server 304 and cloud object server 310 and between cloud object server 310 and cloud application server 308 (shown by solid arrows). Alternatively, if load balancer 306 only performs load balancing by redirecting requests, then the client application server 304 and the selected cloud object server 310 can communicate directly with one another after load balancing (shown by dashed arrows). Similarly, the selected cloud object server 310 can also communicate directly with the selected cloud application server 308 after the load balancing.

Figure 12:
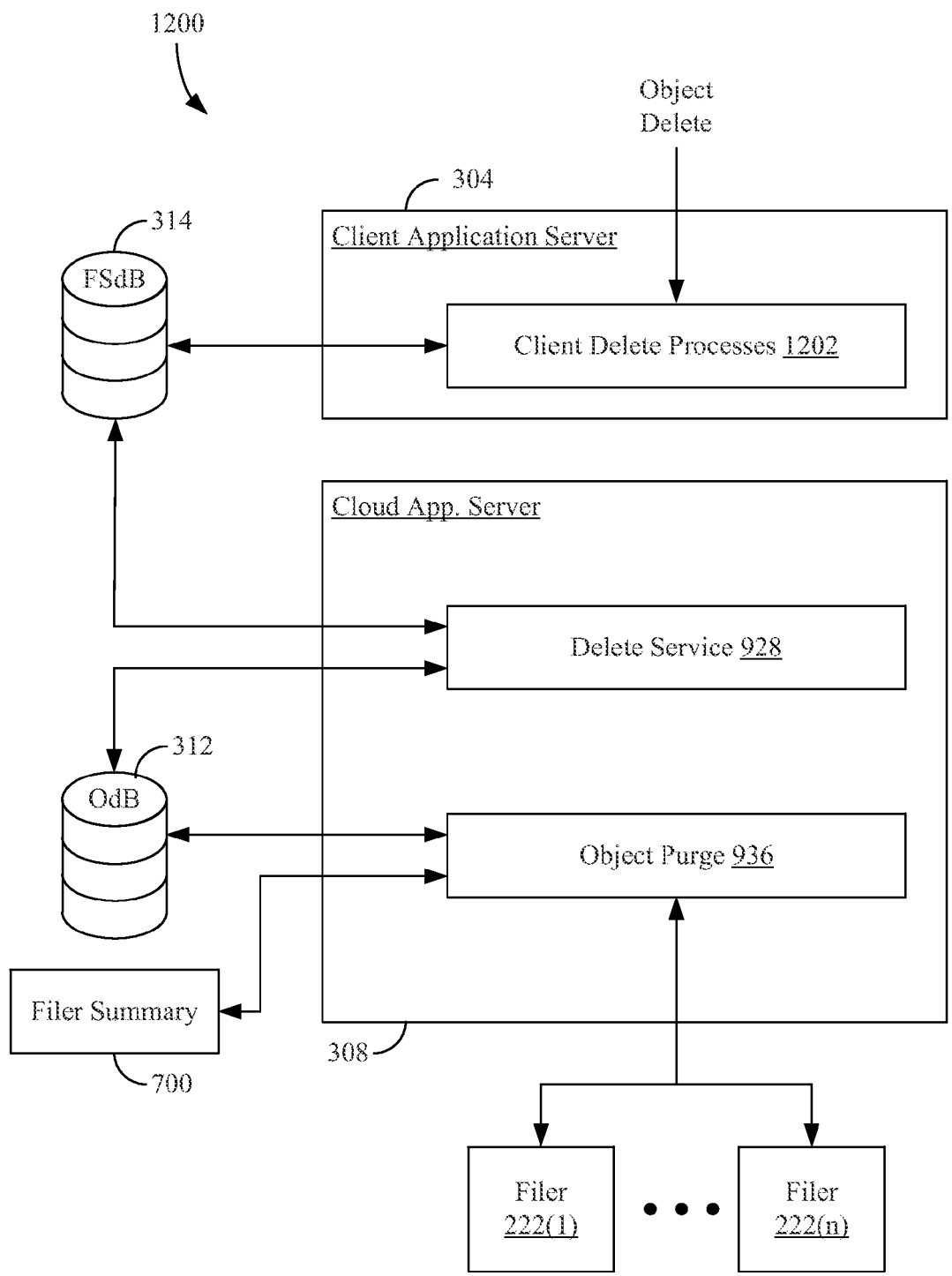
FIG. 12 is a process and dataflow diagram of an deleting an object from the cloud according to the present invention.

FIG. 12 is a process and dataflow diagram 1200 of object delete processes according to the present invention. As shown in diagram 1200, a client application server 304 receives an object delete command (e.g., client 112 deleting an icon from his virtual file system) identifying a virtual object from a client 112 (or local cloud 104) it is servicing. Client application server 304 includes a client delete process 1202 that receives the object delete command and locates the virtual object record 442 in file system database 314 corresponding to the deleted virtual object. Client delete process 1202 then sets the delete field 454 and writes the data and time in deleted date and time field 470, indicating that the virtual object record 442 is marked for deletion. Client delete process 1202 then moves the virtual object record 442 to the virtual objects trash table 400G and stores it as a virtual object trash record 468. At this point, the virtual object appears to be deleted from the virtual file system but is not deleted from the filers 222(1-n). Over time, virtual object trash records 468 accumulate in the virtual object trash tables 400G in the file system database shards 412(1-w).

Subsequently, a cloud applications server 308 executes delete service 928. Delete service 928 accesses the virtual objects trash table 400G in one or more file system database shards 412(1-w). For each virtual object trash record 468, delete service 928 locates the associated object record 504 in one of object databases 312 using the UUID 600 contained in the UUID field 448 of the trash record 468. Delete service 928 then modifies deleted field 514 in the object record 504 to mark the object record 504 for deletion, records the date and time in field 516, and moves the object record 504 to the deleted object filer map table 500B where it is stored as a deleted object record 522. Because object record 504 has been moved to deleted object-filer map table 500B, the object associated with object record 504 is unavailable for download from any of filers 222 unless the record is moved back to the object-filer map table 500A (e.g., in response to an undelete request from client application server 304).

Any of cloud application servers 308 can also perform object purge service 936 whereby objects that are associated with deleted object records 522 are purged from filers 222(1-n). When object purge service 936 is called, it accesses deleted object-filer map trash table 500B in at least some shards 502(1-k) and reads the deleted object records 522 that were previously marked for deletion by delete service 928. For each deleted object record 522, if a predetermined amount of time (e.g., 24 hours, 30 days, etc.) has passed since the date and time contained in field 516, then object purge service 936 uses the filer IDs 508(1-x) and path 518 in the deleted object record 522, and the data in URL field 706 in filer summary records 702, to send delete object requests to each of the identified filers 222(1, . . . , x). The delete service 928 and the object purge service 936 can be performed by different cloud application servers 308(1-e).

The filers 222(1, . . . , x) receive delete object requests (e.g., an HTTP DELETE request, etc.) from cloud application server 308 executing object purge service 936. For each delete request, the object store service 940 deletes the associated object stored thereon. If object application server 308 receives no errors during the purge service 936 of an object, then the associated deleted object record 522 can be deleted from object database 312, including from the optional filer rebuild tables 500D that are sharded by filer 222. If the purge process 936 does not complete on all filers 222(1, . . . , x), then the associated deleted object record 522 can be retained in object database 312 until all replicas of the object have been purged.

Cloud 102 also handles modified versions of objects utilizing the processes described above with reference to FIGS. 10-12. In the present embodiment, objects stored in cloud 102 are logically immutable, which facilitates particular advantages of the invention including replication of objects across multiple filers 222(1-n) and de-duplicating objects across a very large data set. Thus, each version of an object is stored in cloud 102. For example, if a client 112 downloaded an object, modified the object, and then saved the modified object to cloud 102, the modified object would be saved as a new object using the upload process described above.

Storing revised versions of objects can be optimized in various ways. According to one particular example, objects can be stored at the block level (as opposed to file level) such that (approximately) only the modified blocks associated with a file are stored in cloud 102. Older versions of those blocks are de-duplicated and/or deleted. This method would result in more objects and object records being stored. As another example, current and previous versions of an object can be "patched together" by generating and storing patch information for the current version of the object. For example, a virtual object record 442 associated with a current version of an object might include patch information that links the current virtual object record 442 with the virtual object record(s) 442 associated with past version(s) of the object. Periodically (e.g., at client log-out, weekly, etc.), older versions of objects (blocks or otherwise) can be deleted from cloud 102 by marking the object record 504 and/or virtual object record 442 associated with the older object for deletion. As still another example, a virtual object record 442 might only be stored for the current version of an object, while virtual object records 442 associated with past versions of an object are marked for deletion as the modified objects are created. Thus, the older versions would be deleted in due course.

Figure 13:
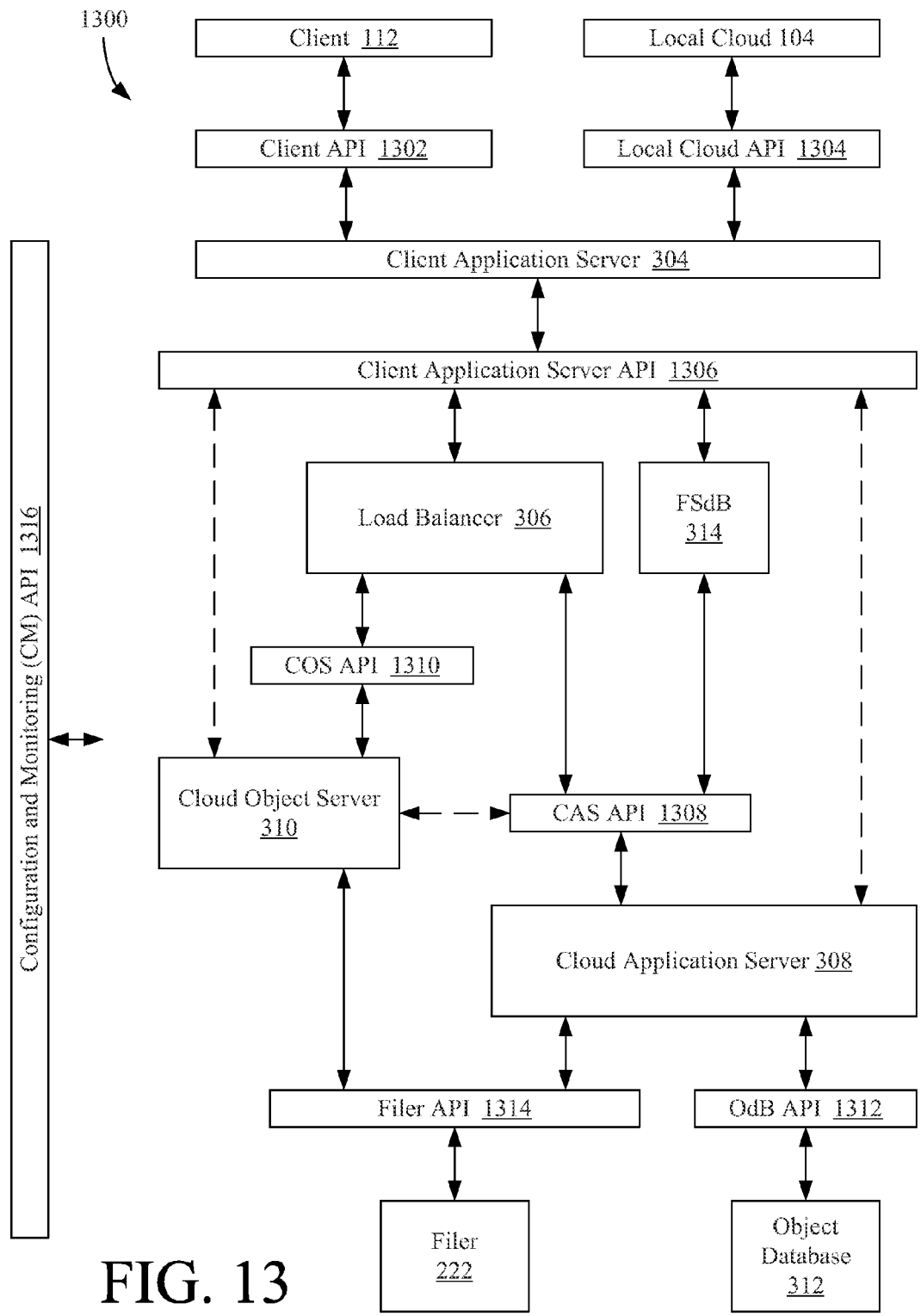
FIG. 13 is an Application Program Interface (API) diagram illustrating the APIs between the elements of FIG. 3.

FIG. 13 is an Application Program Interface (API) diagram 1300 illustrating various APIs between the elements of cloud 102 according to one embodiment of the invention. Diagram 1300 includes a client API 1302, a local cloud API 1304, a client application server API 1306, a cloud application server (CAS) API 1308, a cloud object server (COS) API 1310, an object database (OdB) API 1312, a filer API 1314, and a configuration and monitoring (CM) API 1316. While APIs 1302-1316 are shown and described as single APIs, it should be recognized that each of the APIs 1302-1316 can be implemented using multiple sub-APIs that facilitate different aspects of the interfaces. As indicated above, the elements of cloud 102 are HTTP based. Therefore, the API's described in FIG. 13 can include, but are not necessarily limited to, HTTP.

Client API 1302 defines the protocols for communications between client 112 and client application server 304. Client API 1302 provides the interface whereby client 112 can interact with the virtual file system presented by client application server 304. Client API 1302 also negotiates communications associated with the object upload, download, and delete commands between client 112 and client application server 304. Client API 1302 also communicates other modifications to the virtual file system made by client 112 (e.g., folder modifications, virtual object moves, etc.) to client application server 1302.

Local cloud API 1304 defines the protocols for communications between local cloud 104 and client application server 304. Local cloud API 1304 provides the interface whereby local cloud 104 can interface with client application server 304. Local cloud API 1304 also negotiates communications associated with the synchronization process between local cloud 104 and cloud 102, including object upload, download, and delete processes as well as other modifications (e.g., folder changes, virtual object moves, etc.) to the virtual file system.

Client application server API 1306 defines the protocols for communications between client application server 304 and load balancer 306 and between client application server 304 and file system database 314. Optionally, client application server API 1306 also defines the protocols for communication between client application server 304 and cloud application server 308 and/or cloud object server 310. Client application server API 1306 receives upload and download requests (and any associated communications) from client application server 304 and provides those communications to load balancer 306. Client application server API 1306 also receives responses to such communications (e.g., the requested object) from load balancer 306 (which can act as a proxy for cloud application server 308 and cloud object server 310) and provides those communications to client application server 304.

Client application server API 1306 also provides an interface for client application server 304 to communicate with file system database 314 to access the virtual file system for client 112 and to make changes to the virtual file system (e.g., creating new records, storing UUID's, clearing trash tables, etc.). In an embodiment where client application server 304 communicates directly with cloud application server 308, client application server API 1306 establishes the protocols for communications associated with an object upload such as streaming the object to cloud application server 308 and/or receiving the UUID from cloud application server 308. In an embodiment where client application server 304 communicates directly with cloud object server 310, client application server API 1306 establishes the protocols for communications associated with an object download such as receiving the requested object from cloud object server 310.

CAS API 1308 defines the protocols for communications between cloud application server 308 and each of load balancer 306, file system database 314, and cloud object server 310. CAS API 1308 receives upload requests from load balancer 306 and provides them to cloud application server 308. CAS API 1308 also receives communications from cloud application server 308 (e.g., UUIDs, etc.) and provides the communications to load balancer 306. CAS API 1308 also facilitates interaction between cloud application server 308 and file system database 314. For example, CAS API 1308 provides requests for deleted virtual objects to file system database 314, receives responses to the requests from file system database 314 (e.g., UUIDs for the deleted virtual object records, etc.), and provides the responses to cloud application server 308. CAS API 1308 also receives object information requests via load balancer 306 or from cloud object server 310 directly and provides the object information requests to cloud application server 308. CAS API 1308 then provides the requested object information (e.g., the object record, etc.) to cloud object server 310 directly or via load balancer 306.

COS API 1310 defines the protocols for communications between cloud object server 310 and load balancer 306. COS API 1310 receives download requests (including UUIDs) from load balancer 306 and provides those download requests to cloud object server. COS API 1310 also receives the requested object from cloud object server 310 and forwards the requested object to load balancer 306 (unless cloud object server 310 communicates directly with client application server 304 via client application server API 1306).

OdB API 1312 defines the protocols for communications between cloud application server 308 and object database 312. OdB API 1312 receives requests from cloud application server 308 to create new object records in object database 312, and provides those requests to object database 312. OdB API 1312 also receives queries for object information (e.g., filer and path information for a given object identifier, object records associated with a failed filer, checksums, deleted object records, etc.) from cloud application server 308 and provides those queries to object database 312. When object database 312 returns the requested information, OdB API 1312 provides the requested information to cloud application server 308. OdB API 1312 also receives requests from cloud application server 308 to modify or delete the records of object database 312 (e.g., to mark object records for deletion, to update filer information during filer rebalance, to remove deleted object records when their associated objects are purged from filers 222, etc.), and provides those requests to object database 312. OdB API 1312 can also provide confirmations that the modifications were made to cloud application server 308.

Filer API 1314 defines the protocols for communications between filer 222 and each of cloud application server 308 and cloud object server 310. Filer API 1314 receives put object requests to store objects on filer 222 from cloud application server 308 and provides those put object requests to filer 222. Filer API 1314 also receives streamed objects uploaded from cloud application server 308 and provides them for storage on filer 222. Filer API 1314 also receives get object requests from cloud application server 308 (e.g., during filer rebuild, rebalance, etc.) and/or cloud object server 310 and provides those get object requests to filer 222. When filer 222 serves the requested object, filer API 1314 provides it to cloud application server 308 or cloud object server 310. Filer API 1314 can also receive delete object requests from cloud application server 308 and provides those delete object requests to filer 222. Filer API 1314 can also provide acknowledgements to cloud application server 308 and cloud object server 310.

CM API 1316 defines the protocols for communications between configuration and monitoring server 316 and the other elements of cloud 102, including client application server 304, load balancer 306, cloud application server 308, cloud object server 310, object database 312, file system database 314, and filer 222. CM API 1316 is only shown representationally communicating with these other elements so as not to unnecessarily clutter diagram 1300. CM API 1316 permits configuration and monitoring server 316 carry out the services of the configuration and monitoring services layer 910 described in FIG. 9. For example, CM API 1316 enables configuration and monitoring server 316 to request, acquire, and broadcast network information (e.g., IP addresses, etc.) for the other elements coupled to private network 302. CM API 1316 also facilitates messages to be received by scribe service 952 and for OS monitoring service 954 to issue and receive communications associated with the services provided by the object store services layer 906. Additionally, CM API 1316 facilitates filer tracking communications between configuration and monitoring server 316 and filers 222.

Figure 14:
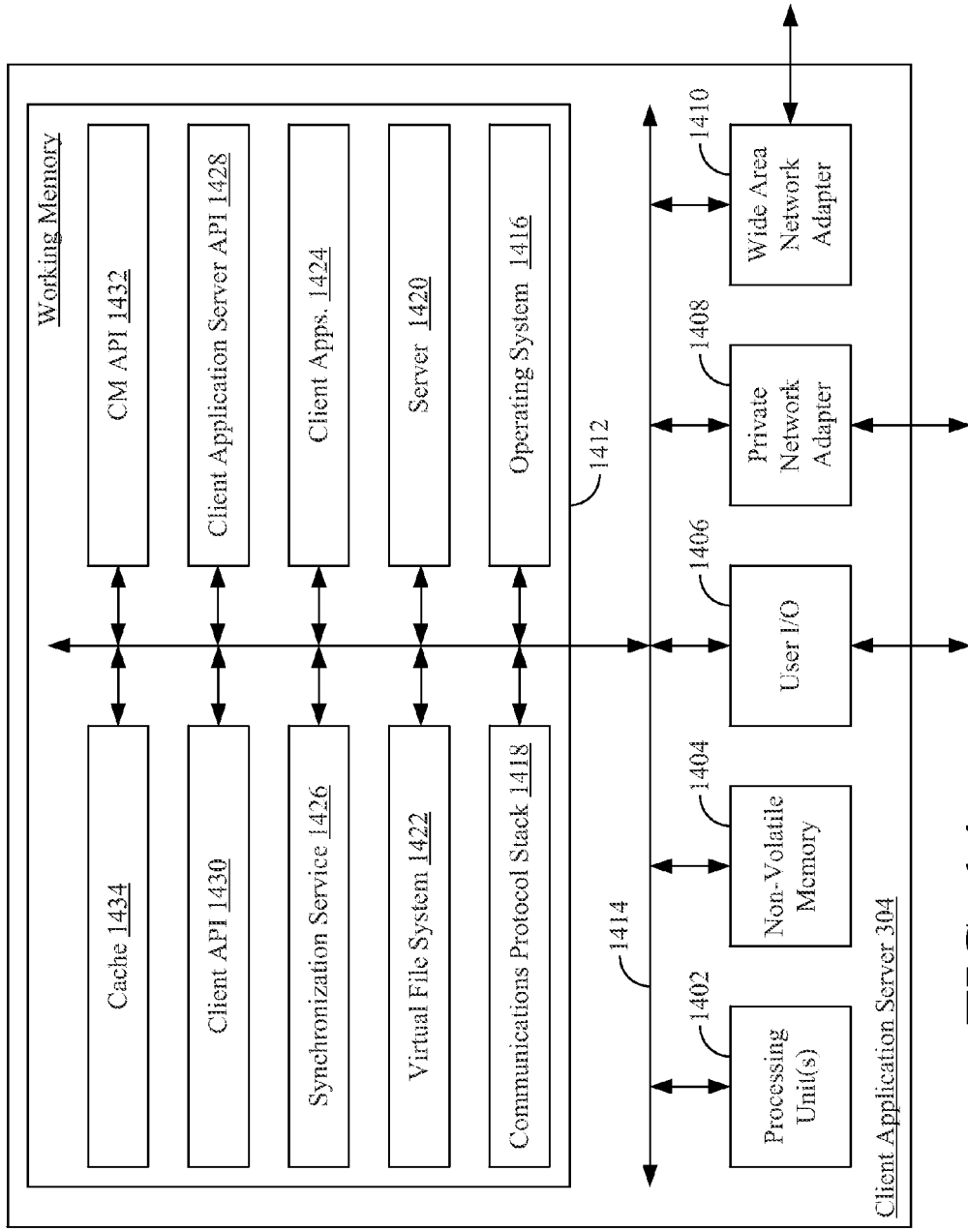
FIG. 14 is a block diagram showing a client application server of FIG. 3 in greater detail according to one embodiment of the present invention.

FIG. 14 is a block diagram showing a client application server 304 in greater detail according to one embodiment of the present invention. Client application server 304 includes one or more processing unit(s) (PU) 1402, non-volatile memory 1404, a user I/O controller 1406, a private network adapter 1408, a wide area network adapter 1410, and a working memory 1412, all intercommunicating via a system bus 1414. PU(s) 1402 execute(s) data and code contained in working memory 1412 to cause client application server 304 to carry out its intended functions (e.g. providing a cloud interface for clients 112(1-b), synchronizing file systems with local cloud 104, etc.). Non-volatile memory 1404 (e.g. read-only memory, one or more hard disk drives, flash memory, etc.) provides storage for data and code (e.g., boot code, client and sync applications, etc.) that are retained even when client application server 304 is powered down. User I/O controller 1406 manages connections for user interface devices (not shown), for example a keyboard, mouse, monitor, printer, camera, and other such devices that facilitate interaction and communication between client application server 304 and a user (e.g., a cloud administrator). Private network adapter 1408 (e.g. an Ethernet adapter card) transmits data packets onto and receives data packets from private network 302 of cloud 102. Wide Area Network Adapter 1410 (e.g. an Ethernet adapter card) transmits data packets onto and receives data packets from Internet 106. System bus 1414 facilitates intercommunication between the various components of client application server 304. Optionally, client application server 304 includes another connection adapter (not shown) to facilitate other connections 116(1-b).

Working memory 1412 (e.g. random access memory) provides dynamic memory for client application server 304, and includes executable code (e.g. an operating system 1416, etc.), which is loaded into working memory 1412 during system start-up. Operating system 1416 facilitates control and execution of the other modules loaded into working memory 1412. Working memory 1412 also includes a communications protocol stack 1418 that facilitates network communications via wide area network adapter 1410 and/or private network adapter 1408. Working memory 1412 further includes a server application 1420 that receives and responds to communications from clients 112(1-b) and local cloud 104. Server application 1420 also provides communications to and receives responses from load balancers 306(1-d). A virtual file system module 1422 is also shown in working memory 1412 and is operative to query file system databases 314(1-h) and generate virtual file systems that clients 112 can interact with via server 1420. A client applications module 1424 and a synchronization service module 1426 are also loaded in working memory 1412 and provide the client application services 914 and the synchronization services 916 of FIG. 9, respectively. A client application server API 1428, a client API 1430, and a configuration and monitoring (CM) API 1432 are also loaded in working memory 1412 and provide some or all of the functions of client API 1302, client application server API 1306, and CM API 1316, respectively. Working memory 1412 also includes a cache 1434 (e.g., a Memcached cache, etc.) that stores frequently used information. Portions of the foregoing modules in working memory 1412 can be loaded in cache 1434. Working memory 1412 can include multiple iterations of the foregoing modules as desired.

Figure 15:
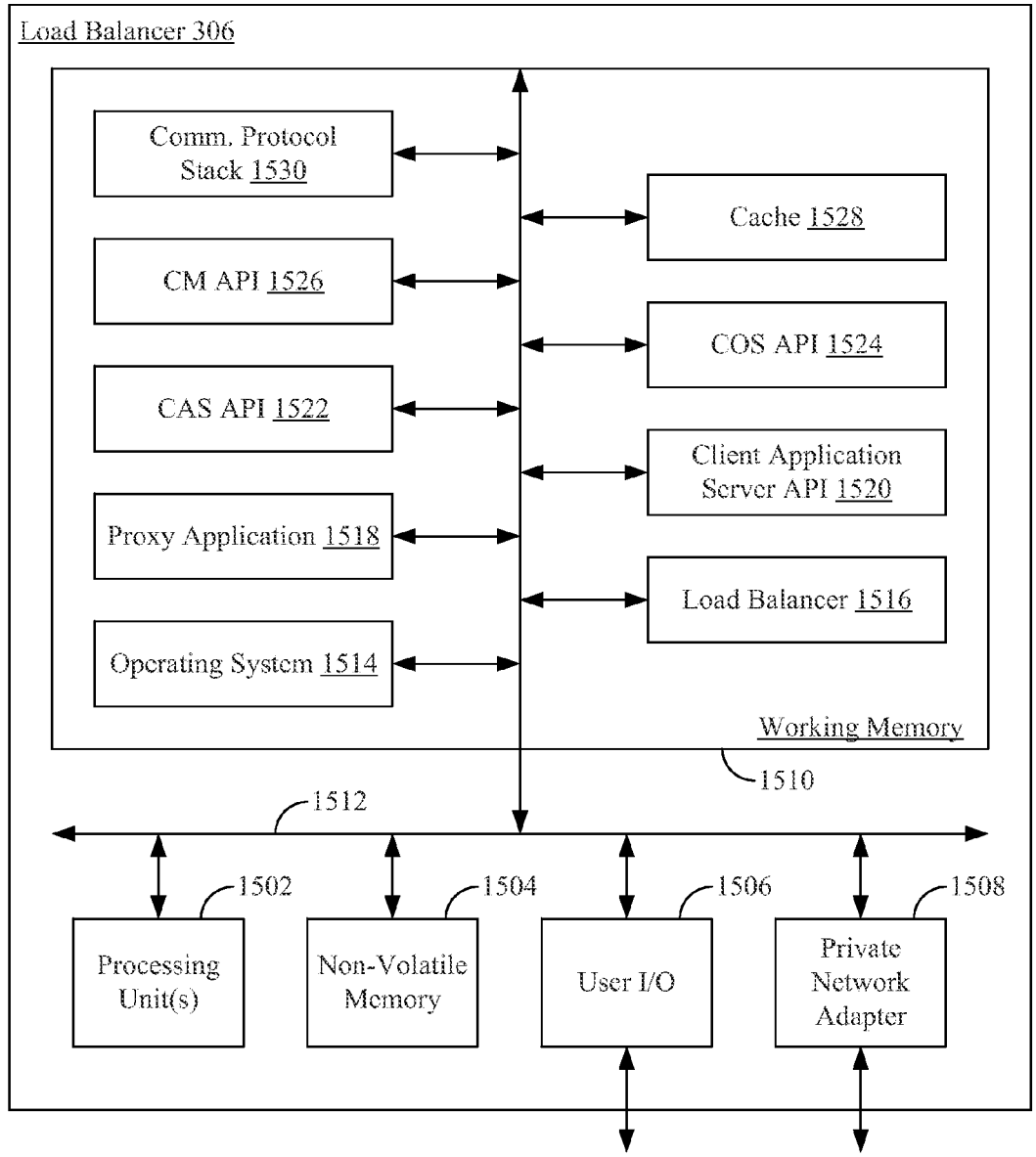
FIG. 15 is a block diagram showing a load balancer of FIG. 3 in greater detail according to one embodiment of the present invention.

FIG. 15 is a block diagram showing a load balancer 306 in greater detail according to one embodiment of the present invention. Load balancer 306 includes one or more processing unit(s) (PU) 1502, non-volatile memory 1504, a user I/O controller 1506, a private network adapter 1508, and a working memory 1510, all intercommunicating via a system bus 1512. PU(s) 1502 execute(s) data and code contained in working memory 1510 to cause load balancer 306 to carry out its intended functions (e.g. balancing upload and download requests among servers, proxying, etc.). Non-volatile memory 1504 (e.g. read-only memory, one or more hard disk drives, flash memory, etc.) provides storage for data and code (e.g., boot code, load balancing and proxy applications, etc.) that are retained even when load balancer 306 is powered down. User I/O controller 1506 manages connections for user interface devices (not shown) that facilitate interaction and communication between load balancer 306 and a user (e.g., a cloud administrator). Private network adapter 1508 (e.g. an Ethernet adapter card) transmits data packets onto and receives data packets from private network 302. System bus 1512 facilitates intercommunication between the various components of load balancer 306.

Working memory 1510 (e.g. random access memory) provides dynamic memory for load balancer 306, and includes executable code (e.g. an operating system 1514, etc.), which is loaded into working memory 1510 during system start-up. Operating system 1514 facilitates control and execution of the other modules loaded into working memory 1510. Working memory 1510 also includes a load balancing module 1516 operative to provide the load balancing services described herein and an optional proxy application 1518 operative to provide the optional proxying services described herein. Working memory 1510 is also shown to include a client application server API 1520, a cloud application server (CAS) API 1522, a cloud object server (COS) API 1524, and a configuration and monitoring (CM) API 1526 operative to provide some or all of the functions of client application server API 1306, CAS API 1308, COS API 1310, and CM API 1316, respectively. Working memory 1510 also includes a cache 1528 (e.g., a Memcached cache, etc.) that stores frequently used information, such as portions of the modules in working memory 1510. A communications protocol stack 1530 is also shown in working memory 1510 and facilitates network communications via private network adapter 1508. Working memory 1510 can include multiple iterations of the foregoing modules as desired.

Figure 16:
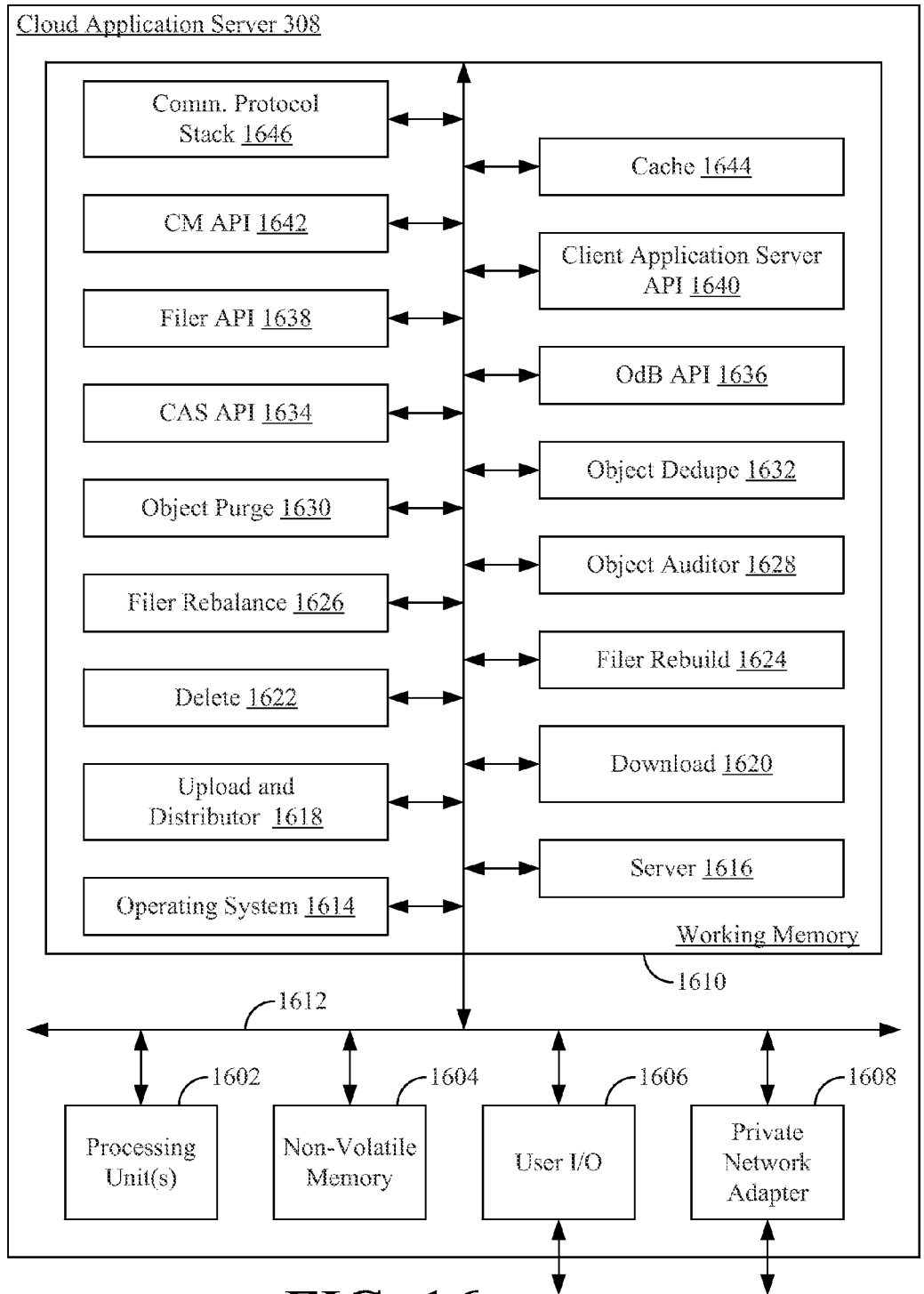
FIG. 16 is a block diagram showing a cloud application server of FIG. 3 in greater detail according to one embodiment of the present invention.

FIG. 16 is a block diagram showing a cloud application server 308 in greater detail, according to one embodiment of the present invention. Cloud application server 308 includes one or more processing unit(s) (PU) 1602, non-volatile memory 1604, a user I/O controller 1606, a private network adapter 1608, and a working memory 1610, all intercommunicating via a system bus 1612. PU(s) 1602 execute(s) data and code contained in working memory 1610 to cause cloud application server 308 to carry out its intended functions (e.g. handling upload requests, rebuilding filers, etc.). Non-volatile memory 1604 (e.g. read-only memory, one or more hard disk drives, flash memory, etc.) provides storage for data and code (e.g., boot code, upload services, etc.) that are retained even when cloud application server 308 is powered down. User I/O controller 1606 manages connections for user interface devices (not shown) that facilitate interaction and communication between cloud application server 308 and a user (e.g., a cloud administrator). Private network adapter 1608 (e.g. an Ethernet adapter card) transmits data packets onto and receives data packets from private network 302. System bus 1612 facilitates intercommunication between the various components of cloud application server 308.

Working memory 1610 (e.g. random access memory) provides dynamic memory for cloud application server 308, and includes executable code (e.g. an operating system 1614, etc.), which is loaded into working memory 1610 during system start-up. Operating system 1614 facilitates control and execution of the other modules loaded into working memory 1610. Working memory 1610 also includes a server application 1616 that receives and responds to communications with cloud application server 308. Working memory 1610 further includes an upload and distributor module 1618, a download module 1620, a delete module 1622, a filer rebuild module 1624, a filer rebalance module 1626, an object auditor module 1628, an object purge module 1630, and an object dedupe module 1632 each of which is operative to provide the services of upload service 920 and distributor service 922, download service 926, delete service 928, filer rebuild service 930, filer rebalance service 932, object auditor service 934, object purge service 936, and object dedupe service 938 of FIG. 9, respectively. Working memory 1610 also includes a cloud application server (CAS) API 1634, an object database (OdB) API 1636, a filer API 1638, optionally a client application server API 1640, and a configuration and monitoring (CM) API 1642 that perform some or all of the functions of CAS API 1308, OdB API 1312, filer API 1314, client application server API 1306, and CM API 1316, respectively. Working memory 1610 also includes a cache 1644 (e.g., a Memcached cache, etc.) that stores frequently used information, such as shard table 500C, filer summary table 700, portions of modules in working memory 1610, etc. A communications protocol stack 1646 is also shown in working memory 1610 and facilitates network communications via private network adapter 1608. It should be noted that each cloud application server 308(1-*e*) may not include all of the modules shown in working memory 1610. Rather, the cloud application servers 308(1-*e*) can specialize in particular functions and, therefore, would include only particular ones of modules shown in working memory 1610. Working memory 1610 can include multiple iterations of the foregoing modules as desired.

Figure 17:
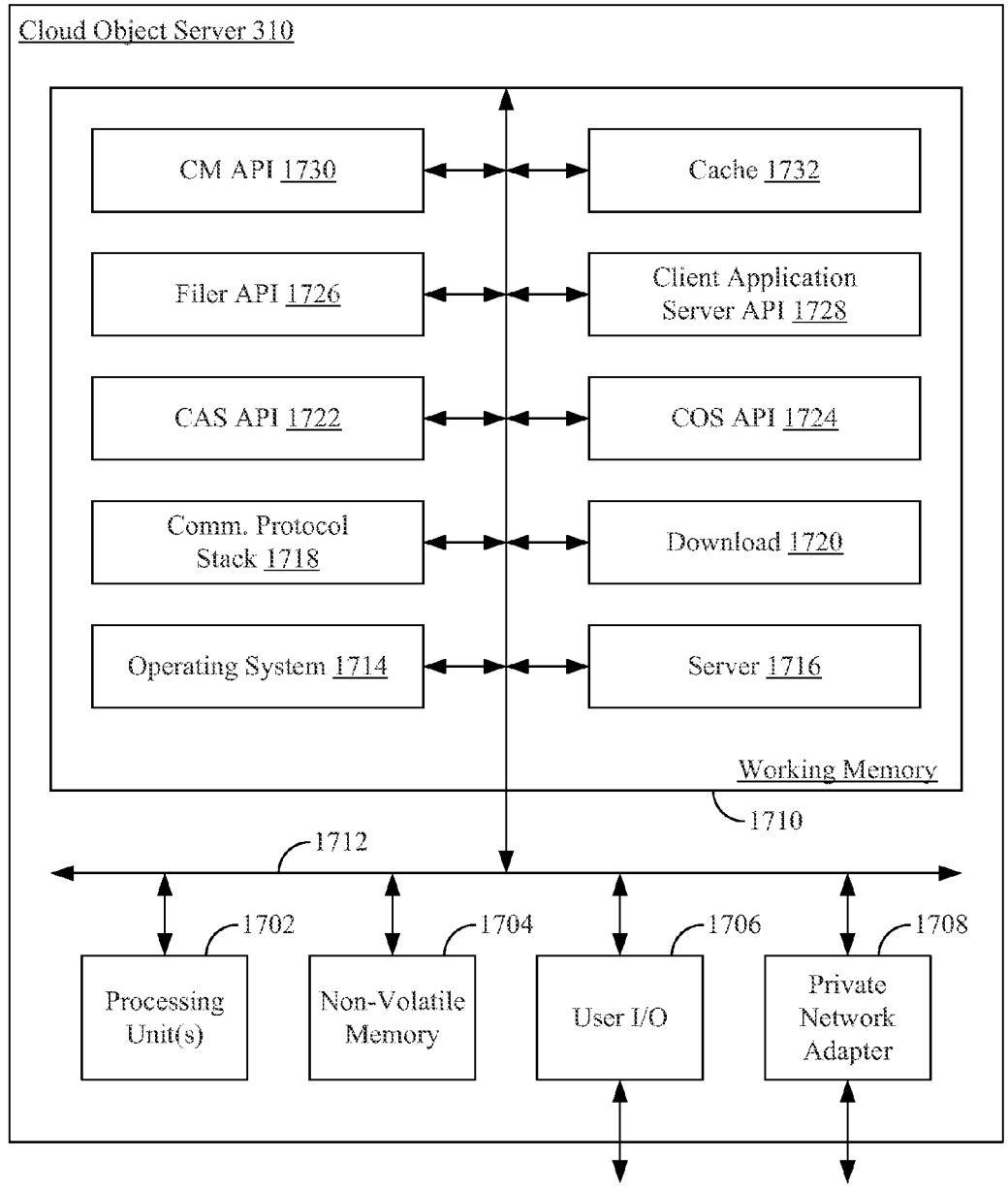
FIG. 17 is a block diagram showing a cloud object server of FIG. 3 in greater detail according to one embodiment of the present invention.

FIG. 17 is a block diagram showing a cloud object server 310 in greater detail, according to one embodiment of the present invention. Cloud object server 310 includes one or more processing unit(s) (PU) 1702, non-volatile memory 1704, a user I/O controller 1706, a private network adapter 1708, and a working memory 1710, all intercommunicating via a system bus 1712. PU(s) 1702 execute(s) data and code contained in working memory 1710 to cause cloud object server 310 to carry out its intended functions (e.g. object downloads, etc.). Non-volatile memory 1704 (e.g. read-only memory, one or more hard disk drives, flash memory, etc.) provides storage for data and code (e.g., boot code, download services, etc.) that are retained even when cloud object server 310 is powered down. User I/O controller 1706 manages connections for user interface devices (not shown) that facilitate interaction and communication between cloud object server 310 and a user (e.g., a cloud administrator). Private network adapter 1708 (e.g. an Ethernet adapter card) transmits data packets onto and receives data packets from private network 302. System bus 1712 facilitates intercommunication between the various components of cloud object server 310.

Working memory 1710 (e.g. random access memory) provides dynamic memory for cloud object server 310, and includes executable code (e.g. an operating system 1714, etc.), which is loaded into working memory 1710 during system start-up. Operating system 1714 facilitates control and execution of the other modules loaded into working memory 1710. Working memory 1710 also includes a server application 1716 that receives and responds to communications with cloud object server 310. A communications protocol stack 1718 is also shown in working memory 1710 and facilitates network communications via private network adapter 1608. Working memory 1710 further includes a download module 1720 that provides the functions of download service 926 of FIG. 9. Also shown in working memory 1710 are cloud application server (CAS) API 1722, a cloud object server (COS) API 1724, a filer API 1726, optionally a client application server API 1728, and a configuration and monitoring API 1730 that perform some or all of the functions of CAS API 1308, COS API 1310, filer API 1314, client application server API 1306, and CM API 1316, respectively. Working memory 1710 further includes a cache 1732 (e.g., a Memcached cache, etc.) that stores frequently used information, such as filer summary table 700, object records 504, portions of the foregoing modules in working memory 1710, etc. Working memory 1710 can include multiple iterations of the foregoing modules as desired.

Figure 18:
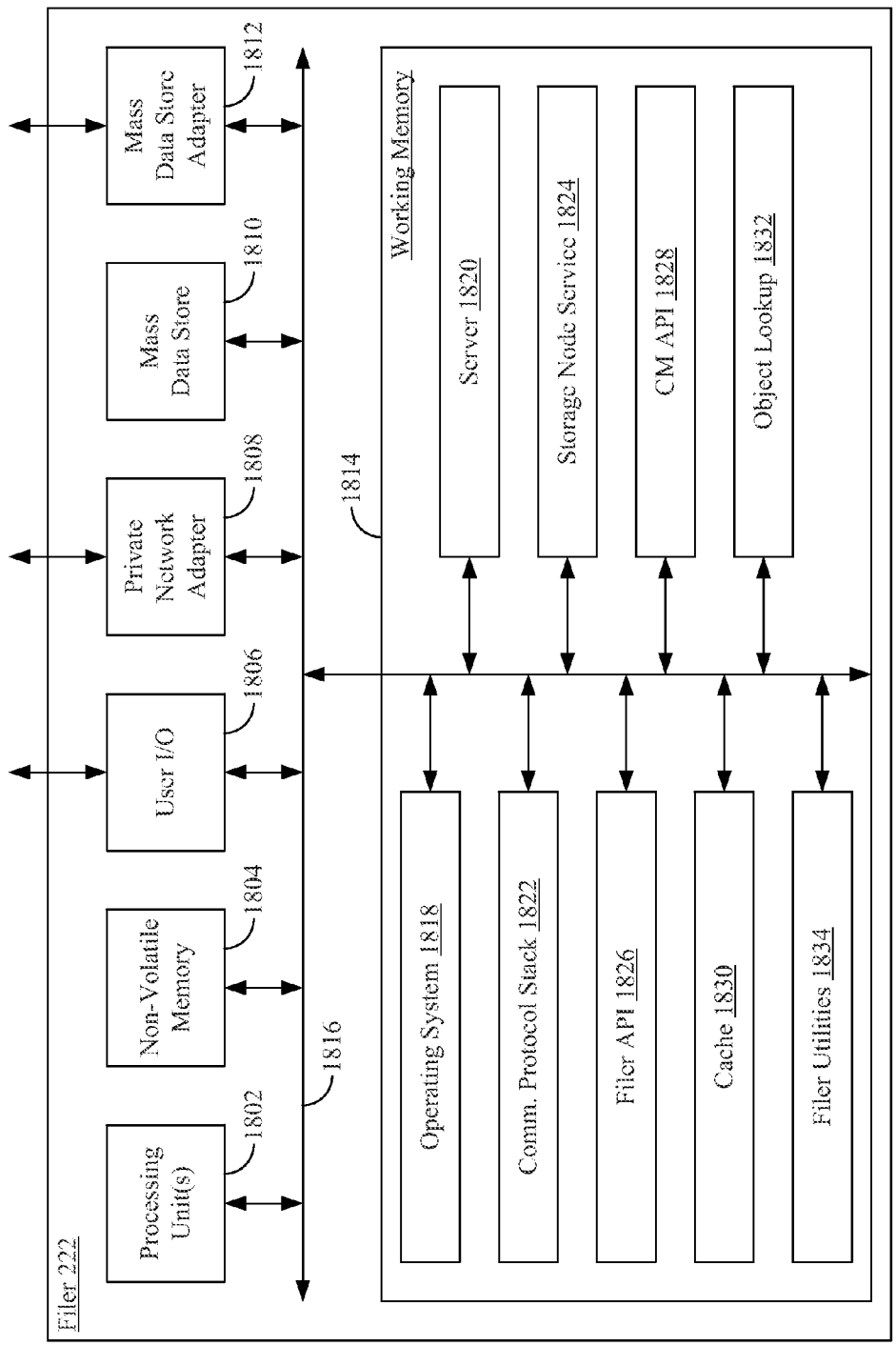
FIG. 18 is a block diagram showing a filer of FIG. 3 in greater detail according to one embodiment of the present invention.

FIG. 18 is a block diagram showing a filer 222 in greater detail according to one embodiment of the present invention. Filer 222 includes one or more processing unit(s) (PU) 1802, non-volatile memory 1804, a user I/O controller 1806, a private network adapter 1808, a mass data store 1810, a mass data store adapter 1812, and a working memory 1814, all intercommunicating via a system bus 1816. PU(s) 1802 execute(s) data and code contained in working memory 1810 to cause filer 222 to carry out its intended functions (e.g. process requests to upload, download, and delete objects, etc.). Non-volatile memory 1804 (e.g. read-only memory, one or more hard disk drives, flash memory, etc.) provides storage for data and code (e.g., boot code, download services, etc.) that are retained even when filer 222 is powered down. User I/O controller 1806 manages connections for user interface devices (not shown) that facilitate interaction and communication between filer 222 and a user (e.g., a cloud administrator). Private network adapter 1808 (e.g. an Ethernet adapter card) transmits data packets onto and receives data packets from private network 302. Private network adapter 1808 can also be used to access a NAS-type mass data store 322. Mass data store 1810 represents an embodiment of mass data store 322 that is adapted to couple to bus 1810 (e.g., a RAID device, etc.). Mass data store adapter 1812 is an adapter (e.g., an FCoE adapter, etc.) for communicating with a mass data store 322 that is not coupled to system bus 1816, for example, a JBOD or D-RAID device. Mass data store adapter 1812 also represents a WAN adapter that communicates with a remote mass data store (e.g., another private or public cloud) via Internet 106. System bus 1816 facilitates intercommunication between the various components of filer 222.

Working memory 1814 (e.g. random access memory) provides dynamic memory for filer 222, and includes executable code (e.g. an operating system 1818, etc.), which is loaded into working memory 1814 during system start-up. Operating system 1818 facilitates control and execution of the other modules loaded into working memory 1814. Working memory 1814 also includes a server application 1820 that receives and responds to communications with filer 222 as well as a communications protocol stack 1822 that facilitates network communications via private network adapter 1808 and/or mass data store adapter 1812. Working memory 1814 also includes a storage node service module 1824 that provides the services of storage node service 940 of FIG. 9. Also shown in working memory 1814 are a filer API 1826 and a configuration and monitoring (CM) API 1828 that provides all or some of the functions of filer API 1314 and CM API 1316 of FIG. 13, respectively. Working memory 1814 further includes a cache 1830 (e.g., a Memcached cache, etc.) that stores frequently used information, including portions of the modules of working memory 1814. Working memory 1814 is also shown to include an object lookup module 1832 and other filer utility modules 1834. Object lookup module 1832 represents a utility (e.g., a look-up table, etc.) that facilitates rapid retrieval of objects stored on mass data store 322. Filer utilities 1834 represent other data storage utilities (e.g., compression and decompression programs, encryption and decryption programs, etc.) that might be useful to storage node service 1824. Working memory 1814 can include multiple iterations of the foregoing modules as desired.

Figure 19:
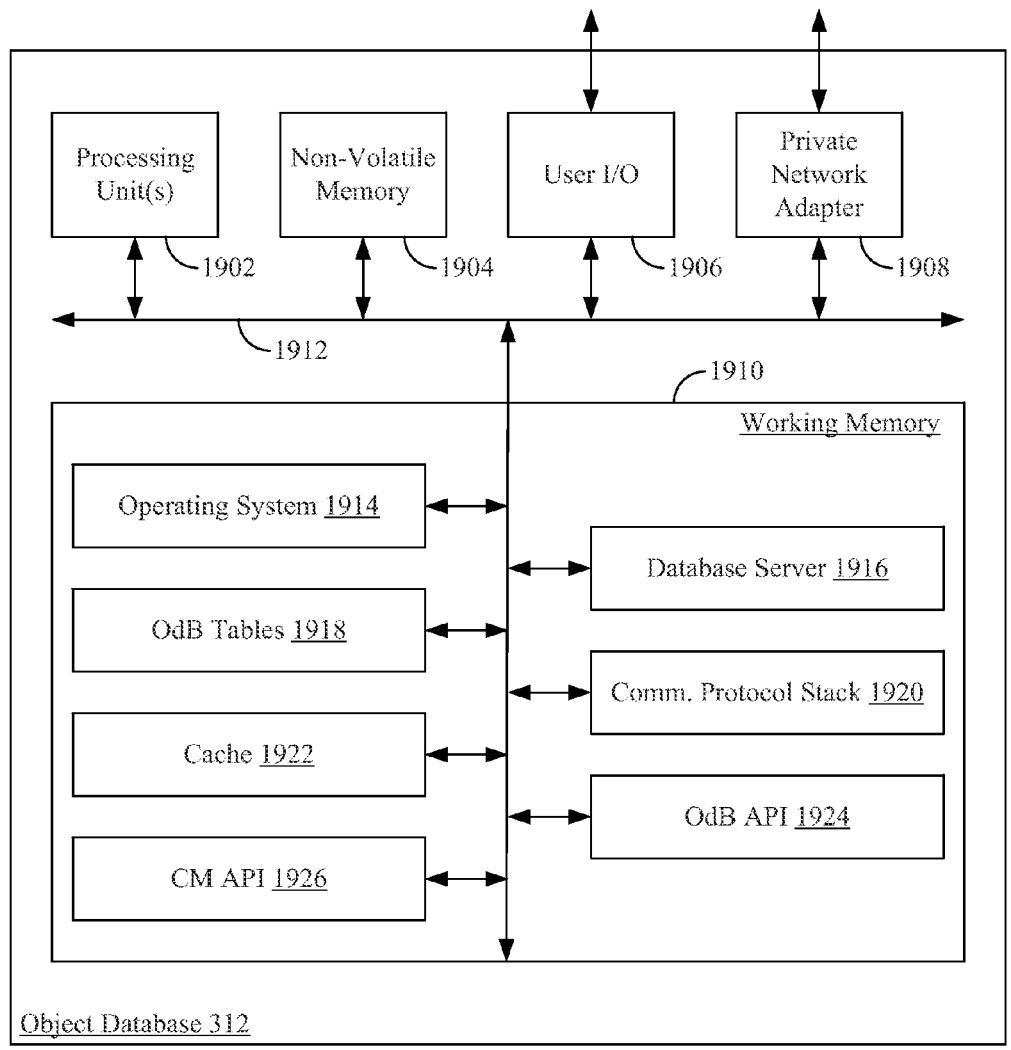
FIG. 19 is a block diagram showing an object database of FIG. 3 in greater detail according to one embodiment of the present invention.

FIG. 19 is a block diagram showing an object database 312 in greater detail according to one embodiment of the present invention. Object database 312 includes one or more processing unit(s) (PU) 1902, non-volatile memory 1904, a user I/O controller 1906, a private network adapter 1908, and a working memory 1910, all intercommunicating via a system bus 1912. PU(s) 1902 execute(s) data and code contained in working memory 1910 to cause object database 312 to carry out its intended functions (e.g. receive queries regarding object records, return object information, create and modify object records, etc.). Non-volatile memory 1904 (e.g. read-only memory, one or more hard disk drives, flash memory, etc.) provides storage for data and code (e.g., boot code, database tables and servers, etc.) that are retained even when object database 312 is powered down. User I/O controller 1906 manages connections for user interface devices (not shown) that facilitate interaction and communication between object database 312 and a user (e.g., a cloud administrator). Private network adapter 1908 (e.g. an Ethernet adapter card) transmits data packets onto and receives data packets from private network 302. System bus 1912 facilitates intercommunication between the various components of object database 312.

Working memory 1910 (e.g. random access memory) provides dynamic memory for object database 312, and includes executable code (e.g. an operating system 1914, etc.), which is loaded into working memory 1910 during system start-up. Operating system 1914 facilitates control and execution of the other modules loaded into working memory 1910. Working memory 1910 also includes a database server 1916 (e.g., a key-value store service, a relational database server, etc.) that receives and responds to queries of object database 312. OdB tables 1918 represent the tables shown in FIGS. 5A-5C used by object database 312, such as one or more object-filer map shard(s) 502 containing an object-filer map table 500A and deleted object-filer map table 500B, shards table 500C, and optionally one or more shards 550 of filer rebuild table 500D. Because OdB tables 1918 are expected to be large, portions of OdB tables 1918 can be swapped into and out of working memory 1910 from non-volatile memory 1904 as needed. Working memory 1910 also includes a communications protocol stack 1920 that facilitates network communications via private network adapter 1908 and a cache 1922 (e.g., a Memcached cache, etc.) that stores frequently used information, including portions of the modules of working memory 1910. Also shown in working memory are object database API 1924 and configuration and monitoring (CM) API 1926 that perform all or some of the functions of OdB API 1312 and CM API 1316, respectively, of FIG. 13. Working memory 1910 can include multiple iterations of the foregoing modules as desired.

Figure 20:
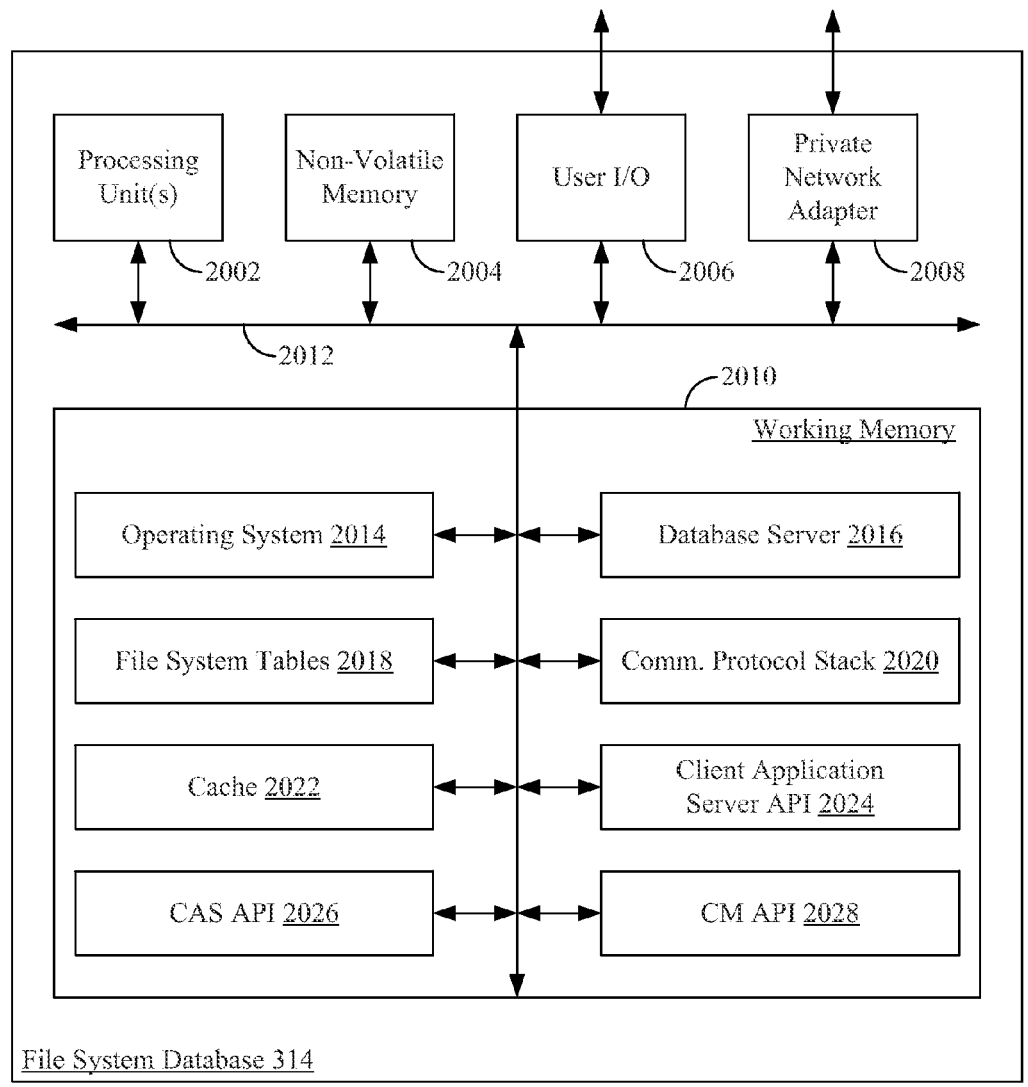
FIG. 20 is a block diagram showing a file system database of FIG. 3 in greater detail according to one embodiment of the present invention.

FIG. 20 is a block diagram showing a file system database 314 in greater detail according to one embodiment of the present invention. File system database 314 includes one or more processing unit(s) (PU) 2002, non-volatile memory 2004, a user I/O controller 2006, a private network adapter 2008, and a working memory 2010, all intercommunicating via a system bus 2012. PU(s) 2002 execute(s) data and code contained in working memory 2010 to cause file system database 314 to carry out its intended functions (e.g. receive queries regarding virtual object records, provide virtual file system information, etc.). Non-volatile memory 2004 (e.g. read-only memory, one or more hard disk drives, flash memory, etc.) provides storage for data and code (e.g., boot code, database tables and servers, etc.) that are retained even when file system database 314 is powered down. User I/O controller 2006 manages connections for user interface devices (not shown) that facilitate interaction and communication between file system database 314 and a user (e.g., a cloud administrator). Private network adapter 2008 (e.g. an Ethernet adapter card) transmits data packets onto and receives data packets from private network 302. System bus 2012 facilitates intercommunication between the various components of file system database 314.

Working memory 2010 (e.g. random access memory) provides dynamic memory for file system database 314, and includes executable code (e.g. an operating system 2014, etc.), which is loaded into working memory 2010 during system start-up. Operating system 2014 facilitates control and execution of the other modules loaded into working memory 2010. Working memory 2010 also includes a database server 2016 (e.g., a relational database server) that receives and responds to queries of file system database 314. File system tables 2018 represent the tables shown in FIGS. 4A-4C, including clients table 400A and one or more shards 412, where each shard includes tables 400B-400G that store virtual file system information for a client. Because file system tables 2018 are expected to be large, portions of file system tables 2018 can be swapped into and out of working memory 2010 from non-volatile memory 2004 as needed. Working memory 2010 also includes a communications protocol stack 2020, which facilitates network communications via private network adapter 2008, and a cache 2022 (e.g., a Memcached cache, etc.) that stores frequently used information, such as portions of the modules of working memory 2010. Also shown in working memory are a client application server API 2024, a cloud application server (CAS) API 2026, and a configuration and monitoring (CM) API 2028 that perform some or all of the functions of client application server API 1306, CAS API 1308, and CM API 1316, respectively. Working memory 2010 can include multiple iterations of the foregoing modules as desired.

Figure 21:
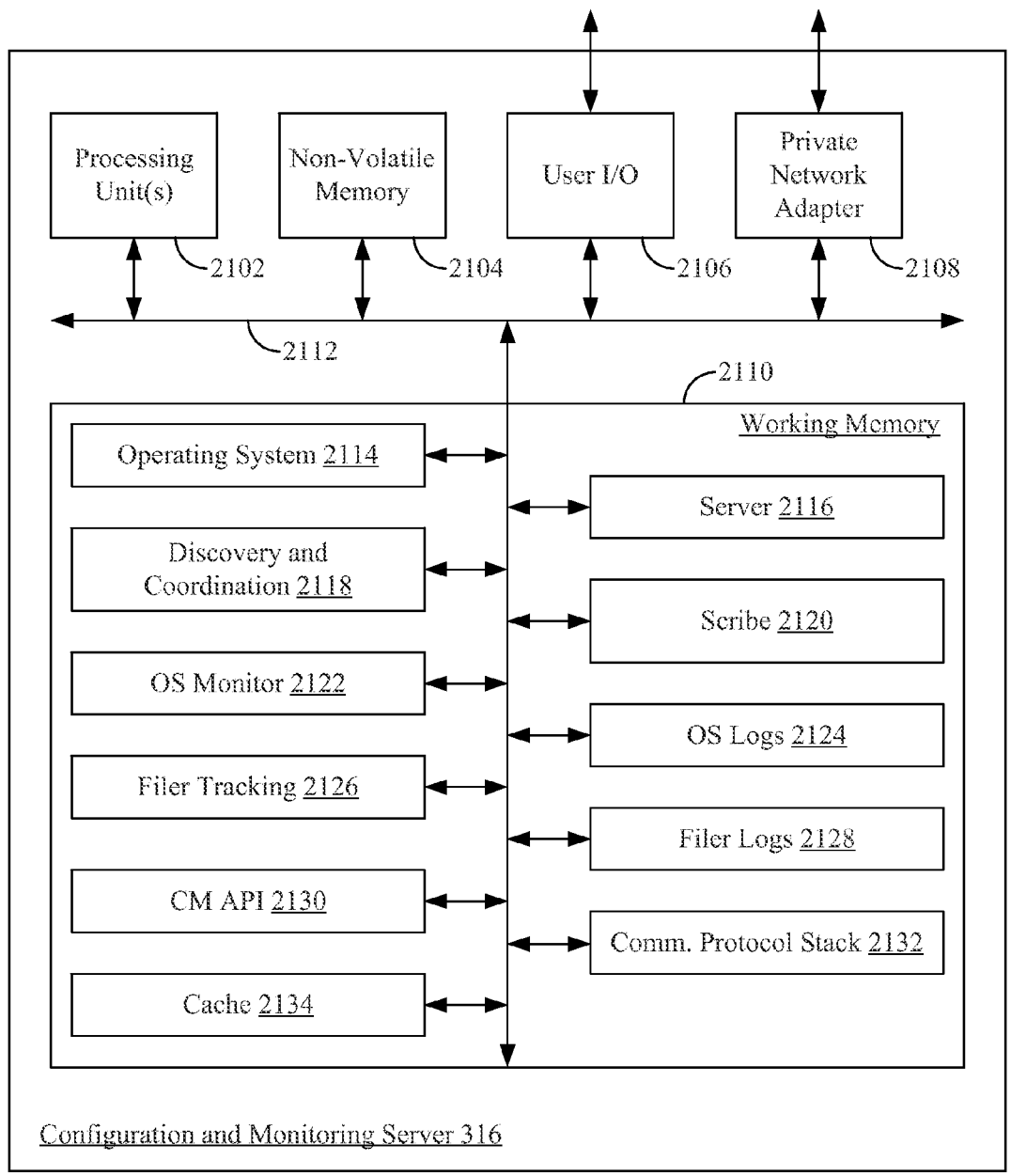
FIG. 21 is a block diagram showing a configuration and monitoring server of FIG. 3 in greater detail, according to one embodiment of the present invention.

FIG. 21 is a block diagram showing a configuration and monitoring server 316 in greater detail, according to one embodiment of the present invention. Configuration and monitoring server 316 includes one or more processing unit(s) (PU) 2102, non-volatile memory 2104, a user I/O controller 2106, a private network adapter 2108, and a working memory 2110, all intercommunicating via a system bus 2112. PU(s) 2102 execute(s) data and code contained in working memory 2110 to cause configuration and monitoring server 316 to carry out its intended functions (e.g. cloud coordination, filer tracking, etc.). Non-volatile memory 2104 (e.g. read-only memory, one or more hard disk drives, flash memory, etc.) provides storage for data and code (e.g., boot code, filer tracking code and data, etc.) that are retained even when configuration and monitoring server 316 is powered down. User I/O controller 2106 manages connections for user interface devices (not shown) that facilitate interaction and communication between configuration and monitoring server 316 and a user (e.g., a cloud administrator). Private network adapter 2108 (e.g. an Ethernet adapter card) transmits data packets onto and receives data packets from private network 302. System bus 2112 facilitates intercommunication between the various components of configuration and monitoring server 316.

Working memory 2110 (e.g. random access memory) provides dynamic memory for configuration and monitoring server 316, and includes executable code (e.g. an operating system 2114, etc.), which is loaded into working memory 2110 during system start-up. Operating system 2114 facilitates control and execution of the other modules loaded into working memory 2110. Working memory 2110 also includes a server 2116 that generates, receives, and responds to communications with the other elements of cloud 102. Working memory 2110 also includes a discovery and coordination module 2118, a scribe module 2120, an object store (OS) monitoring module 2122, an OS logs module 2124, a filer tracking module 2126, and a filer logs module 2128 which implement the features and functions of discovery and coordination service 950, scribe 952, OS monitoring service 954, OS logs 958, filer tracking service 954, and filer logs 956, respectively, of FIG. 9. Working memory also includes a configuration and monitoring (CM) API 2130 that implement the functions of CM API 1316 of FIG. 13. Working memory 2110 also includes a communications protocol stack 2132, which facilitates network communications via private network adapter 2108, and a cache 2134 (e.g., a Memcached cache, etc.) that stores frequently used information, such as portions of the modules of working memory 2110. Working memory 2110 can include multiple iterations of the foregoing modules as desired.

Like the systems shown in FIGS. 14-20, it should be noted that each configuration and monitoring server 316(1-$j$) may not include all of the modules shown in working memory 2110. Rather, the servers 316(1-$j$) can specialize in particular functions and, therefore, would include only particular ones of modules shown in working memory 2110.

Figure 22:
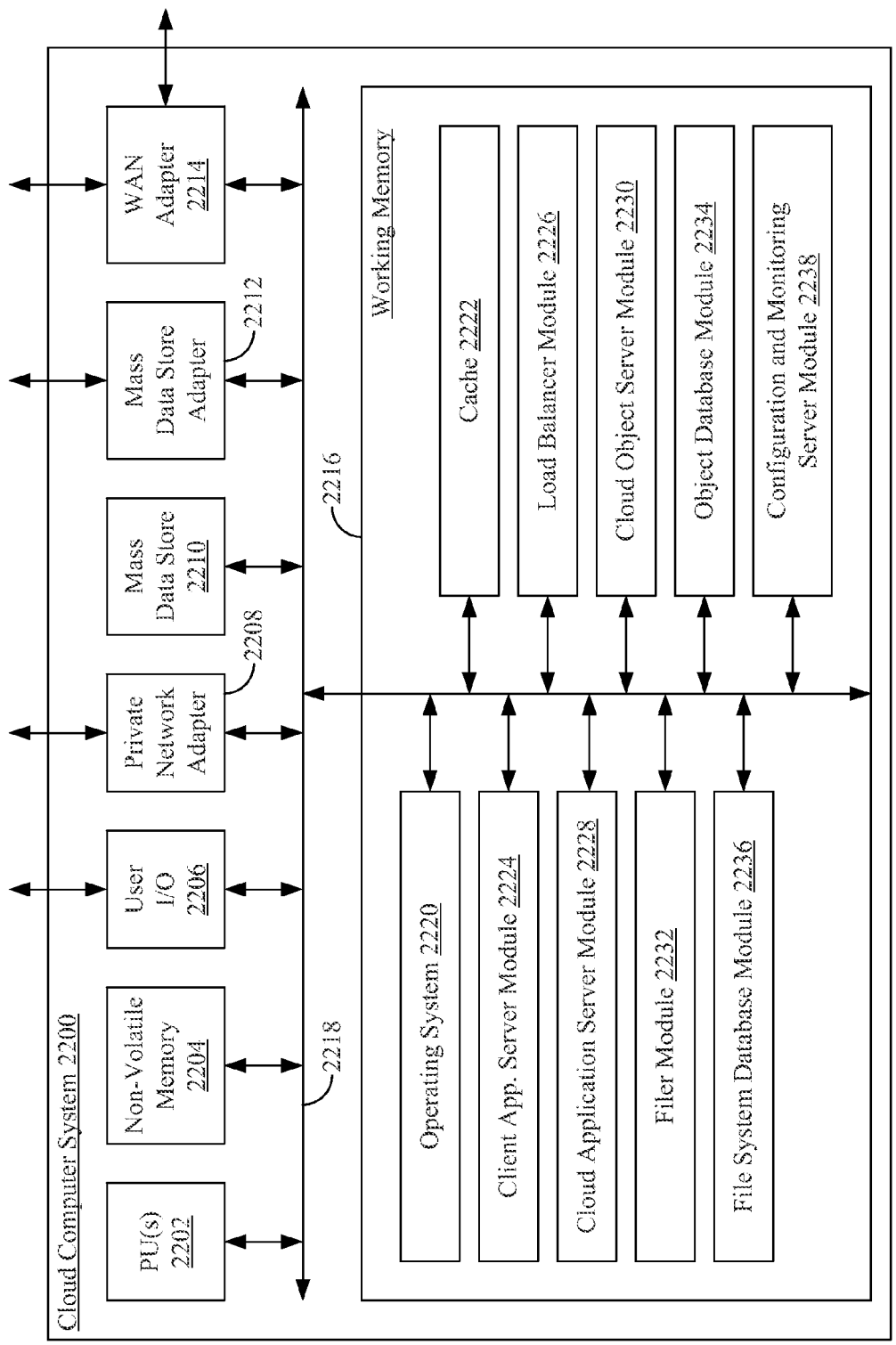
FIG. 22 is a block diagram showing a computer system implementing the cloud of FIG. 3 according to another embodiment of the present invention.

FIGS. 14-21 show the elements of FIG. 3 coupled to private network 302 operating on systems coupled to private network 302. However, it should be understood that any combination of the elements of cloud 102 shown in FIG. 3 can be embodied as software modules operating on the same cloud computer system. FIG. 22 is a block diagram showing one such cloud computer system 2200 according to one embodiment of the present invention.

Computer system 2200 includes one or more processing unit(s) (PU) 2202, non-volatile memory 2204, a user I/O controller 2206, a private network adapter 2208, a mass data store 2210, a mass data store adapter 2212, a wide area network (WAN) adapter 2214, and a working memory 2216, all intercommunicating via a system bus 2218. PU(s) 2202 execute(s) data and code contained in working memory 2216 to cause cloud computer system 2200 to carry out its object storage functions. Non-volatile memory 2204 (e.g. read-only memory, one or more hard disk drives, flash memory, etc.) provides storage for data and code (e.g., boot code, the modules of working memory 2216, etc.) that are retained even when cloud computer system 2200 is powered down. User I/O controller 2206 manages connections for user interface devices (not shown) that facilitate interaction and communication between cloud computer system 2200 and a user (e.g., a cloud administrator). Private network adapter 2208 (e.g. an Ethernet adapter card) transmits data packets onto and receives data packets from private network 302. Mass data store 2210 represents an embodiment of mass data store 322 that is adapted to couple to bus 2218. Mass data store adapter 2212 is an adapter (e.g., an FCoE adapter, etc.) for communicating with a mass data store 322 that is not coupled to system bus 2218. WAN adapter 2214 (e.g. an Ethernet adapter card) transmits data packets onto and receives data packets from Internet 106. System bus 2218 facilitates intercommunication between the various components of cloud computer system 2200.

Working memory 2216 (e.g. random access memory) provides dynamic memory for cloud computer system 2200, and includes executable code (e.g. an operating system 2220, etc.), which is loaded into working memory 2216 during system start-up. Operating system 2220 facilitates control and execution of the other modules loaded into working memory 2216. Working memory 2216 is also shown to include a cache 2222 (e.g., a Memcached cache, etc.) that stores frequently used information (e.g., filer summary table 700, shards table 500C, etc.), including portions of the modules of working memory 2216. Working memory 2216 includes a client application server module 2224 that includes all or some of the modules of working memory 1412 (FIG. 14) to implement client application server 304. Working memory 2216 also includes a load balancer module 2226 that includes all or some of the modules of working memory 1510 (FIG. 15) to implement load balancer 306. Additionally, working memory 2216 includes a cloud application server module 2228 that includes all or some of the modules of working memory 1610 (FIG. 16) to implement cloud application server 308. Working memory 2216 is shown to also include a cloud object server module 2230 that includes all or some of the modules of working memory 1710 (FIG. 17) to implement cloud object server 310. In addition, working memory 2216 includes a filer module 2232 that includes all or some of the modules of working memory 1814 (FIG. 18) to implement filer 222. Working memory 2216 also includes an object database module 2234 that includes all or some of the modules of working memory 1910 (FIG. 19) to implement object database 312. Furthermore, working memory 2216 includes a file system database module 2236 that includes all or some of the modules of working memory 2010 (FIG. 20) to implement file system database 314. Working memory 2216 also includes a configuration and monitoring module 2238 that includes all or some of the modules of working memory 2110 (FIG. 21) to implement configuration and monitoring server 316.

Working memory 2216 is shown to include sufficient software modules to implement all the elements of cloud 102 that are shown in FIG. 3. However, those skilled in the art will realize that various combinations of software modules 2220-2238 implementing the elements of cloud 102 can be distributed and replicated among a plurality of cloud computer systems 2200 as determined to be desirable.

The methods of the present invention will now be described with reference to FIGS. 23-26. For the sake of clear explanation, these methods might be described with reference to particular elements of the previously-described embodiments that perform particular functions. However, it should be noted that other elements, whether explicitly described herein or created in view of the present disclosure, could be substituted for those cited without departing from the scope of the present invention. Therefore, it should be understood that the methods of the present invention are not limited to any particular element(s) that perform(s) any particular function(s). Further, some steps of the methods presented need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 23:
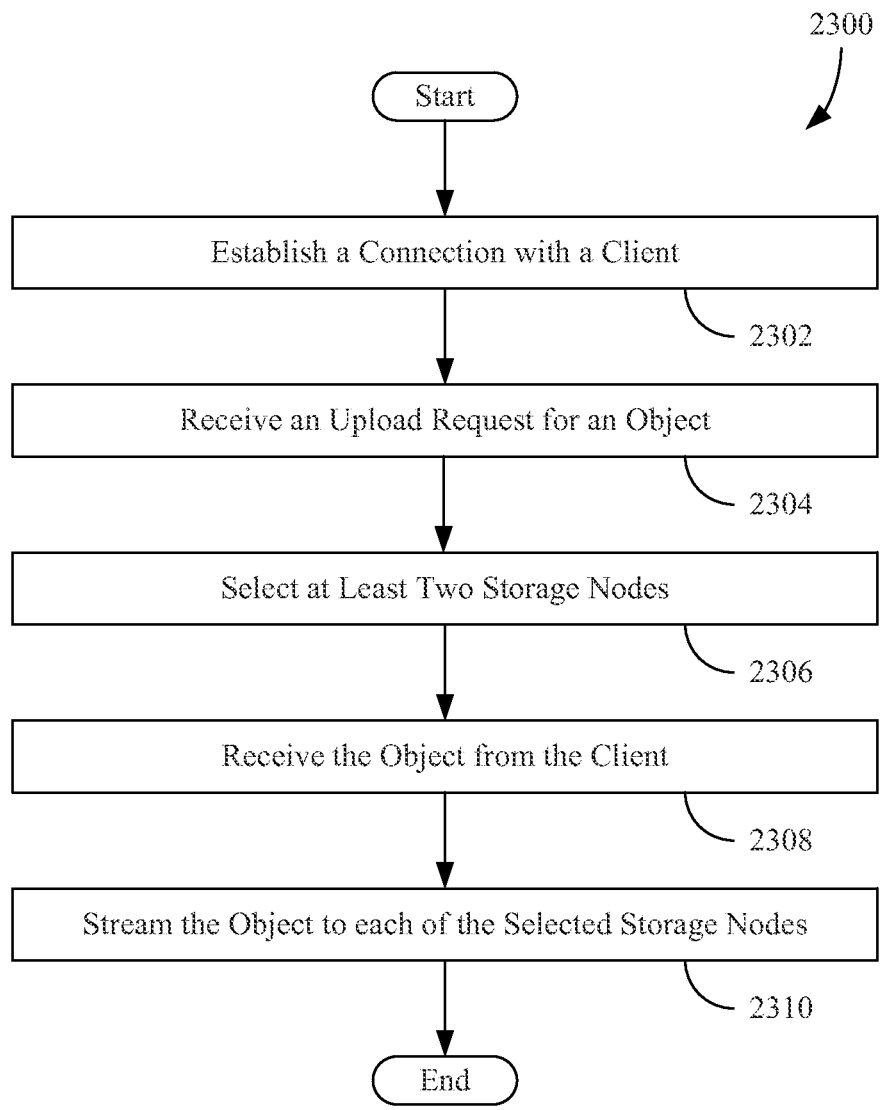
FIG. 23 is a flowchart summarizing a method for storing (uploading) an object on a cloud according to the present invention.

FIG. 23 is a flowchart summarizing a method 2300 for storing (uploading) an object to cloud 102, according to the present invention. In a first step 2302, a client application server 304 establishes a connection with a client (e.g., client 112, local cloud 104, etc.), for example, over Internet 106. Then, in a second step 2304, a cloud application server 308 receives an upload request (e.g., from a load balancer 306, etc.) indicating that the client wants to upload an object to cloud 102. In a third step 2306, cloud application server 308 selects at least two storage nodes (filers 222) using upload service 922 and distributor service 924 on which to store the object. In a fourth step 2308, the cloud application server 308 receives the object from the client, and in a fifth step 2310, the cloud application server 308 causes the object to be streamed to the selected filers 222, optionally without staging, such that the object is stored on each of the selected storage nodes.

Figure 24:
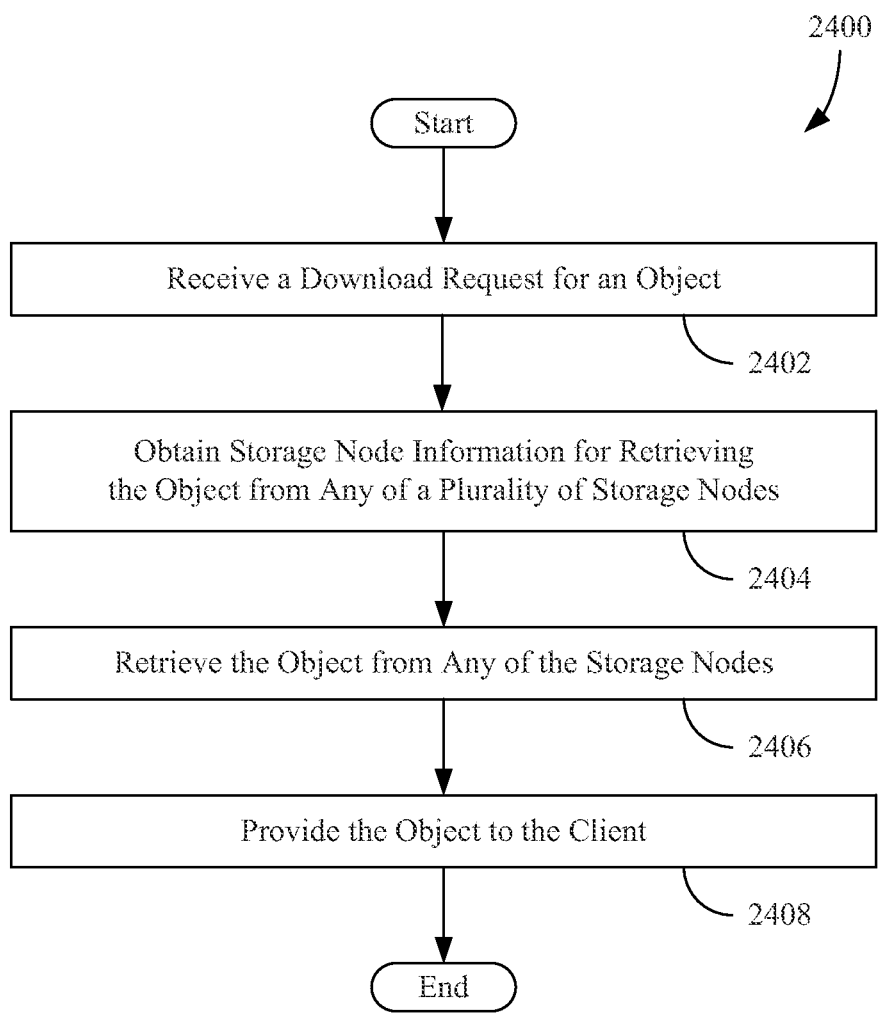
FIG. 24 is a flowchart summarizing a method for retrieving (downloading) an object from a cloud according to the present invention.

FIG. 24 is a flowchart summarizing a method 2400 for retrieving (downloading) an object from cloud 102 according to the present invention. In a first step 2402, a cloud object server 310 receives a download request (e.g., from a load balancer 306, etc.) indicating that the client wants to download an object to cloud 102. In a second step 2404, cloud object server 310 obtains storage node information (e.g., URLs for filers 222(1, . . . , x), path information, etc.) for retrieving the object from any of a plurality of storage nodes (filers 222(1, . . . , x)) from a cloud application server 308. For example, cloud object server 310 can provide a UUID 600 supplied in the download request to the cloud application server 308, and the cloud application server 308 can use the UUID 600 to retrieve an object record 504 for the object and provide all or portions of the object record 504 to the cloud object server 310. In a third step 2406, cloud object server 310 retrieves the object from any of the plurality of storage nodes identified in the storage node information. For example, cloud object server 310 can retrieve the object from any of the filers 222(1, . . . , x) identified in the object record 504 using a path identified in the object record 504. Then, in a fourth step 2408, the cloud object server 310 provides the retrieved object to the client.

Figure 25:
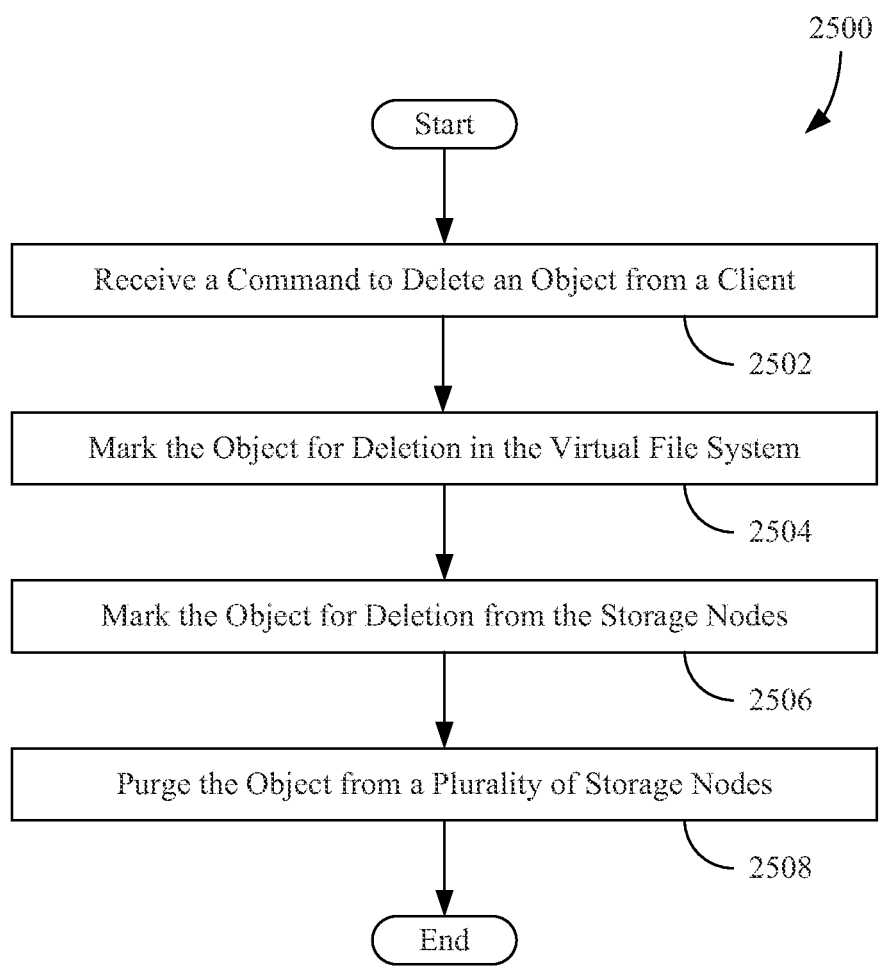
FIG. 25 is a flowchart summarizing a method for deleting an object from a cloud according to the present invention.

FIG. 25 is a flowchart summarizing a method 2500 for deleting an object from cloud 102 according to the present invention. In a first step 2502, a client application server 304 receives a command from a client to delete an object stored in cloud 102. In a second step 2504, the client application server 304 marks the object for deletion in the clients virtual file system, for example, by modifying an associated virtual object record 442 and moving the virtual object record 422 to a virtual objects trash table 400G, where it is stored as a virtual object trash record 468. In a third step 2506, the object is marked for deletion from the storage nodes (filers 222). For example, a cloud application server 308 can query file system database 314 for the virtual object trash record 468 associated with the object, use the record 468 to find and mark a corresponding object record 504 in object database 312 for deletion, and move the object record 504 to the deleted object-filer map table 500B, where it is stored as a deleted object record 522. In a fourth step, the cloud application server 308 purges the object marked for deletion from each of the plurality of storage nodes (e.g., filers 222(1, . . . , x)) on which it is stored, for example, by using the information contained in the associated deleted object record 522 in table 500B.

Figure 26:
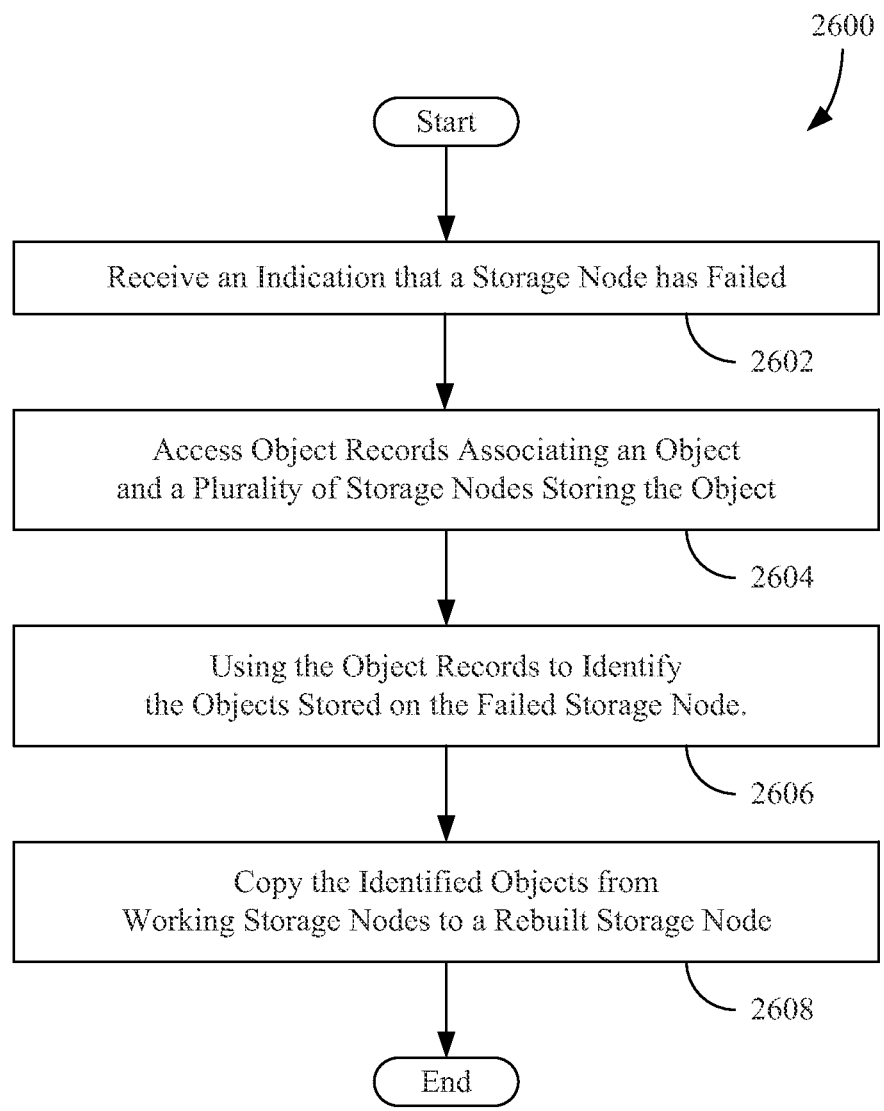
FIG. 26 is a flowchart summarizing a method for rebuilding a failed storage node, including the objects stored on it, according to the present invention.

FIG. 26 is a flowchart summarizing a method 2600 for rebuilding a failed storage node, including the objects stored on it, according to the present invention. In a first step 2602, a cloud application server 308 receives an indication that a storage node (filer 222) has failed. In a second step 2604, the cloud application server 308 accesses object databases 312 (1-g) storing object records, where each object record associates an object with a plurality of storage nodes storing that object. In a third step 2606, cloud application server 308 uses the object records to identify the objects stored on the failed storage node. Cloud application server 308 can identify the objects stored on the failed storage node by searching the object records 504 (and optionally the deleted object records 522) on each shard 502(1-k) of object databases 312(1-g) to identify object records 504 (and optionally deleted object records 522) that identify the failed storage node in one of filer ID fields 508(1-x). Alternatively, if a filer rebuild table 500D exists, cloud application server 308 can identify the objects stored on the failed storage node by locating the shard of filer rebuild table 500D associated with the failed storage node. In a fourth step 2608, cloud application server 308 uses the object records 504, deleted object records 522, and/or object records 552 to copy the identified objects from working storage nodes to a rebuilt storage node.

The description of particular embodiments of the present invention is now complete. Many of the described features may be substituted, altered, or omitted without departing from the scope of the invention. For example, alternate means of locating an object record in an object database (e.g. a path to the object, a hash, a URL, etc.), may be substituted for the Universally-Unique Identifier 600 described herein. As another example, objects (and clients) can be tied to particular filer(s) 222 by embedding details of the filer(s) 222 in a smart key associated with the object, for example in a virtual object identifier. Such a modification would provide the advantage that the object database(s) can be eliminated. As still another example, the upload service can use write-back caching to improve performance by committing uploads locally and then replicating the uploaded objects across the filers 222 at a later time. The download service can also use an intermediate caching layer to store read objects. These and other deviations from the particular embodiments shown will be apparent to those skilled in the art, particularly in view of the foregoing disclosure.

We claim:

1. An object storage system comprising:
   a plurality of storage nodes for storing digital objects associated with clients;
   at least one client application server being operative to
      establish a network connection with a client over an inter-network,
      receive an indication of an object to be uploaded by said client,
      generate an upload request associated with said object, and
      receive said object from said client via said inter-network;
   at least one cloud application server being operative to
      receive said upload request from said client application server,
      generate a Universally Unique Identifier (UUID) associated with said object,
      select at least two storage nodes from said plurality of storage nodes,
      receive said object from said client application server, and
      stream said object to each of said selected storage nodes such that said object is stored on each of said selected storage nodes;
   a file system database storing information defining a virtual file system associated with said client and accessible to said client application server, said UUID being stored in said file system database; and
   at least one cloud object server; and wherein
   said client application server is further operative to
      receive a download command for said object from said client,
      retrieve said UUID from said file system database, and
      provide said UUID to said cloud object server.

2. The system of claim 1, wherein each of said plurality of storage nodes exposes a HyperText Transfer Protocol (HTTP) interface.

3. The system of claim 1, wherein the number of said selected storage nodes is configurable.

4. The system of claim 1, further comprising:
   an object database storing a plurality of object records each associating a stored object and multiple ones of said storage nodes; and said cloud application server is further operative to cause an object record associating said object and said selected storage nodes to be written to said object database.

5. The system of claim 4, wherein said cloud application server is further operative to:
receive an indication that said object is to be deleted; and
modify said object record to indicate that said object is marked for deletion.

6. The system of claim 5, wherein said cloud application server is further operative to purge said object marked for deletion from each of said selected storage nodes.

7. The system of claim 4, wherein:
said object database is sharded into a plurality of shards; and
each shard includes some of said plurality of object records.

8. The system of claim 7, wherein:
said object database further includes a plurality of shard records; and
each of said shard records includes a shard identifier uniquely identifying one of said shards.

9. The system of claim 7, wherein said UUID includes:
a first field containing data identifying one of said plurality of shards containing said object record associated with said object; and
a second field containing an object identifier identifying said object record among said plurality of object records.

10. The system of claim 4, wherein:
said client application server is further operative to
generate a download request associated with said object; and
said cloud object server is operative to
receive said download request,
request said cloud application server to provide storage node information facilitating the retrieval of said object from any of said selected storage nodes,
request said object from any one of said selected storage nodes, and
provide said object to said client application server.

11. The system of claim 10, wherein:
said object database is sharded into a plurality of shards;
each shard includes some of said plurality of object records; and
said download request includes said UUID, said UUID comprising a shard identifier identifying one of said plurality of shards containing said object record.

12. The system of claim 11, wherein:
said cloud object server is operative to provide said UUID to said cloud application server as part of said request for said storage node information; and
said cloud application server is further operative to use said UUID to query said object database to return said storage node information.

13. The system of claim 1, wherein said cloud object server, responsive to receiving said UUID, is operative to use said UUID to obtain information facilitating the retrieval of said object from any of said selected storage nodes.

14. The system of claim 1, wherein
said client application server is further operative to store a virtual object record associated with said object in said file system database.

15. The system of claim 14, wherein said client application server is further operative to:
receive a delete command from said client requesting that said object be deleted; and
modify said virtual object record to indicate that said object is to be deleted.

16. The system of claim 14, wherein:
said file system database includes a plurality of tables defining said virtual file system;
said plurality of tables is sharded into a plurality of shards; and
said data defining said virtual file system associated with said client is stored in only one of said plurality of shards.

17. The system of claim 1, further comprising:
a plurality of cloud object servers each being operative to retrieve said object from one of said selected storage nodes and serve said object to said client application server responsive to receiving a download request for said object;
a plurality of said cloud application servers; and
a load balancer operative to
receive said upload request from said client application server and provide it to a selected one of said plurality of cloud application servers and
receive said download request from said client application server and provide it to a selected one of said plurality of cloud object servers.

18. The system of claim 1, further comprising a storage node recovery module operative to rebuild one of said plurality of storage nodes, including said digital objects stored on said one of said plurality of storage nodes, when said one of said storage nodes fails.

19. The system of claim 18, further comprising:
an object database storing a plurality of object records associated with a plurality of stored objects, each said object record indicating multiple ones of said storage nodes storing an associated stored object; and wherein
said storage node recovery module is operative to rebuild said failed storage node as a rebuilt storage node by using said plurality of object records in said object database to identify said stored objects stored on said failed storage node and copy said identified stored objects from other ones of said plurality of storage nodes to said rebuilt storage node.

20. The system of claim 18, further comprising:
a database storing a plurality of object records associated with a plurality of stored objects, each said object record indicating multiple ones of said storage nodes storing an associated stored object; and wherein
said plurality of object records are sharded by storage node; and
said storage node recovery module is operative to rebuild said failed storage node as a rebuilt storage node by identifying a shard associated with said failed storage node and copying objects associated with the object records contained in said identified shard from other ones of said plurality of storage nodes to said rebuilt storage node.

21. The system of claim 1, further comprising a rebalance module operative to move objects stored on said one of said plurality of storage nodes to other ones of said plurality of storage nodes.

22. The system of claim 21, further comprising:
an object database storing a plurality of object records associated with a plurality of stored objects, each said object record indicating multiple ones of said storage nodes storing an associated stored object; and wherein
said rebalance module is operative to modify at least some of said plurality of object records.

23. The system of claim 1, further comprising an object auditor operative to determine whether said object stored on one or more of said selected storage nodes has degraded.

24. The system of claim 1, wherein:
said client application server is further operative to receive a second object from said client via said inter-network; and
said cloud application server is further operative to
select at least two storage nodes from said plurality of storage nodes for said second object that are different from said at least two storage nodes selected for said object and
store said second object on each of said storage nodes selected for said second object.

25. The system of claim 1, wherein multiple ones of said plurality of storage nodes are selected on an object-by-object basis for additional objects uploaded by said client.

26. An object storage system comprising:
a plurality of storage nodes for storing digital objects associated with clients;
at least one client application server being operative to
establish a network connection with a client over an inter-network,
receive an indication of an object to be uploaded by said client,
generate an upload request associated with said object, and
receive said object from said client via said inter-network;
at least one cloud application server being operative to
receive said upload request from said client application server,
generate a Universally Unique Identifier (UUID) associated with said object, and
receive said object from said client application server;
means for selecting at least two storage nodes from said plurality of storage nodes in response to said upload request;
means for streaming said object from said client application server to each of said selected storage nodes such that said object is stored on each of said selected storage nodes;
a file system database storing information defining a virtual file system associated with said client and accessible to said client application server, said UUID being stored in said file system database;
at least one cloud object server; and wherein
said client application server is further operative to
receive a download command for said object from said client,
retrieve said UUID from said file system database, and
provide said UUID to said cloud object server.

27. The system of claim 26, wherein each of said plurality of storage nodes exposes a HyperText Transfer Protocol (HTTP) interface.

28. The system of claim 26, wherein the number of said selected storage nodes is configurable.

29. The system of claim 26, further comprising:
an object database storing a plurality of object records each associating a stored object and multiple ones of said storage nodes; and
said cloud application server is further operative to cause an object record associating said object and said selected storage nodes to be written to said object database.

30. The system of claim 29, wherein said cloud application server is further operative to:
receive an indication that said object is to be deleted; and
modify said object record to indicate that said object is marked for deletion.

31. The system of claim 30, wherein said cloud application server is further operative to purge said object marked for deletion from each of said selected storage nodes.

32. The system of claim 29, wherein:
said object database is sharded into a plurality of shards; and
each shard includes some of said plurality of object records.

33. The system of claim 32, wherein:
said object database further includes a plurality of shard records; and
each of said shard records includes a shard identifier uniquely identifying one of said shards.

34. The system of claim 32, wherein said UUID includes:
a first field containing data identifying one of said plurality of shards containing said object record associated with said object; and
a second field containing an object identifier identifying said object record among said plurality of object records.

35. The system of claim 29, wherein:
said client application server is further operative to generate a download request associated with said object; and
said cloud object server is operative to
receive said download request,
request said cloud application server to provide storage node information facilitating the retrieval of said object from any of said selected storage nodes,
request said object from any one of said selected storage nodes, and
provide said object to said client application server.

36. The system of claim 35, wherein:
said object database is sharded into a plurality of shards;
each shard includes some of said plurality of object records; and
said download request includes said UUID, said UUID comprising a shard identifier identifying one of said plurality of shards containing said object record.

37. The system of claim 36, wherein:
said cloud object server is operative to provide said UUID to said cloud application server as part of said request for said storage node information; and
said cloud application server is further operative to use said UUID to query said object database to return said storage node information.

38. The system of claim 26, wherein said cloud object server, responsive to receiving said UUID, is operative to use said UUID to obtain information facilitating the retrieval of said object from any of said selected storage nodes.

39. The system of claim 26, wherein said client application server is further operative to store a virtual object record associated with said object in said file system database.

40. The system of claim 39, wherein said client application server is further operative to:
receive a delete command from said client requesting that said object be deleted; and
modify said virtual object record to indicate that said object is to be deleted.

41. The system of claim 39, wherein:
said file system database includes a plurality of tables defining said virtual file system;
said plurality of tables is sharded into a plurality of shards; and
said data defining said virtual file system associated with said client is stored in only one of said plurality of shards.

42. The system of claim 26, further comprising:
a plurality of cloud object servers each being operative to retrieve said object from one of said selected storage nodes and serve said object to said client application server responsive to receiving a download request for said object;
a plurality of said cloud application servers; and
a load balancer operative to
receive said upload request from said client application server and provide it to a selected one of said plurality of cloud application servers and
receive said download request from said client application server and provide it to a selected one of said plurality of cloud object servers.

43. The system of claim 26, further comprising a storage node recovery module operative to rebuild one of said plurality of storage nodes, including said digital objects stored on said one of said plurality of storage nodes, when said one of said storage nodes fails.

44. The system of claim 43, further comprising:
an object database storing a plurality of object records associated with a plurality of stored objects, each said object record indicating multiple ones of said storage nodes storing an associated stored object; and wherein
said storage node recovery module is operative to rebuild said failed storage node as a rebuilt storage node by using said plurality of object records in said object database to identify said stored objects stored on said failed storage node and copy said identified stored objects from other ones of said plurality of storage nodes to said rebuilt storage node.

45. The system of claim 43, further comprising:
a database storing a plurality of object records associated with a plurality of stored objects, each said object record indicating multiple ones of said storage nodes storing an associated stored object; and wherein
said plurality of object records are sharded by storage node; and
said storage node recovery module is operative to rebuild said failed storage node as a rebuilt storage node by identifying a shard associated with said failed storage node and copying objects associated with the object records contained in said identified shard from other ones of said plurality of storage nodes to said rebuilt storage node.

46. The system of claim 26, further comprising a rebalance module operative to move objects stored on said one of said plurality of storage nodes to other ones of said plurality of storage nodes.

47. The system of claim 46, further comprising:
an object database storing a plurality of object records associated with a plurality of stored objects, each said object record indicating multiple ones of said storage nodes storing an associated stored object; and wherein
said rebalance module is operative to modify at least some of said plurality of object records.

48. The system of claim 26, further comprising an object auditor operative to determine whether said object stored on one or more of said selected storage nodes has degraded.

49. The system of claim 26, wherein:
said client application server is further operative to receive a second object from said client via said inter-network;
said means for selecting selects at least two storage nodes from said plurality of storage nodes for said second object that are different from said at least two storage nodes selected for said object; and
said means for streaming is operative to stream said second object to each of said storage nodes selected for said second object.

50. The system of claim 26, wherein multiple ones of said plurality of storage nodes are selected on an object-by-object basis for additional objects uploaded by said client.

* * * * *